(12) United States Patent
Brozell et al.

(10) Patent No.: US 10,259,723 B2
(45) Date of Patent: *Apr. 16, 2019

(54) SELF-ASSEMBLED SURFACTANT STRUCTURES

(71) Applicant: zNano LLC, San Jose, CA (US)

(72) Inventors: Adrian Brozell, Los Gatos, CA (US); Arian Abed-Amoli, Belmont, CA (US)

(73) Assignee: ZNANO LLC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/684,449

(22) Filed: Nov. 23, 2012

(65) Prior Publication Data

US 2013/0146521 A1 Jun. 13, 2013

Related U.S. Application Data

(63) Continuation-in-part of application No. 13/113,930, filed on May 23, 2011.
(Continued)

(51) Int. Cl.
*B01D 63/00* (2006.01)
*C02F 1/44* (2006.01)
(Continued)

(52) U.S. Cl.
CPC .............. *C02F 1/44* (2013.01); *B01D 63/10* (2013.01); *B01D 67/00* (2013.01);
(Continued)

(58) Field of Classification Search
CPC .............. B01D 69/122; B01D 2323/12; B01D 2325/20; B01D 61/002; B01D 61/025;
(Continued)

(56) References Cited

U.S. PATENT DOCUMENTS

| 4,659,475 A | 4/1987 | Liao et al. |
| 4,699,892 A | 10/1987 | Suzuki |

(Continued)

FOREIGN PATENT DOCUMENTS

| CN | 101302072 | 11/2008 |
| CN | 101314509 | 12/2008 |

(Continued)

OTHER PUBLICATIONS

H.M. van Veen, Y.C. van Delft, C.W.R. Engelen, P.P.A.C. Pex; Dewatering of organics by pervaporation with silica membranes; Separation and Purification Technology 22-23 (2001) 361-366.*
(Continued)

*Primary Examiner* — Pranav N Patel
(74) *Attorney, Agent, or Firm* — Morrison & Foerster LLP

(57) ABSTRACT

Stabilized surfactant-based membranes and methods of manufacture thereof. Membranes comprising a stabilized surfactant mesostructure on a porous support may be used for various separations, including reverse osmosis and forward osmosis. The membranes are stabilized after evaporation of solvents; in some embodiments no removal of the surfactant is required. The surfactant solution may or may not comprise a hydrophilic compound such as an acid or base. The surface of the porous support is preferably modified prior to formation of the stabilized surfactant mesostructure. The membrane is sufficiently stable to be utilized in commercial separations devices such as spiral wound modules. Also a stabilized surfactant mesostructure coating for a porous material and filters made therefrom. The coating can simultaneously improve both the permeability and the filtration characteristics of the porous material.

34 Claims, 44 Drawing Sheets

Related U.S. Application Data

(60) Provisional application No. 61/347,317, filed on May 21, 2010, provisional application No. 61/415,761, filed on Nov. 19, 2010, provisional application No. 61/562,956, filed on Nov. 22, 2011.

(51) Int. Cl.

| | |
|---|---|
| B05D 5/00 | (2006.01) |
| B23B 3/14 | (2006.01) |
| B01D 69/02 | (2006.01) |
| B01D 63/10 | (2006.01) |
| B01D 67/00 | (2006.01) |
| B01D 69/10 | (2006.01) |
| B01D 69/12 | (2006.01) |
| B01D 71/02 | (2006.01) |
| H01M 2/16 | (2006.01) |
| H01M 8/1041 | (2016.01) |
| B01D 61/00 | (2006.01) |
| B01D 61/02 | (2006.01) |
| B01D 61/14 | (2006.01) |
| H01M 2/14 | (2006.01) |
| H01M 8/1009 | (2016.01) |
| H01M 8/1011 | (2016.01) |
| H01M 8/1023 | (2016.01) |
| H01M 8/1039 | (2016.01) |
| H01M 8/1072 | (2016.01) |
| H01M 8/04082 | (2016.01) |

(52) U.S. Cl.
CPC ..... *B01D 67/0004* (2013.01); *B01D 67/0048* (2013.01); *B01D 67/0088* (2013.01); *B01D 69/02* (2013.01); *B01D 69/10* (2013.01); *B01D 69/122* (2013.01); *B01D 71/025* (2013.01); *B01D 71/027* (2013.01); *H01M 2/1646* (2013.01); *H01M 2/1686* (2013.01); *H01M 8/1055* (2013.01); *B01D 61/002* (2013.01); *B01D 61/025* (2013.01); *B01D 61/027* (2013.01); *B01D 61/145* (2013.01); *B01D 61/147* (2013.01); *B01D 2323/12* (2013.01); *B01D 2325/20* (2013.01); *H01M 2/145* (2013.01); *H01M 8/04197* (2016.02); *H01M 8/1009* (2013.01); *H01M 8/1011* (2013.01); *H01M 8/1023* (2013.01); *H01M 8/1039* (2013.01); *H01M 8/1074* (2013.01); *Y02E 60/523* (2013.01); *Y02P 70/56* (2015.11)

(58) Field of Classification Search
CPC .. B01D 61/027; B01D 61/145; B01D 61/147; B01D 63/10; B01D 67/0004; B01D 67/0048; B01D 67/0088; B01D 69/02; B01D 69/10; B01D 69/12; B01D 71/00; B01D 71/025; B01D 71/027

See application file for complete search history.

(56) References Cited

U.S. PATENT DOCUMENTS

| | | |
|---|---|---|
| 4,861,480 A | 8/1989 | Berardo et al. |
| 4,919,808 A | 4/1990 | Swedo et al. |
| 4,971,696 A * | 11/1990 | Abe et al. ............... 210/500.25 |
| 5,017,291 A | 5/1991 | Semler et al. |
| 5,132,017 A | 7/1992 | Birdsong et al. |
| 5,250,183 A | 10/1993 | Maier |
| 5,313,485 A | 5/1994 | Hamil et al. |
| 5,589,396 A | 12/1996 | Frye et al. |
| 5,772,735 A | 6/1998 | Sehgal et al. |
| 5,795,559 A | 8/1998 | Pinnavaia et al. |
| 5,858,457 A | 1/1999 | Brinker et al. |
| 5,935,646 A | 8/1999 | Raman et al. |
| 5,949,071 A | 9/1999 | Ruffner et al. |
| 5,989,587 A | 11/1999 | Sprott et al. |
| 6,048,546 A | 4/2000 | Sasaki et al. |
| 6,057,377 A | 5/2000 | Sasaki et al. |
| 6,245,121 B1 | 6/2001 | Lamy et al. |
| 6,258,305 B1 | 7/2001 | Brinker et al. |
| 6,264,741 B1 | 7/2001 | Brinker et al. |
| 6,270,846 B1 | 8/2001 | Brinker et al. |
| 6,338,803 B1 | 1/2002 | Campbell et al. |
| 6,379,546 B1 | 4/2002 | Braun |
| 6,387,453 B1 | 5/2002 | Brinker et al. |
| 6,471,761 B2 | 10/2002 | Fan et al. |
| 6,495,352 B1 | 12/2002 | Brinker et al. |
| 6,583,071 B1 | 6/2003 | Weidman et al. |
| 6,635,177 B2 | 10/2003 | Oswald et al. |
| 6,838,000 B2 | 1/2005 | Braun |
| 7,306,724 B2 | 12/2007 | Gordon |
| 7,318,894 B2 | 1/2008 | Juby et al. |
| 7,396,453 B2 | 7/2008 | Probst |
| 7,405,002 B2 | 7/2008 | Ying et al. |
| 7,485,343 B1 | 2/2009 | Branson et al. |
| 7,547,392 B2 | 6/2009 | Gordon |
| 7,648,634 B2 | 1/2010 | Probst |
| RE41,612 E | 8/2010 | Brinker et al. |
| 7,857,978 B2 | 12/2010 | Jensen et al. |
| 8,070,953 B2 | 12/2011 | Ito et al. |
| 8,070,954 B2 | 12/2011 | Ito et al. |
| 8,070,955 B2 | 12/2011 | Ito et al. |
| 8,083,948 B2 | 12/2011 | Ito et al. |
| 8,123,948 B2 | 2/2012 | Jensen |
| 8,419,947 B2 | 4/2013 | Gaid |
| 8,679,347 B2 | 3/2014 | Al-Samadi |
| 2001/0043901 A1 | 11/2001 | Pinnavala et al. |
| 2002/0005385 A1 | 1/2002 | Stevens, Sr. et al. |
| 2002/0034626 A1 | 3/2002 | Liu et al. |
| 2002/0192843 A1 | 12/2002 | Kaganove et al. |
| 2005/0056590 A1 | 3/2005 | Baggott et al. |
| 2005/0145569 A1 | 7/2005 | Ulmert |
| 2006/0081537 A1 | 4/2006 | Campos et al. |
| 2006/0201884 A1 * | 9/2006 | Kulprathipanja et al. .... 210/651 |
| 2006/0204758 A1 | 9/2006 | Miyata et al. |
| 2007/0022877 A1 | 2/2007 | Marand et al. |
| 2007/0068864 A1 * | 3/2007 | Cruz et al. ............... 210/321.76 |
| 2007/0125702 A1 * | 6/2007 | Ramaswamy et al. ....... 210/490 |
| 2007/0215551 A1 | 9/2007 | Braun |
| 2007/0269662 A1 | 11/2007 | Lopez et al. |
| 2008/0053907 A1 | 3/2008 | Gordon |
| 2008/0149561 A1 * | 6/2008 | Chu et al. ............... 210/500.38 |
| 2008/0217244 A1 | 9/2008 | Gaid |
| 2009/0120874 A1 | 5/2009 | Jensen et al. |
| 2009/0188867 A1 | 7/2009 | Vuong et al. |
| 2009/0241496 A1 | 10/2009 | Pintault et al. |
| 2010/0304139 A1 | 12/2010 | Chang et al. |
| 2011/0014543 A1 | 1/2011 | Taniguchi |
| 2011/0056878 A1 | 3/2011 | Matsushiro et al. |
| 2011/0108480 A1 | 5/2011 | Musale et al. |
| 2011/0163044 A1 | 7/2011 | Han et al. |
| 2011/0284456 A1 | 11/2011 | Brozell |
| 2012/0012539 A1 | 1/2012 | Green |
| 2013/0043190 A1 | 2/2013 | Al-Samadi |
| 2013/0213888 A1 | 8/2013 | Tempest, Jr. |
| 2013/0313191 A1 | 11/2013 | Wolf et al. |
| 2014/0151294 A1 | 6/2014 | Prior et al. |
| 2016/0046509 A1 | 2/2016 | Ukai et al. |
| 2017/0121200 A1 | 5/2017 | Brozell |

FOREIGN PATENT DOCUMENTS

| | | |
|---|---|---|
| CN | 101935118 | 1/2011 |
| CN | 102050538 | 5/2011 |
| CN | 102659291 | 9/2012 |
| CN | 102092877 | 7/2013 |
| CN | 104230076 | 12/2014 |
| EP | 1044928 | 1/2005 |
| JP | S6258063 | 3/1982 |
| JP | 07000963 | 1/1995 |
| JP | 07031871 | 2/1995 |
| JP | 2004505764 A | 2/2004 |

(56) References Cited

FOREIGN PATENT DOCUMENTS

| | | |
|---|---|---|
| JP | 2004202438 A | 7/2004 |
| JP | 2005501758 | 1/2005 |
| JP | 2007045691 | 2/2007 |
| JP | 2008526467 | 7/2008 |
| JP | 2008238040 A | 10/2008 |
| JP | 2008307447 | 12/2008 |
| JP | 2009510301 | 3/2009 |
| JP | 2010509540 A | 3/2010 |
| JP | 2010082573 A | 4/2010 |
| KR | 100148523 B1 | 10/1998 |
| KR | 1020000039560 A | 7/2000 |
| KR | 1020090007455 | 1/2009 |
| KR | 101035899 | 5/2011 |
| WO | 2008137082 | 11/2008 |
| WO | 2009/119062 A1 | 10/2009 |
| WO | 2010/144057 | 12/2010 |
| WO | 2013093840 | 6/2013 |

OTHER PUBLICATIONS

Ming-Liang Luo, Jian-Qing Zhao, Wu Tang, Chun-Sheng Pu; Hydrophilic modification of poly(ether sulfone) ultrafiltration membrane surface by self-assembly of TiO2 nanoparticles; Applied Surface Science 249 (2005) 76-84.*
Shun-He Zhong, Chuan-Feng Li, Xiu-Fen Xiao; Preparation and characterization of polyimide-silica hybrid membranes on kieselguhr-mullite supports; Journal of Membrane Science 199 (2002) 53-58.*
R C Suciu, E Indrea, T D Silipas, S Dreve, M C Rosu, V Popescu, G Popescu and H I Nascu; TiO2 thin films prepared by sol-gel method; Journal of Physics: Conference Series 182 (2009), pp. 1-4.*
B.A. McCool, N. Hill, J. DiCarlo, W.J. DeSisto, Synthesis and characterization of mesoporous silica membranes via dip-coating and hydrothermal deposition techniques, Journal of Membrane Science 218 (2003) 55-67.*
Lu Yan, Yu Shui Li , Chai Bao Xiang , Shun Xianda; Effect of nano-sized Al2O3-particle addition on PVDF ultrafiltration membrane performance; Journal of Membrane Science 276 (2006) 162-167.*
Benjamin H. Winkler, Ruth E. Baltus; Modification of the surface characteristics of anodic alumina membranes using sol-gel precursor chemistry; Journal of Membrane Science 226 (2003) 75-84.*
Wang, Kai Y. et al., "Double-Skinner Forward Osmosis Membranes for Reducing Internal Concentration Polarization within the Porous Sublayer", Ind. Eng. Chem. Res., vol. 49, American Chemical Society, 2010, 4824-4831.
Chougnet, et al., "The influence of the nature of the substrate on the ordering of mesoporous thin films", Thin Solid Films, 2006, 40-44.
Guliants, et al., "Ordered mesoporous and macroporous inorganic films and membranes", Journal of Membrane Science, 2004, 53-72.
Kim, et al., "Preparations of Continuous Mesoporous Silica Thin Film on a Porous Tube", Advanced Materials, Aug. 5, 2002, 1078-1081.
Baca, Helen K. et al., "Cell-Directed Assembly of Lipid-Silica Nanostructures Providing Extended Cell Viability", Science, vol. 313, Jul. 21, 2006, 337-341.
Baksh, Michael M. et al., "Detection of molecular interactions at membrane surfaces through colloid phase transitions", Nature, vol. 427, Nature Publishing Group, Jan. 8, 2004, 139-141.
Brozell, Adrian M. et al., "Formation of Spatially Patterned Colloidal Photonic Crystals through the Control of Capillary Forces and Template Recognition", Langmuir, vol. 21, American Chemical Society, 2005, 11588-11591.
Buranda, Tione et al., "Biomimetic Molecular Assemblies on Glass and Mesoporous Silica Microbeads for Biotechnology", Langmuir, vol. 19, American Chemical Society, 2003, 1654-1663.
Cath, Tzahi Y. et al., "Forward osmosis: Principles, applications, and recent developments", Journal of Membrane Science, vol. 281, Elsevier, B.V., 2006, 70-87.
Gupta, Gautam et al., "Robust hybrid thin films that incorporate lamellar phospholipid bilayer assemblies and transmembrane proteins", Biointerphases, vol. 1, No. 1, Mar. 2006, 6-10.
Jeong, I. et al., "Optimum operating strategies for liquid-fed direct methanol fuel cells", Journal of Power Sources, vol. 185, Elsevier, B.V., 2008, 828-837.
Kim, H. , "Passive direct methanol fuel cells fed with methanol vapor", Journal of Power Sources, vol. 162, Elsevier B.V., 2006, 1232-1235.
Lee, W. et al., "Nafion based organic/inorganic composite membrane for air-breathing direct methanol fuel cells", Journal of Membrane Science, vol. 292, Elsevier B.V., 2007, 29-34.
Lu, Yu et al., "Growth of Large Crystals of Monodispersed Spherical Colloids in Fluidic Cells Fabricated Using Non-photolithographic methods", Langmuir, vol. 17, American Chemical Society, 2001, 6344-6350.
Lu, Yunfeng et al., "Continuous formation of supported cubic and hexagonalmesoporous films by sol-gel dip-coating", Nature, vol. 389, Sep. 25, 1997, 364-368.
Ly, H. V. et al., "The influence of short-chain alcohols on interfacial tension, mechanical properties, area/molecule, and permeability of fluid lipid bilayers", Biophysical Journal, vol. 87, Biophysical Society, Aug. 2004, 1013-1033.
Nikolov, Vesselin et al., "Electrical Measurements of Bilayer Membranes Formed by Langmuir-Blodgett Deposition on Single-Crystal Silicon", Langmuir, vol. 23, No. 26, American Chemical Society, Washington, D.C., 2007, 13040-13045.
Ogawa, M. , "A simple sol-gel route for the preparation of silica-surfactant mesostructured materials", Chem. Commun., 1996, 1149-1150.
Paula, S. et al., "Permeation of Protons, Potassium Ions, and Small Polar Molecules Through Phospholipid Bilayers as a Function of Membrane Thickness", Biophysical Journal, vol. 70, Biophysical Society, Jan. 1996, 339-348.
Richard, Cyrille et al., "Supramolecular Self-Assembly of Lipid Derivatives on Carbon Nanotubes", Science, vol. 300, No. 5620, American Association for the Advancement of Science, May 2, 2003, 775-778.
Rubenstein, John L. et al., "Lateral diffusion in binary mixtures of cholesterol and phosphatidylcholiness", Proc. Natl. Acad. Scie., vol. 76, No. 1, Jan. 1979, 15-18.
Seddon, Annela M. et al., "Chiral Templating of Silica-Lipid Lamellar Mesophase with Helical Tubular Architecture", Angew: Chem. Int. Ed., vol. 41, No. 16, Wiley-VCH Verlag GmbH & Co. KGaA, Weinheim, 2002, 2988-2991.
Wagner, Michael L. et al., "Tethered Polymer-Supported Planar Lipid Bilayers for Reconstitution of Integral Membrane Proteins: Silane-Polyethyleneglycol-Lipd as a Cushion and Covalent Linker", Biophysicial Journal, vol. 79, Biophysical Society, Sep. 2000, 1400-1414.
Wu, Yiying et al., "Composite Mesostructures by Nano-Confinement", Nature Materials, vol. 3, Nature Publishing Group, Nov. 2004, 816-822.
Xi, Jingyu et al., "Self-assembled polyelectrolyte multilayer modified Nafion membrane with suppressed vanadium ion crossover for vanadium redox flow batteries", Journal of Materials Chemistry, vol. 18, The Royal Society of Chemistry, 2008, 1232-1238.
Yamaguchi, Akira et al., "Self-assembly of a silica surfactant nanocomposite in a porous alumina membrane", Nature Materials, vol. 3, May 3, 2004, 337-341.
Yang, San M. et al., "Opal chips: vectorial growth of colloidal crystal patterns inside silicon wafers", Chem. Commun., The Royal Society of Chemistry, 2000, 2507-2508.
Shi, et al., "Quantitative Chemical Separation Method", China Mining University Press, first edition, 2001, 192-196 (w/ English abstract).
Kaufman, et al., "Supported Lipid Bilayer Membranes for Water Purification by Reverse Osmosis", Langmuir, Jan. 25, 2010, 7388-7395.
Cornell, B. A., et al., "A biosensor that uses ion-channel switches", Nature, vol. 387, Macmillan Publishers Ltd, Jun. 5, 1997, 580-583.
"NEWater", http://en.eikipedia.org/wiki/NEWater, Dec. 17, 2013.

(56) References Cited

OTHER PUBLICATIONS

Han, et al., "Creating Air-Stable Supported Lipid Bilayers by Physical Confinement Induced by Phospholipase A2", Applied Materials & Interfaces, vol. 6, American Chemical Society, 2014, 6378-6383.

Kaufmann, et al., "Supported lipid bilayer microarrays created by non-contact printing", Lap Chip, vol. 11, The Royal Society of Chemistry, 2011, 2403-2410.

Nady, et al., "Modification methods for poly(arylsulfone) membrances: A mini-review focusing on surface modification", Desalination, vol. 275, Elsevier B.V., 2011, 1-9.

Wach, et al., "Protein-Resistant Surfaces through Mild Dopamine Surface Functionalization", Chem. Eur. J., vol. 14, 2008, 10579-10584.

\* cited by examiner

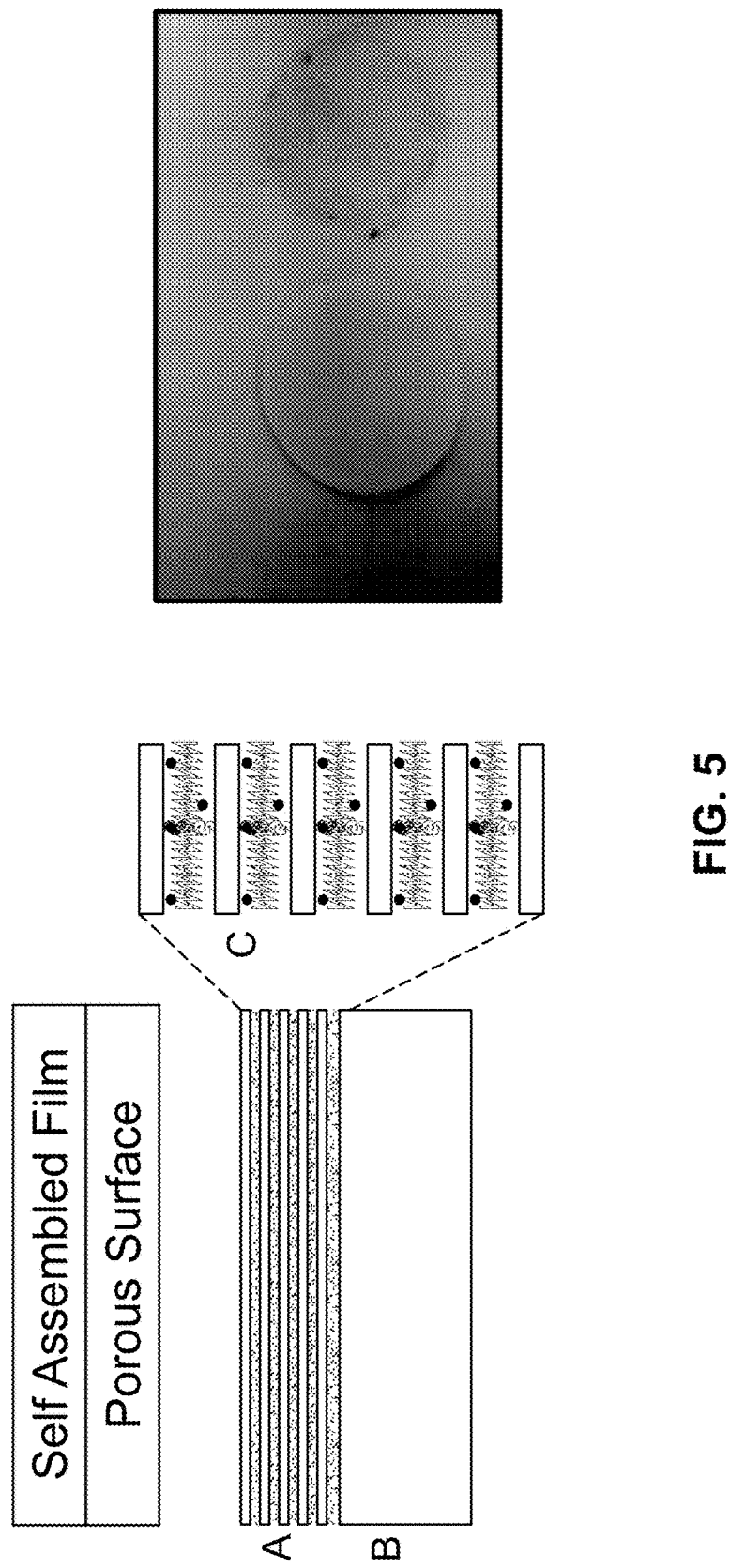

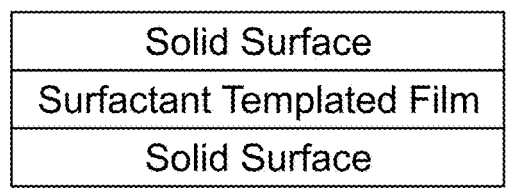
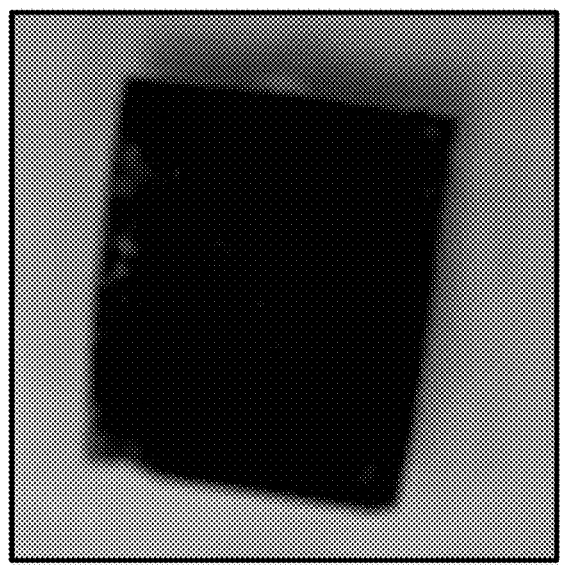
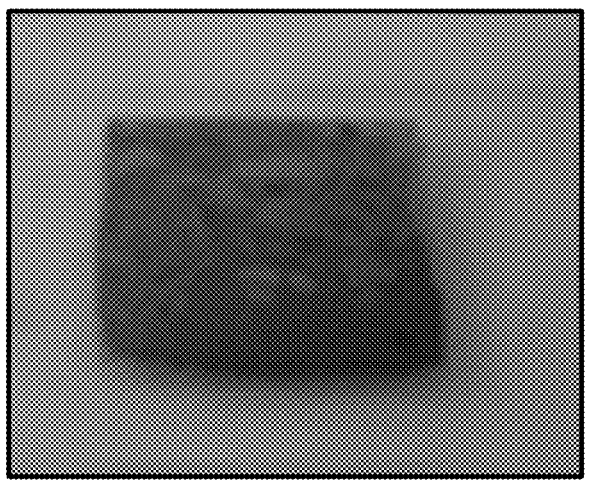
FIG. 8A

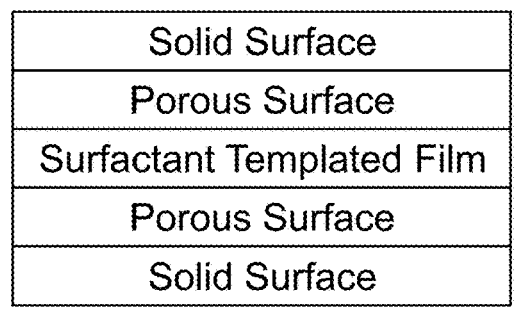
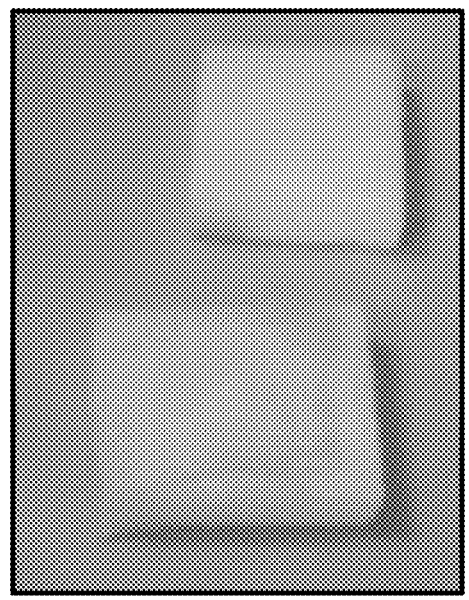
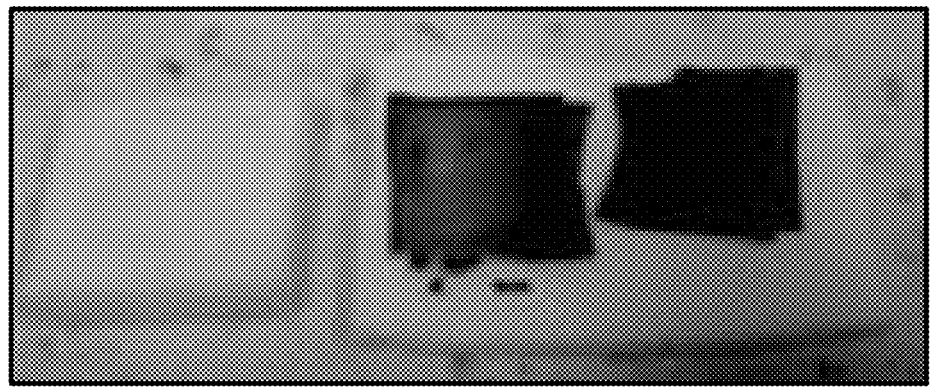
FIG. 8B

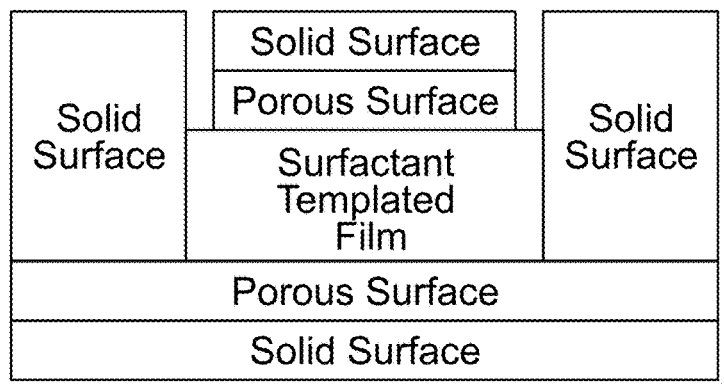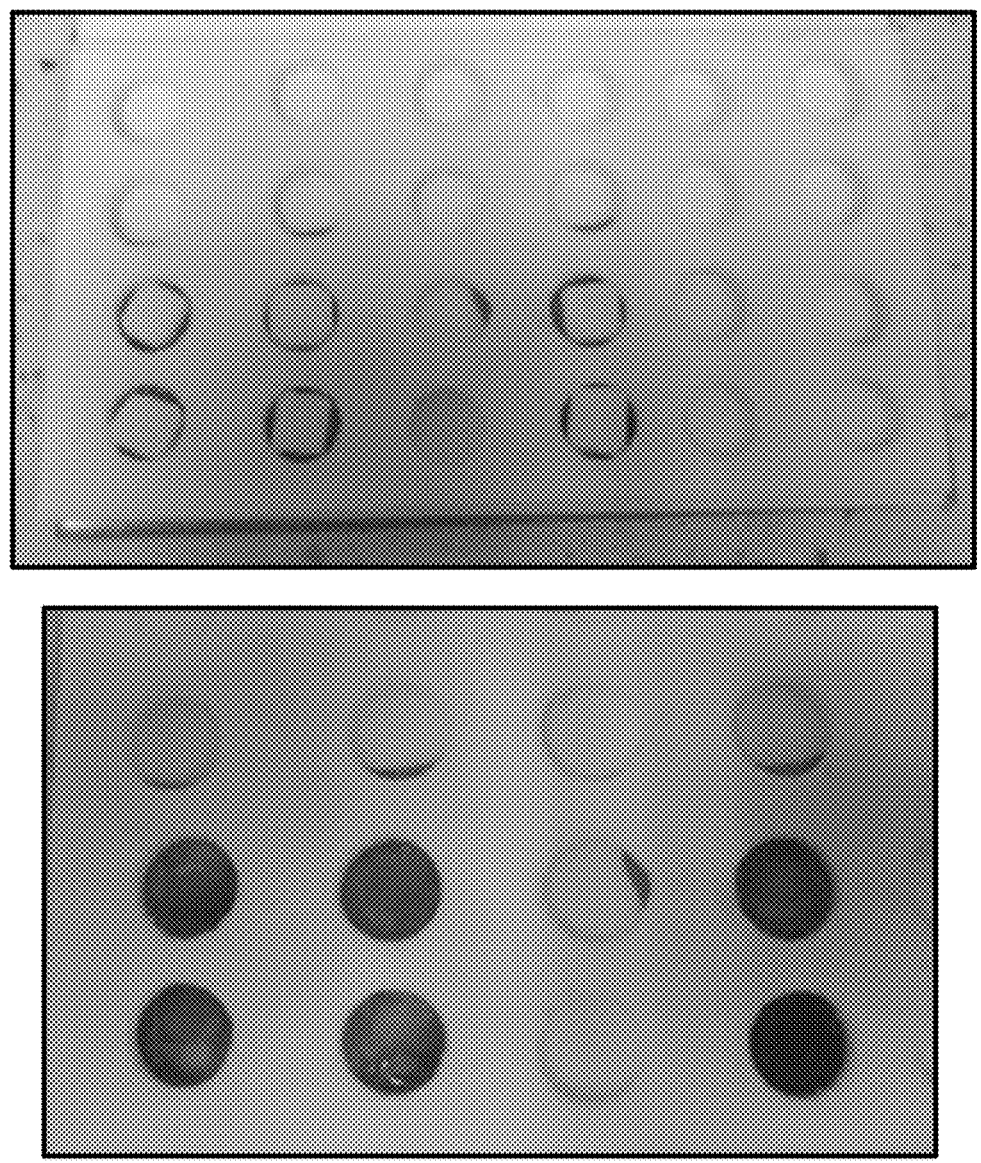
FIG. 8C

| Chemistry | Surfactant Charge | GFD/PSI | Turbidity |
|---|---|---|---|
| CTAB 2:1 (+) | Cationic | 3.29 | 5.22 |
| DDO 2:1 (U) | Nonionic | 13.0 | 12.43 |
| 50/50 CTAB/LA (N) | Zwitterionc | 2.48 | 4.62 |
| Lauric Acid 2: MTAB 1 (-) | Anionic | 9.29 | 82.7 |
| Control (U) | Anionic | 7.38+/-2.27 | 399 +601/-396 |

All Membranes on 0.1 um PES. Feed solution is 3000 ppm Valvoline, 300 ppm of NaDDBS. Used Herco 201 Pump fully open with backpressure of 4 psi. All emulsions are freshly prepared.

FIG. 43

SELF-ASSEMBLED SURFACTANT STRUCTURES

CROSS-REFERENCE TO RELATED APPLICATIONS

This application claims priority to and the benefit of the filing of U.S. Provisional patent application Ser. No. 61/562,956, filed Nov. 22, 2011, entitled "Self-Assembled Surfactant Structures". This application is also a continuation-in-part application of U.S. patent application Ser. No. 13/113,930, filed May 23, 2011, entitled "Self-Assembled Surfactant Structures", which application claims priority to and the benefit of the filing of U.S. Provisional Patent Application Ser. No. 61/347,317, filed May 21, 2010, entitled "Self Assembly of Hierarchical and/or Multiscale Materials Via Physical Confinement" and U.S. Provisional Patent Application Ser. No. 61/415,761, filed Nov. 19, 2010, entitled "Free Standing Heirarchically Self Assembled Films". The specifications and claims thereof are incorporated herein by reference.

BACKGROUND OF THE INVENTION

Field of the Invention (Technical Field)

Embodiments of the present invention employ biomimetic multiscale self assembly and materials such as membranes made therefrom, fabricated using batch and automated manufacturing, in various configurations, to enable aqueous separations and concentration of solutes. Embodiments of the present invention also relate to methods of multiscale self assembly and materials made therefrom where a surfactant mesostructure is preferably simultaneously self assembled and integrated with one or more materials by physical confinement between two or more discrete surfaces and/or by physical confinement on two or more sides.

Description of Related Art

Note that the following discussion may refer to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

Membranes are used to separate ions, molecules, and colloids. For example, ultrafiltration membranes may be used to separate water and molecules from colloids which are 2k Daltons or larger; ion exchange membranes may be used to separate cations and anions; and thin film composite membranes may be used to separate salt from water. These membranes all use the same separation physics. The permeability of the membrane to a specific class or classes of ions, molecules, colloids, and/or particles is much less than another class or classes of ions, molecules, colloids, and/or particles. For example, ultrafiltration membranes have pores of a specific size which prevents the crossover of molecules and particles of a specific size. This technique is known as size exclusion. Reverse osmosis membranes use solubility differences to separate molecules. In a typical thin film composite membrane, the water is three orders of magnitude more soluble than sodium chloride. The result is a material that has a >100:1 preference of water molecules to salt ions. In practical terms, the material filters water by rejecting 99.7% of sodium chloride.

For most separation membranes the permeability of the membrane is defined as the ratio of solvent flux through the membrane in a given period of time to the area of membrane and the pressure applied to the membrane. Below is the equation governing the flux through a membrane $$\text{Flux} = P^*(\Delta P - \Delta\pi)$$

where $\Delta P$ is the pressure across the membrane, $\Delta\pi$ is the osmotic pressure across the membrane and $P$ is the membrane permeability. The permeability of a membrane is a function of the membrane structure parameter. The structure parameter is $$S = \frac{\tau * t}{\varepsilon}$$

where $S$ is the structure parameter, $\tau$ is the tortuosity, $t$ is the thickness, and $E$ is the porosity of the membrane. Tortuosity is defined as the ratio of the distance between two points through the material to the minimum distance between the two points. Since the structure parameter is proportional to the permeability of the membrane, the tortuosity is proportional to the permeability.

Membranes for separations are used in many configurations. For reverse osmosis (RO) and forward osmosis (FO) applications, they are often configured in spiral wound architectures, in which the membrane is wrapped around a hollow core. Water flows from the core into a membrane envelope and then back into the core. For pressure retarded osmosis (PRO), the membrane can also be in a spiral wound configuration. In PRO, water under pressure flows into the membrane envelope, and the osmotic gradient across the membrane pulls more water into the membrane envelope. Membranes for RO, FO, and PRO can also be configured as hollow fibers. In hollow fibers, a hollow porous cylindrical membrane is manufactured. Water flows tangential to the membrane surface and the pores in the fiber enable separation. Membranes can also be manufactured as cartridges typically for the concentration of proteins, viruses, bacteria, sugar, and other biological materials. These membranes can come in cassettes that enable easy concentration of solutes.

For the chloralkali process, batteries and fuel cells, the anode and the cathode are separated by an electrolyte. This electrolyte conducts cations or anions and blocks electrons, liquid anolyte, and/or catholyte. In some devices, the electrolyte is an ion exchange membrane. Typically, an ion exchange membrane will allow for the passage of either cations or anions but not both. Ion exchange membranes can be configured to allow for the passage of either both monovalent and divalent ions or only monovalent ions. Transport across the electrolyte of undesired solutes is known as Membrane Crossover. Membrane Crossover creates overpotential at the anode and/or the cathode, and reduces the current efficiency of the cell. Membrane Crossover is a limiting factor in many devices like direct methanol fuel cells, direct ethanol fuel cells, vanadium redox batteries, iron chrome batteries, flow batteries, etc.

In biology, water drives a class of surfactants called lipids to self assemble in water creating a lipid bilayer which acts as a diffusion barrier into the cell. The permeability of model cellular membranes to water and various low molecular weight solutes has been measured. Typical measurements of the selectivity of a lipid bilayer are performed in aqueous suspensions using osmosis (a.k.a. forward osmosis). Also, the results of these experiments show that a lipid bilayer has greater permeability than commercial osmosis (a.k.a. forward osmosis) membranes. The model cellular membranes are phospholipids self assembled by water into structures called vesicles. A phospholipid has a hydrophilic head group and hydrophobic two fatty acid tails. A vesicle is a spherical, hollow, lipid bilayer between 30 nm and 20,000 nm in diameter. The lipid bilayer creates a physical barrier to the volume of water contained within the vesicle. A typical permeability experiment consists of two steps. The first step is to change the osmotic strength of a solute in the aqueous solution containing the vesicles. The second step is to measure the diffusion of the solute and/or solvent across the lipid bilayer into or out of the vesicles. This experiment is similar to the industrial process of forward osmosis where water is extracted through a membrane using a highly concentrated brine solution.

The results of these experiments show that the hydrophobic core of the bilayer separates various low molecular weight compounds. One mechanism is the sub nanometer porosity created by the interstices between the lipids in the bilayer and the hydrophobic core of the bilayer enable preferential selectively for water, protons, uncharged sub 100 molecular weight organics, and ions in that order. Also, fluctuations in the molecular structure of the bilayer enable faster than expected transport of water and protons. Furthermore, these experiments demonstrated control over selectivity via the chemical structure of the lipids used. Specifically, the separation characteristics of the lipid bilayer are dependent on the length of the lipid's fatty acid tails.

SUMMARY OF THE INVENTION

An embodiment of the present invention comprises a membrane comprising a stabilized surfactant mesostructure bonded to a surface of a porous support. The stabilized surfactant mesostructure is preferably stabilized with a material preserving an alignment of surfactant molecules. The material is optionally porous and the stabilized surfactant mesostructure optionally comprises lamellae which alternate with lamellae comprising the porous material. Alternatively, the material is optionally non-porous and the stabilized surfactant mesostructure optionally comprises hexagonally packed columns comprising circularly arranged surfactant molecules, each of the columns substantially surrounded by the non-porous material. The membrane preferably further comprises a material disposed between the stabilized surfactant mesostructure and the surface for preserving a hydrogen bonding network between surfactant in the stabilized surfactant mesostructure and the surface. The material preferably comprises a material selected from the group consisting of silanes, organics, inorganics, metals, metal oxides, an alkyl silane, calcium, and silica. The surface preferably has been oxidized, melted and resolidified prior to bonding of the stabilized surfactant mesostructure on the surface; in such case an average pore size at the resolidified surface is preferably smaller than average pore size in a bulk of the porous support. A pore size of the porous support is preferably sufficiently small to prevent a precursor solution to the stabilized surfactant mesostructure from completely permeating the support prior to formation of stabilized surfactant mesostructure. The membrane optionally further comprises an additional porous structure disposed on a side of the porous support opposite from the surface for mechanically or chemically stabilizing the porous support. The stabilized surfactant mesostructure optionally comprises a transporter. The membrane optionally comprises a second porous support, wherein the stabilized surfactant mesostructure is sandwiched between the porous support and the second porous support. The membrane preferably comprises a tortuosity of less than approximately 1.09. The stabilized surfactant mesostructure preferably comprises a pore size between approximately 0.3 Angstroms and approximately 4 nm. The membrane preferably comprises a porosity greater than approximately 1%. The porous support preferably comprises plastic and/or cellulose. The porous support preferably mechanically stabilizes the stabilized surfactant mesostructure. The membrane optionally further comprises a second stabilized surfactant mesostructure bonded to a side of the porous support opposite from the surface. The membrane is optionally stacked with other same membranes, thereby forming a multilayer membrane. The surface of the stabilized surfactant mesostructure is optionally modified. The membrane optionally comprises an ion-exchange membrane and/or a gas diffusion layer, the membrane comprising a membrane electrode assembly or an electrolyte.

Another embodiment of the invention is a method for producing a membrane, the method comprising modifying a surface of a porous support; wetting the modified surface with a first solvent; disposing a solution on the wetted surface, the solution comprising at least one surfactant and at least one second solvent, wherein the at least one surfactant is in the dispersed phase in the solution; confining the solution between two or more confining surfaces; and stabilizing the one or more surfactants to form a stabilized surfactant mesostructure on the surface of the porous support. The first solvent and/or the second solvent preferably comprises water. The solution optionally further comprises a precursor solute and/or a transporter. Disposing the solution and confining the solution are optionally performed substantially simultaneously. Confining the solution preferably comprises confining the solution between a surface of the porous support and at least one second surface. The at least one second surface is preferably selected from the group consisting of a groove sidewall, a roller, and a blade edge. Modifying the surface preferably comprises an action selected from the group consisting of surface functionalization, surface grafting, covalent surface modification, surface adsorption, surface oxidation, surface ablation, surface rinsing, depositing a material on the surface, the material selected from the group consisting of silanes, organics, inorganics, metals, metal oxides, an alkyl silane, calcium, and silica, preserving a hydrogen bonding network between surfactant in the stabilized surfactant mesostructure and the surface, and oxidizing, melting and resolidifying the surface, and combinations thereof. The method is preferably performed as part of a mass production coating process. The method preferably further comprising controlling a thickness of the stabilized surfactant mesostructure. The solution optionally does not comprise an acid, a base or a hydrophilic compound. The at least one surfactant is preferably not removed from the solution after the solution is disposed on the surface. The method is optionally performed on both sides of the porous support. The method of optionally further comprises modifying a surface of the stabilized surfactant mesostructure, preferably utilizing surface functionalization, changing the hydrophobicity of the surface of the stabilized surfactant mesostructure, and/or methylating the surface of the stabilized surfactant mesostructure. The method may be repeated to form a multilayer membrane. The porous support preferably comprises plastic and/or cellulose. The method optionally further comprises disposing a second porous support on a surface of the stabilized surfactant mesostructure, thereby sandwiching the stabilized surfactant mesostructure between the porous support and the second porous support.

Another embodiment of the present invention is a forward osmosis membrane comprising a permeability of greater than approximately 15 $LM^{-2}H^{-1}$ for a draw solution concentration of 10 wt % NaCl at 20° C. The permeability is preferably greater than approximately 20 $LM^{-2}H^{-1}$ for a draw solution concentration of 10 wt % NaCl at 20° C., and even more preferably greater than approximately 60 $LM^{-2}H^{-1}$ for a draw solution concentration of 10 wt % NaCl at 20° C. The forward osmosis membrane preferably comprises a rejection of NaCl greater than approximately 96%. The forward osmosis membrane preferably comprises one or more surfactants.

Another embodiment of the present invention is a device for performing separations, the device comprising an active layer which comprises one or more surfactants. The active layer preferably comprises one or more transporters. The device is preferably selected from the group consisting of a forward osmosis membrane or module, a reverse osmosis membrane or module, a pressure retarded osmosis membrane or module, a hollow fiber membrane, a spiral wound membrane or module, a cartridge, a Tangential Flow Filter (TFF) cartridge, a plate and frame module, a tubular membrane, and a bag. The device preferably comprises a porous support coated on both sides with the one or more surfactants. The one or more surfactants preferably form a membrane mechanically stabilized on one or more porous supports.

Another embodiment of the present invention is a hydrophilic coating for a porous material, the coating comprising an inorganic material derived from a sol-gel precursor. The inorganic material comprises silica and/or alumina. The coating optionally comprises a stabilized surfactant mesostructure, the stabilized surfactant mesostructure comprising one or more single chain surfactants. The surfactants optionally have a charge selected from the group consisting of anionic, cationic, zwitterionic, and non-ionic, and combinations thereof. The stabilized surfactant mesostructure preferably comprises between approximately 1 and approximately 20 wt % surfactants.

Another embodiment of the present invention is a filter comprising a porous material coated with the coating of claim 1. The porous material is preferably selected from the group consisting of plastic, ceramic and metal. The average pore size of the filter is preferably less than the average pore size of the porous material. The filter preferably has an average pore size greater than 0.001 microns, and more preferably between 0.002 microns and approximately 0.4 microns. The molecular weight cutoff of the filter is preferably less than a molecular weight cutoff of the porous material. The porous material preferably has a molecular weight cutoff between approximately 100 daltons and approximately 500,000 daltons. The porous material preferably comprises a filter selected from the group consisting of a microfiltration membrane, an ultrafiltration membrane, a nanofiltration membrane, a backflushable membrane, and a reverse osmosis membrane. The porous material preferably comprises polyethersulfone (PES), polysulfone (PS), polyvinyldiflouride (PVDF), poly acrylic nitrile (PAN), or a blend thereof. The water permeability and the emulsion permeability of the filter is preferably at least 10% greater than the water permeability of the porous material. Rejection of a substance by the filter is preferably at least 10% greater than rejection of the substance by the porous material, the substance preferably selected from the group consisting of polyethylene glycol, a salt, an organic material, total dissolved solids, and an emulsion, preferably in conjunction with the enhanced permeability. Turbidity of a filtrate filtered by the filter is preferably at least 10% lower than turbidity of a filtrate filtered by the porous material, preferably in conjunction with the enhanced permeability. A diameter of a drop of water wetting the filter is preferably at least approximately 10% greater, more preferably at least approximately 30% greater, and even more preferably at least approximately 50% greater than a diameter of a drop of water of the same volume wetting the porous material. The filter optionally comprises a partially or completely electrostatic separation mechanism. The filter may optionally be formed into an element, such as a spiral wound element, used in a water treatment system. The system optionally comprises a two stage process comprising a microfiltration/ultrafiltration stage and a reverse osmosis stage. The filter of claim 6 is preferably useful for filtering a fluid selected from the group consisting of wastewater, wastewater comprising surfactants, wastewater comprising an emulsion, bilge water, grey water, laundry water, and emulsions.

An embodiment of the filter is used as a forward osmosis membrane, which optionally has a molecular weight cutoff when used in a reverse osmosis configuration which is at least an order of magnitude different than a molecular weight cutoff when used in a forward osmosis configuration. The membrane's forward osmosis flux is preferably greater than approximately 60 LMH and urea rejection is greater than approximately 60%. The membrane preferably utilizes a forward osmosis separation method that is not the solution diffusion mechanism.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment or embodiments of the invention and are not to be construed as limiting the invention. In the drawings:

FIG. 5 shows an embodiment of a stabilized surfactant mesostructure thin film where the assembly was localized to the surface of a porous material.

FIGS. 8A-C illustrate various configurations of two dimensional multiscale self assembly in accordance with embodiments of the present invention.

FIG. 43 compares performances of surfactants comprising the mesostructure with different charges.

DETAILED DESCRIPTION OF THE INVENTION

Definitions

Figure 1A:
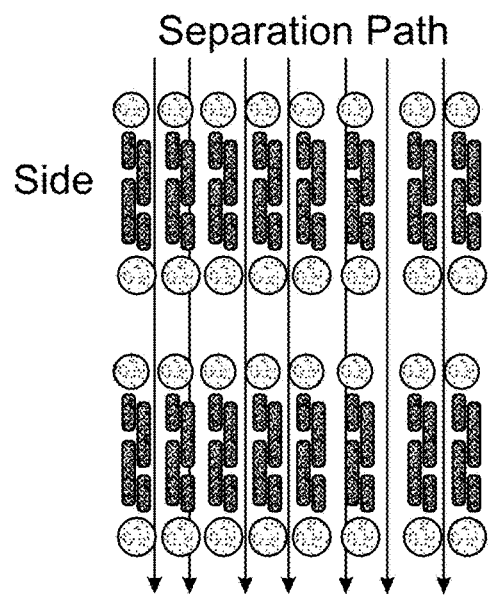
FIGS. 1A and B illustrate how the interstices between surfactant molecules in a lamellar phase can be used for separation.

As used throughout the specification and claims, the following terms are defined as follows:

"Amphiphile" means a molecule with both solvent preferring and solvent excluding domains.

"Hydrophilic" means water preferring. Hydrophilic compounds and surfaces have high surface tension.

"Hydrophobic" means water repelling. Hydrophobic compounds and surfaces have low surface tension.

"Surfactant" means a class of amphiphiles having at least one domain which is hydrophilic and at least one domain which is hydrophobic. Systems that are engineered to work with surfactants can most likely work with all amphiphiles.

"Phospholipid" means the majority constituent of the cellular membrane. These molecules self assemble into vesicles in water and exist in the dispersed phase in a low surface tension solvent.

"Lamellar" means comprising multiple layers or bilayers.

"Mesophase" means a surfactant liquid crystal structure formed by the interactions between one or more solvents and one or more surfactants.

"Micelle Phase" means a spherical phase of surfactants where the hydrophobic domains of the surfactants are hidden from the bulk solution inside the micelle.

"Critical Micelle Concentration" means the concentration above which surfactants order into micelles.

"Hexagonal Phase" means a two dimensional hexagonal arrangement of cylinders of surfactants where the hydrophobic domains of the surfactants are inside the cylinders.

"Inverse" means a surfactant structure where the hydrophilic domains are on the inside of the structure. For example, a surfactant in oil forms an inverse micelle where the hydrophilic heads are hidden from the bulk solution inside the micelle.

"Stabilized Surfactant Mesostructure" means a mesophase that maintains its structure after the removal of the solvents.

"Self Assembled Surfactant Thin Film" means a film, typically less than or equal to ten microns in thickness, wherein one component of the film is a mesophase.

"Biomimetic Membrane" means a single phospholipid bilayer comprising a transporter.

"Biomimetic Surfactant Nanostructure ("BSNS")" means a lamellar stabilized surfactant mesostructure, which may or may not comprise a transporter, assembled on a porous support.

"Transporter" means a molecule, complex of molecules, a structure, a protein, a zeolite, an ion channel, a membrane protein, a carbon nanotube, cyclodextrin, or any other structure that modulates the transport rates of a specific class of ions, molecules, complex of molecules, biological structures, and/or colloidal particles.

"Free Standing" means surfactant template thin film where both sides of the film are addressable to solution and the film is not necessarily confined by physical barriers.

"Supported" means a material is assembled on a second material such that the second materials imbues mechanical stability to the first material without eliminating all of its functions.

"Hollow Fiber Membrane" means a hollow porous cylindrical structure. This material is similar to a straw except it is porous. This material is typically used for aqueous separations.

"Membrane/Semi Permeable Membrane" means a material used to separate specific classes of ions, molecules, proteins, enzymes, viruses, cells, colloids, and/or particles from other classes.

"Mechanical Backing" means a solid or porous support used to increase the mechanical stability of a second material.

"Concentration Polarization" means during filtration, local concentration of a compound at the surface of the membrane differs from the bulk concentration of the compound.

"Reverse Osmosis" means a process that uses pressure to separate salt and water.

"Forward Osmosis" means a process that uses an osmotic gradient to create water flux.

"Pressure Retarded Osmosis" means a process that uses an osmotic gradient and pressure to capture energy from forward osmosis.

"Membrane Crossover" means transport across an electrolyte of an undesirable molecular or ionic species.

"Overpotential" means a reduction in a half electrochemical cell's potential from the theoretically expected value. Membrane Crossover can be a cause of overpotential of a half electrochemical cell.

"Single chain surfactant" means a surfactant having only one hydrophilic domain and only one hydrophobic domain, wherein the hydrophobic domain comprises only one alkyl chain.

"Emulsion" means a solution comprising water, at least one amphiphile, and oil.

"Filter" means a material used to remove solutes from solutions, including but not limited to a membrane, a microfiltration filter or membrane, an ultrafiltration filter or membrane, reverse osmosis filter or membrane, forward osmosis filter or membrane, hollow fiber membrane, and semipermeable membrane.

Definitions of Material Preparation Methods

The following methods were used to prepare surfaces for the assembly of surfactant templated sol-gel thin films. Each material was rinsed in water, ethanol, then dried before another further preparation. All materials were stored in water before use. UV light source was an ozone producing pen lamp from UVP.

"Rinse Only"—Materials were not further treated after rinsing.

"UV Clean"—Materials were exposed to ozone producing UV light from a pen lamp for greater than 1 minute. After treatment, Materials were stored in water.

"UV Clean Net"—Materials were exposed to ozone producing UV light from a pen lamp for greater than 1 minute. After treatment, materials were stored in water. Before self assembly solution deposition, a microporous mesh was placed between the solid surface and the membrane in the physical confinement cell.

"H2O2 Boil"—Materials were rinsed in hot (>20° C.) hydrogen peroxide for one hour.

"H2O2 Boil TEOS"—Materials were rinsed in hot (>20° C.) hydrogen peroxide for one hour. Then materials were soaked in stock silica solution, allowed to air dry for at least three hours, and finally cured at >80° C. for more than three hours.

"UV TEOS"—Materials were exposed to ozone producing UV light from a pen lamp for greater than 1 minute. Then materials were soaked in stock silica solution, allowed to air dry for at least three hours, and finally cured at >80° C. for more than three hours.

Surfactant Mesostructures

Surfactant mesostructures may be used for separations in accordance with embodiments of the present invention. There are at least three independent mechanisms for separations using surfactant mesostructures. The first comprises using the interstices between surfactants in mesostructures. The interstices have several advantages for separations, including but not limited to low tortuosity, tunable pore size, tunable surface charge, and either apolar or polar pores. Furthermore, the thickness of surfactants in mesostructures is easy to control. The second mechanism is molecular transport through defects, enabling selectivity in the thin film. These defects can be on the molecular level (e.g. a missing molecule or a poorly fitting molecule) and/or on the macroscopic level (e.g. from wetting instabilities during deposition). The third mechanism is that the surfactant mesostructure can form pores itself via the entrapment of solvent during formation. After formation, solvent can be removed to enable transport or can remain, similar to a water wire in biology, to enable transport. Although this embodiment of the present invention is inspired by biological (e.g.

cellular) membranes, it preferably does not comprise a biomimetic membrane, because the invention requires material nanoscience to stabilize the self assembled surfactant thin films and integrate them with devices. This embodiment of the present invention is also preferably not a surfactant templated sol-gel material because it preferably uses the physical properties of the surfactant mesostructure to separate compounds rather than using the surfactant to create a desirable sol-gel structure. In other words, embodiments of the present invention preferably utilize the surfactant, and not an inorganic sol-gel structure such as silica or titanium dioxide, to form the structure of the stabilized surfactant mesostructure. Embodiments of the present invention comprise stabilized surfactant mesostructures, including but not limited to a lipid bilayer, for separations, including but not limited to osmosis.

Figure 1B:
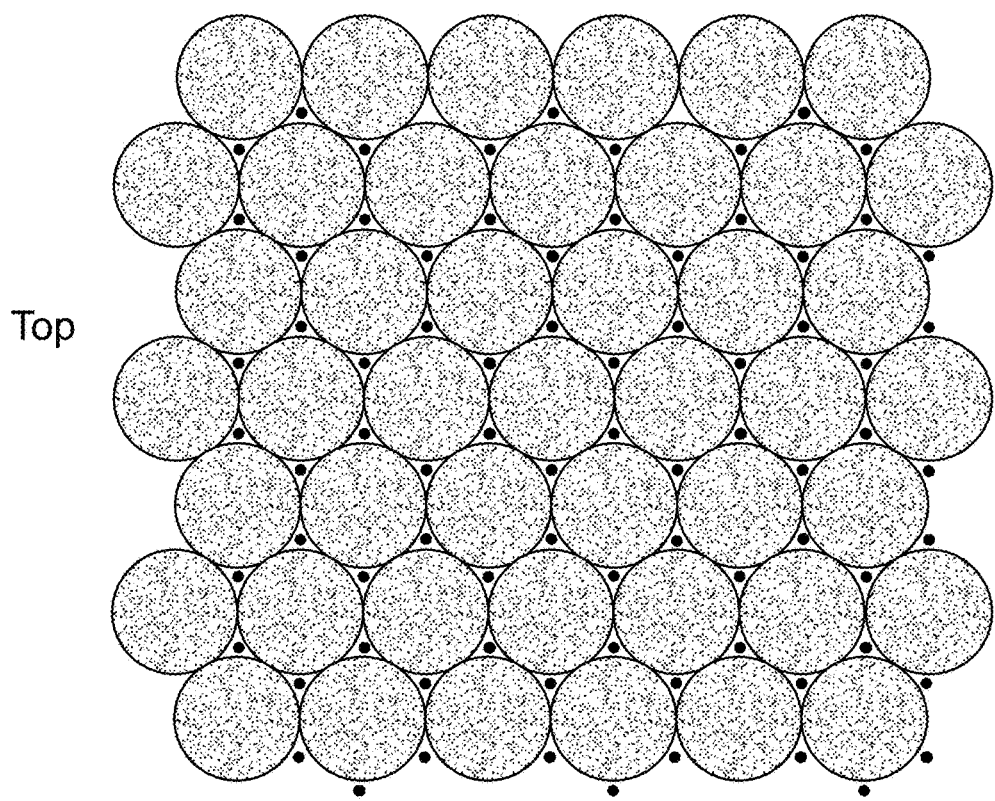

The desirable permeability and separation capability of a stabilized surfactant mesostructure is related to the simplest class of embodiments of this invention: a one dimensional crystal of surfactants assembled in the lamellar phase. One specific embodiment within this class is z-dimensional lamellae of lipid bilayers. The lipid bilayers use the energy penalty of molecules in the oil phase composed of the lipid tails to create a solubility barrier, limiting transport across the membrane. This mechanism can be modeled by the solubility diffusion model. Water and protons travel across the membrane through spontaneous pores which form in the membrane, as shown in FIG. 1. FIG. 1A is a side cross-sectional view of the lamellar bilayer surfactant structure. The hydrophilic domains of surfactants are represented by the stippled gray circles. The hydrophobic domains of the surfactants are represented by the two stippled black lines. The arrows show the path of molecules between the surfactants. FIG. 1B is a top view of the lamellar bilayer surfactant structure. The stippled grey circles represent the surfactants. The black dots represent interstices between the surfactants which enable transport through the structure.

This embodiment differs from classic biomimetic membranes where an ion channel and/or another transporter is included within the surfactant. In those systems, transport across the membrane is a function of the channel or transporter. This embodiment of the invention is a membrane which does not comprise a transporter or ion channel. Alternatively, other embodiments of the present invention may comprise one or more transporters, but are preferably multilayer and therefore not biomimetic membranes.

X-ray diffraction measurements have established that the diameter of a lipid is 7.189 Å. Assuming that lipids in the plane are locally close packed and can be represented as circles, the diameter of a circle inscribed between the lipids is 1.112 Å. For reference, a bond length is typically between about 1.0 Å and about 2.5 Å. This enables the surfactant to perform size exclusion separations at the atomic level. In this class of embodiments, X-ray experiments have shown that the distance between two sides of a single bilayer is approximately 42.00 Å. The maximum/minimum path length of a molecule through the single bilayer is approximately 45.59 Å/42.00 Å. The maximum path length occurs when the lipids of one layer sit on the interstices of the other lipid layer. Therefore, the tortuosity of a single bilayer is between about 1.09 and 1.00. In the minimum case for the self assembled mesophase, the tortuosity of the material is 1.00, by definition the minimum tortuosity possible. The tortuosity of the present membranes is preferably approximately close to the tortuosity of a single lipid bilayer. This enables the present membranes to have a structure parameter of preferably less than 0.5 mm, and more preferably less than about 0.1 mm. Material science techniques preferably control the number of z-dimensional lamella to be from one to thousands. The effect on water transport of the sol-gel layer is negligible, because the porosity is high, the thickness is several molecules, and the tortuosity is near one.

In the lamellar class of embodiments, the porosity of the lamellae can be controlled by using different sizes and shapes of surfactants and mixtures of surfactants. For example, the diameter of the interstitial pores between the surfactants is 15.5% of the diameter of the surfactants when the surfactants are modeled as a plane of circles. For example, a single chain surfactant has a smaller in-plane area than a lipid. The result is a membrane comprising smaller pores. In one embodiment, lamellae of lipid bilayers were assembled on a microporous support using a variety of methods included in this invention. As expected, when compared to current forward osmosis membranes, the stabilized surfactant mesostructure has higher permeability to water. In this embodiment, the surfactant is in the lamellar phase. This embodiment will be described in detail later. The result of this experiment is summarized in TABLE 1. As can be seen, the permeability of the stabilized surfactant mesostructure of the present embodiment is approximately five times greater than a typical commercial FO membrane. Thus the present invention can have a permeability of greater than 15 $LM^{-2}H^{-1}$, more preferably greater than 20 $LM^{-2}H^{-1}$, and even more preferably greater than 60 $LM^{-2}H^{-1}$ for a draw solution concentration of 10 wt % NaCl at 20° C. Further, for these membranes, the rejection of NaCl was greater than approximately 96%.

TABLE 1

| Membrane | Permeability | Draw Solution Concentration |
| --- | --- | --- |
| Commercial FO Membrane | 15 $LM^{-2}H^{-1}$ | 10 wt % NaCl |
| Stabilized Surfactant Mesostructure | 75.5 $LM^{-2}H^{-1}$ | 10 wt % NaCl |

Figure 34A:
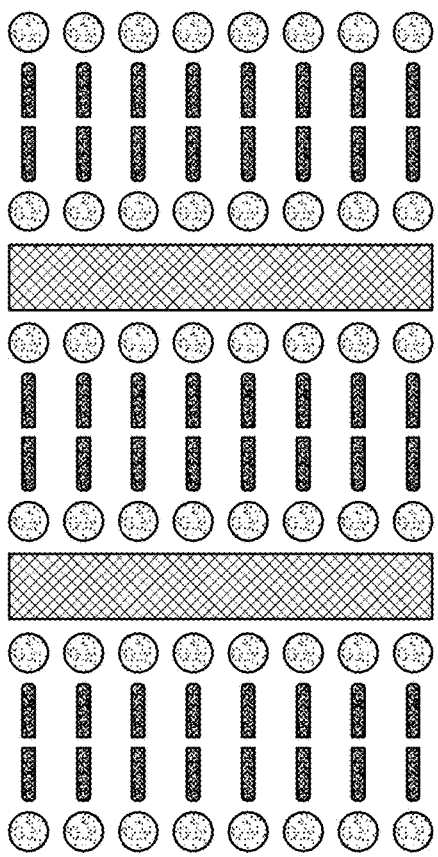
FIGS. 34A and B depict embodiments of a lamellar structure comprising single chained surfactants in a z-dimensional nanostructure.
Figure 34B:
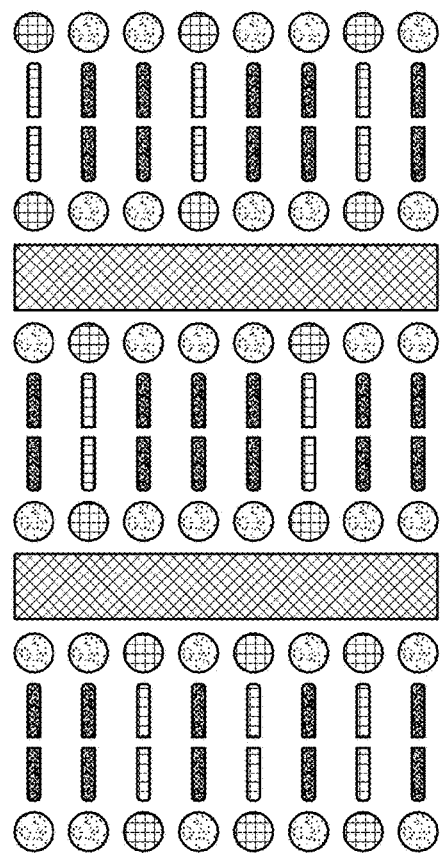

Surfactants can self assemble into a lamellar phase, hexagonal phase, and/or cubic phase. Specifically applicable surfactants include surfactants with ammonium salt, caroboxylic acid, alcohol, amine, sulfate, phosphate, phosphonate and sulfonate moieties. Examples of molecules that can form desirable structures as a single component or in mixtures in a self assembly solution include dodecanol, dodecane amine, lauric acid, and/or myristyl trimethyl ammonium bromide. Specifically applicable surfactants include surfactants that have longer, shorter, branched or cyclic alkane chains to those mentioned in the previous sentence may also be desirable as a single component or as a component in a mixture in a self assembly solution. This is illustrated in FIG. 34, which illustrates embodiments of a lamellar structure with single chained surfactants in a z-dimensional nanostructure. In this embodiment, each layer is a z-dimensional nanostructure. One or more of the layers may optionally not be lamellar in the multilayered structures. FIG. 34A depicts a z-dimensional lamellar structure containing a single chain surfactant. FIG. 34B depicts a z-dimensional lamellar structure containing a mixture of one or more single chain surfactants. Although in this figure each layer is represented by three lamellae, a layer may comprise any number of lamellae.

Figure 35A:
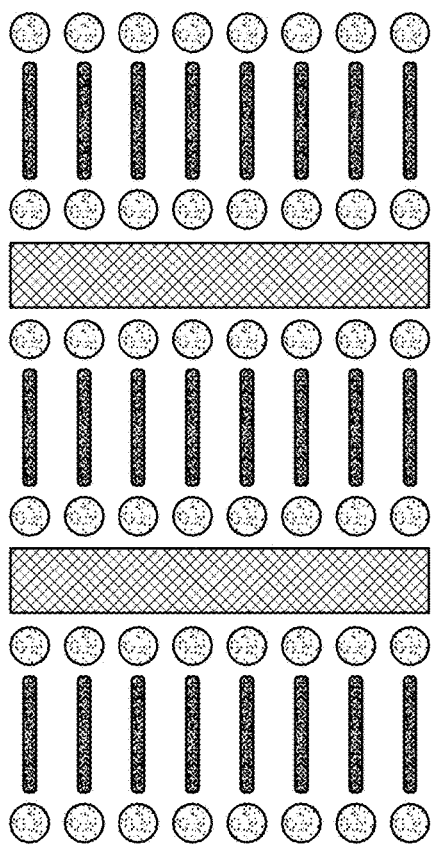
FIGS. 35A and B depict embodiments of a lamellar structure comprising dumbbell shaped molecules in a z-dimensional nanostructure.
Figure 35B:
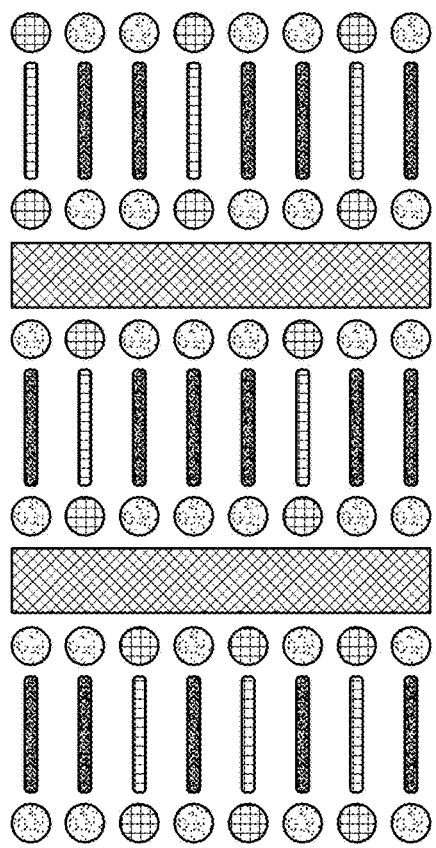

In the previous examples, surfactants may self assemble to form phases including a lamellar phase which consists of periodic bilayer surfactant structures. Surfactants and bilayers are not necessary for separations. A bilayer can be simulated by a single layer by replacing the two molecules in a bilayer with one molecule. That single molecule preferably comprises both moieties which were present at the surface of the bilayer and both alkane moieties of the two molecules which were replaced. For example, a bilayer composed of hexanol can be replaced by 1,12 dihexanol. The two hydroxyl groups on the opposite ends of the alkane create a 'dumbbell' shaped molecule. Similar examples exist in di-ammonium salts, di-caroboxylic acids, di-alcohols, di-amines, di-sulfates, di-phosphates, di-phosphonates and di-sulfonates. The alkane moieties can be substituted in a one—one carbon basis or completely changed. For example, the two molecular layers of a dodecanol bilayer can be substituted with one 1,12 dodecandiol, as shown in FIG. 35. In general, FIG. 35 depicts embodiments of a lamellar structure comprising dumbbell shaped molecules in a z-dimensional nanostructure. In this example, each layer is a z-dimensional nanostructure. One or more of the layers may optionally not be lamellar in the multilayered structures. FIG. 35A depicts a z-dimensional lamellar structure containing a single dumbbell (two-end) shaped molecule. FIG. 35B depicts a z-dimensional lamellar structure containing a mixture of one or more dumbbell shaped molecules. Although in this figure each layer is represented by three lamellae, a layer may comprise any number of lamellae.

Figure 36:
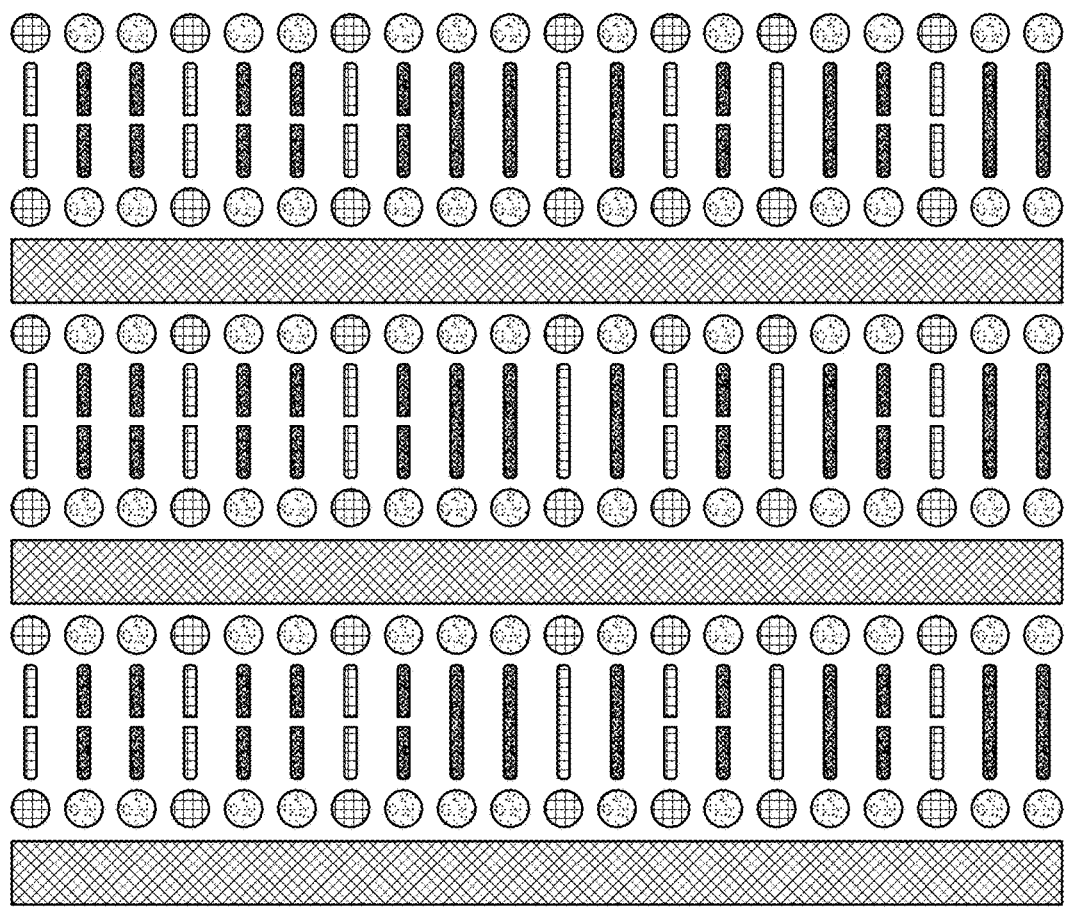
FIG. 36 depicts an embodiment of a z-dimensional lamellar structure comprising a mixture of one or more single chain surfactants and/or dumbbell molecules.

A lamellar structure may comprise both surfactants and dumbbell shaped molecules in a z-dimensional nanostructure as illustrated in FIG. 36. In this embodiment, each layer is a z-dimensional nanostructure. One or more of the layers may optionally not be lamellar in the multilayered structures. The pictured z-dimensional lamellar structure comprises a mixture of one or more single chain surfactants and/or dumbbell molecules. Although in this figure each layer is represented by three lamellae, a layer may comprise any number of lamellae.

Thus a single surfactant, or one or more of a mixture of surfactants, used to make membranes in some embodiments of the present invention may be cationic, anionic, zwitterionic and/or nonionic. A single molecule comprising two ionic groups connected by an alkyl or alkane may be used. A single molecule, or one or more of a mixture of molecules, comprising a diol, dicarboxylic acid, diamine, and/or diammonium salt may be used. A mixture of molecules which are any of the following may be used: cationic surfactants, anionic surfactants, zwitterionic surfactants, nonionic surfactants, diols, dicarboxylic acid, diamines, and/or diammonium salts.

In cells, lipid membranes are used to enable selective transport into and out of the cell without the use of external pressure. Below is a summary of the experimentally measured permeability of water (TABLE 2), ions (TABLE 2) and small molecules (TABLE 3) across a lipid bilayer. Without ion channels, water permeates lipid bilayers faster than other ions and molecules. With gramicidin, an ion channel, water and monovalent ion permeability increases, resulting in enhanced separation efficiency of water from molecules and decreased selectivity of water from monovalent ions. The permeability of a membrane containing gramicidin was calculated from the flux (ml/min) of gramicidin at 10% density in a lipid bilayer. For the calculation, the area per lipid (the solvent), one molecule per 0.596 nm$^2$, was used instead of the area per gramicidin (the solute). The area of gramicidin was 10% calculated as 10% of the molecules in the bilayer. The permeability of potassium through the gramicidin containing membrane was calculated by assuming an 8:1 water to potassium ion stoichiometry. Sodium transport was calculated from potassium transport using the well known sodium to potassium conductivity ratio of 0.338.

TABLE 2

|  | Water | Water w/ 10 ml % gramicidin | Potassium | Potassium w/ 10 ml % gramicidin | Sodium w/ 10 ml % gramicidin | Chlorine | Calcium |
| --- | --- | --- | --- | --- | --- | --- | --- |
| Permeability (cm/sec) | 0.025 | 0.27 | $1.51 \times 10^{-10}$ | $3.38 \times 10^{-2}$ | $1.00 \times 10^{-2}$ | $2.80 \times 10^{-8}$ | $8.00 \times 10^{-15}$ |
| Permeability (L M$^{-2}$H$^{-1}$) | 900 | $9.72 \times 10^3$ | $5.44 \times 10^{-6}$ | $1.22 \times 10^3$ | $3.60 \times 10^2$ | $1.01 \times 10^{-3}$ | $2.88 \times 10^{-10}$ |

TABLE 3

|  | Methanol | Ethanol | Butanol | Urea | Glycerol |
| --- | --- | --- | --- | --- | --- |
| Permeability (cm/sec) | $1.20 \times 10^{-5}$ | $3.80 \times 10^{-5}$ | $1.20 \times 10^{-3}$ | $3.40 \times 10^{-6}$ | $6.20 \times 10^{-6}$ |
| Permeability (L M$^{-2}$H$^{-1}$) | 0.432 | 1.37 | 43.2 | 0.122 | 0.223 |

Different transporters may optionally be used to change selectivity. Transporters of interest include, but are not limited to, aquaporin for fast water permeation, chemically modified natural channels, some of which increase water permeability (e.g. desformylgramicidin), and/or chemically modified natural channels, some of which affect selectivity for specific ions and/or molecules (e.g. modified alpha hemolysin). Aquaporin and desformylgramicidin have greater than 100× increased water flux compared to gramicidin A. The difference in permeability of water versus other solutes makes lipid bilayers ideal for separation, particularly for low pressure applications.

Figure 2D:
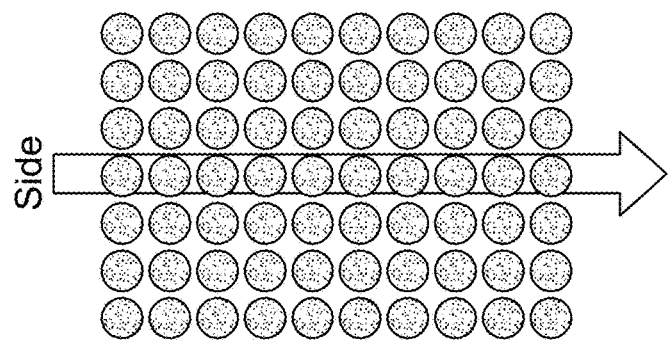
FIGS. 2A-D illustrate how the interstices between surfactant molecules in a hexagonal phase can be used for separation.
Figure 2C:
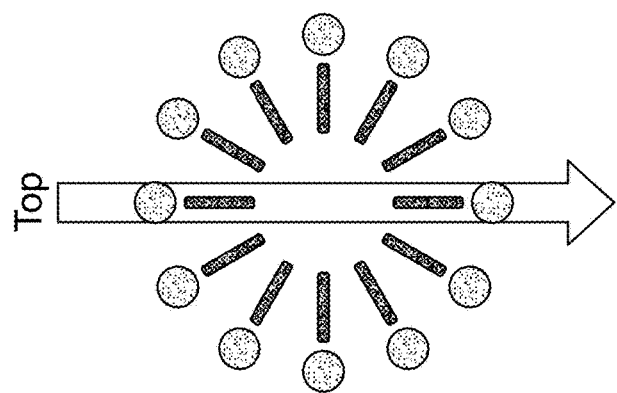
Figure 2A:
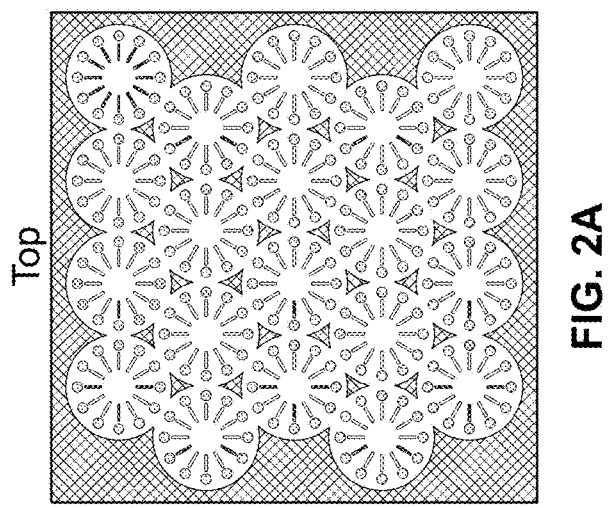
Figure 2B:
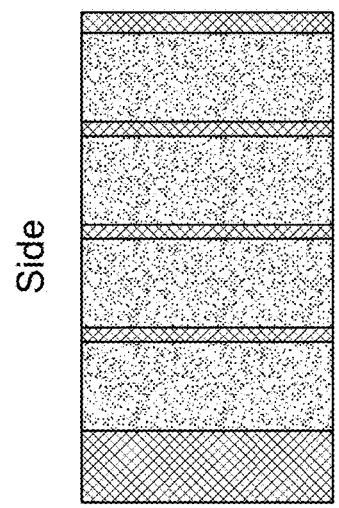

In another class of embodiments of the present invention, stabilized surfactant mesostructures are in either the hexagonal phase or the inverse hexagonal phase. In the hexagonal phase, the surfactants self assemble into a hexagonal lattice of cylinders with surfactant's hydrophobic domains hidden from the hydrophilic interstices' between the cylinders. This structure can be used for separations, as shown in FIG. 2. The hydrophilic domains of surfactants are represented by the stippled gray circles. The hydrophobic domains of the surfactants are represented by stippled black lines. FIG. 2A is a top view of hexagonal packing of the hexagohal phase. FIG. 2B is a side cut view of the hexagonal phase of the surfactants organized in a close packed configuration. In both FIG. 2A and FIG. 2B, the cross-hatched area preferably comprises a solid, non-porous stabilization material, for example silica, an organic polymer, or a polymerizable group on some or all of the surfactants in the mesostructure. FIG. 2C is a top down view of a single surfactant cylinder in the hexagonal phase. The arrows show the path of molecules between the surfactants. During assembly of the material, hydrophobic molecules can be solvated within the cylinder. After assembly, they can remain or be removed. Both methods enable transport through the material. FIG. 2D is a side cut view of one cylinder in the hexagonal phase. The arrows show the path of molecules between the surfactants.

Figure 3D:
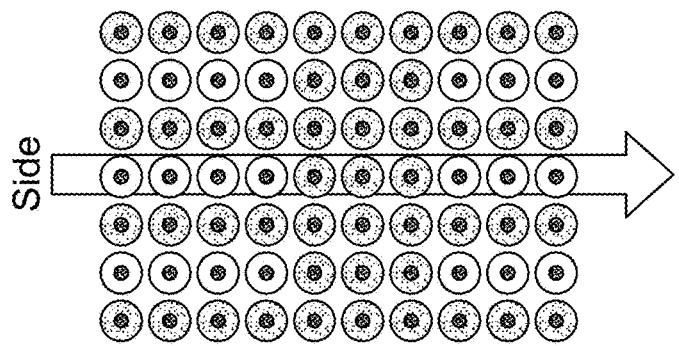
FIGS. 3A-D illustrate how the interstices between surfactant molecules in an inverse hexagonal phase can be used for separation.
Figure 3C:
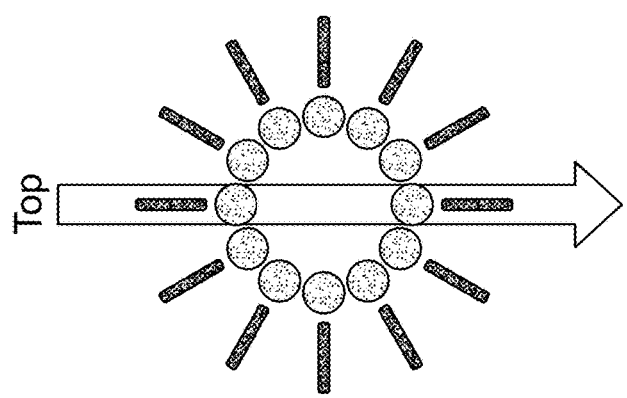
Figure 3A:
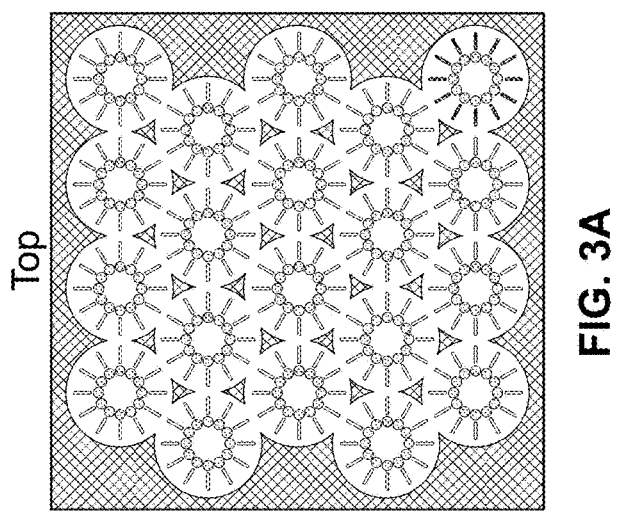
Figure 3B:
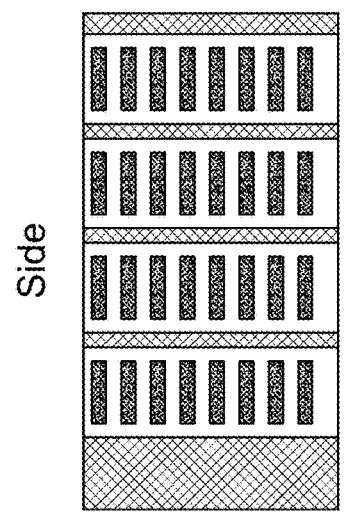

In the inverse hexagonal phase, they self assemble into a hexagonal lattice of cylinders with the surfactant's hydrophilic domains of the surfactants facing inward and the surfactant's hydrophobic domains facing outward from the cylinders towards the hydrophobic interstices. This phase may also be used for separations, as shown in FIG. 3. The hydrophilic domains of surfactants are represented by the stippled gray circles. The hydrophobic domains of the surfactants are represented by stippled black lines. FIG. 3A is a top view of hexagonal packing of the cylinders in the inverse hexagonal phase. FIG. 3B is a side cut view of the inverse hexagonal phase of the surfactants organized in a close packed configuration. In both FIG. 3A and FIG. 3B, the cross-hatched area preferably comprises a solid, non-porous stabilization material, for example silica, an organic polymer, or a polymerizable group on some or all of the surfactants in the mesostructure. FIG. 3C is a top view of a single surfactant cylinder in the inverse hexagonal phase. The arrows show the path of molecules between the surfactants. During assembly of the material, hydrophilic molecules can be solvated within the cylinder. After assembly, they can remain or be removed. Both methods enable transport through the material. FIG. 3D is a side cut view of one cylinder in the inverse hexagonal phase. The arrows show the path of molecules through the surfactant cylinder. Both hexagonal and inverse hexagonal structures allow for the separation of molecules using the inside of the hexagonal cylinder. The size of the pores within the hexagonal cylinder can be controlled by at least two mechanisms. The first mechanism is the choice of surfactant(s) to form the structure. Surfactants cannot perfectly pack to create porosity in the interstices between the hydrophilic surfactant heads or hydrophobic surfactant tails for the inverse hexagonal phase or hexagonal phase, respectively. As a model of imperfect packing, a cetrimonium bromide (CTAB) micelle is roughly 50 Å in diameter but the length of an individual molecule is roughly 20 Å. This suggest a molecule as large as 10 Å in diameter could fit through the micelle. Because a slice of a surfactant cylinder in the hexagonal phase is a two dimensional micelle, it has the same porosity as a three dimensional micelle, 10 Å. Examples of those molecules include linear molecules, for example but not limited to alkanes, alkenes, alkylenes, ethers, and esters, since the terminal methyl group has a diameter of roughly 3.14 Å. In one embodiment, poor packing of the hydrophobic domains can be created by using one or more surfactants with large hydrophilic domains or large and/or branched hydrophobic domains.

The second mechanism for controlling the size of the pores within the hexagonal cylinder is the cylinders within the structure (both hexagonal and inverse hexagonal) solvating a solution during self assembly. The solution may or may not be extracted after self assembly. Simple methods to extract the solvent include but are not limited to evaporation or rinsing after assembly. The amount and chemical composition of the solution defines the pore within the cylinders. For hexagonal phase mesostructures, a hydrophobic solution will be solvated in the interior of the hexagonal cylinders. Examples of hydrophobic solutions are alkanes, esters and ethers. For inverse hexagonal phase mesostructure, a hydrophilic solution will be solvated in the interior of the hex-agonal cylinders. Examples of hydrophilic solutions are water, glycerol, ethylene glycol and other high surface tension solvents and any accompanying solutes.

A single surfactant or a combination of surfactants may be chosen to engineer the selectivity of the surfactant mesostructure. For example, the chain length of the phospholipids has been shown to regulate transport across the membrane. Similarly, cholesterol is known to affect the structure of biological membranes. For example, a one mol to one mol mixture of a single chain cationic surfactant (e.g. CTAB) and an anionic surfactant (e.g Sodium dodecyl sulfate) will form a tight packed lamellar structure because the enthalpic penalty of packing all head groups is reduced due to the charge balance. The result is tighter packing of the surfactants within the lamellar layer compared to lipids. Alternatively, a single or a mixture of surfactants could be used where the headgroups are like charged. The result is a looser packing of the surfactants within the lamellar layer compared to lipids. Size mismatch of surfactants can also be used to affect packing. For example, one surfactant (e.g. dimyristoyl phosphatidylcholine) could have two times the area of the other surfactant (e.g. CTAB). The resulting structure may not be able to achieve a close packed structure do to the imperfect sizes of the molecules. The result of non-close packed structure is lager interstitial pore size between the surfactants enabling greater flux and less selectivity compared to lipids. Many factors affect the final surfactant mesostructure, including but not limited to the ratio of diameters of the surfactant in the structure, the relative concentrations of each of the surfactants, the representative conic shape of the surfactants, the temperature, and the thermodynamics of the assembly of the structure. For example, the packing density of lipids is modulated by the inclusion of cholesterol. Cholesterol is a planar molecule that sits in the interstices of the bilayer, decreasing the interstitial space between molecules. The result is tighter packing of the surfactants within the lamellar layer compared to lipids.

Embodiments of the present invention include methods to create macroscopic defects in surfactant nanostructures. In this class of embodiments, defects are created in the nanostructure during the assembly process. In one embodiment, the film is deposited too fast, creating stripe defects due to wetting instabilities. The size of these defects can be anywhere from about 1 nm to about 10,000 nm.

Embodiments of the present invention include the use of surfactant mesophases other than lamellar, hexagonal, and inverse hexagonal mesophases to perform separations. Single surfactants can form several phases, including but not limited to the lamellar phase, hexagonal phase, cubic phase, inverse cubic phase, tubular phase, and micelle phase. Surfactants can be represented as conic sections. Surfactants have shapes like pie pieces, wedges, and cylinders. The shape and concentration of the surfactant(s) used directly affect the shape of the phase. Furthermore, mixtures of surfactants can be chosen such that surfactants will partition into specific phases. For example, cholesterol preferentially partitions into saturated lipid phase, and inverse cone surfactants (e.g. Didecyldimethylammonium Bromide and Dipalmitoyl Phosphatidylethanolamine) will preferentially partition into the cubic phase. The choice of a mixture of these can result in unique shapes and structures. The resulting surfactant phase can be lamellar, tubular, disordered, cubic, inverse cubic, or any other shape. Surfactants can be stabilized by many techniques. Sol-gel chemistry can be used to stabilize surfactants. Stabilizing chemistries include silica, alumina, and titania formed from chemical precursors. Precursors can be alk-oxy precursors. For example, tetraethyl orthosilicate (TEOS) is a precursor to silica. Surfactants can also be stabilized by polymerizing groups attached to the surfactants. For example, surfactants comprising epoxy groups can be crosslinked to stabilize the mesostructure.

This embodiment of the present invention is preferably not a surfactant templated sol-gel material. Surfactant templated sol-gel materials use surfactant liquid crystal mesophases to create inverse replicas of desirable nanostructures. With surfactant templated materials, the surfactant is removed, typically via calcination at 400° C. Large classes of materials (for example plastics) are destroyed and/or damaged by the extraction protocols required to remove the surfactants. Instead, this embodiment preferably uses retained surfactant mesophases as an active layer to enable separations. Structures no longer require the high temperature, aggressive solvent extraction, and/or oxidation step to remove the surfactant, enabling the use of materials of the present embodiment with plastics.

This embodiment of the present invention preferably uses a unique method to make a self assembled surfactant thin film. Typical surfactant templated sol-gel methods require one hydrophobic compound, one hydrophilic compound, the surfactant and a mixture of water and alcohol as a solvent. The hydrophobic compound typically comprises a metal precursor, i.e. tetraethyl orthosilicate (TEOS). The hydrophilic compound is typically an acid or a base. In contrast, in embodiments of the present invention, use of a hydrophilic compound is not required to form a self assembled surfactant thin film or stabilized surfactant mesostructure.

Free Standing Surfactant-Templated Thin Films

Self assembled surfactant thin films are difficult to assemble on porous films. The challenge with self assembly is that the energy difference between the ordered and disordered states is at most approximately 4.0-5.0 kcal per mol, the energy of a hydrogen bond. For comparison, the pi bond in a carbon-carbon double bond (the bond that is used in many polymer reactions) contains 63.5 kcal per mol. Therefore differences in the thermodynamics of assembly dramatically affect the formation of the final structure. For example, three Kelvin is one percent of the enthalpy of formation. An additional challenge is that the materials are assembled in the solution phase. This presents a challenge when using porous materials since the solution will permeate the material. Once the solution permeates the porous media, the self assembly of the surfactants can be disrupted. Embodiments of the present invention include methods to localize the assembly of surfactant mesophases to prevent their disruption, methods to chemically prepare and/or modify surfaces to enable the creation of surfactant mesophases on desirable materials, and methods to enable the assembly of surfactant mesophases to create desirable structures and materials for all applications, including but not limited to separations.

While embodiments of the present invention include the use of stabilized surfactant mesostructures for separations, the mechanisms, methods, and applications described in this invention area applicable to all self assembled surfactant thin films, including biomimetic thin films, surfactant templated sol-gel materials, hybrid biomimetic sol-gel materials, sol-gel templated thin films, and block co-polymers. The following is a description of other applicable self assembled thin film chemistries.

Embodiments of the present invention involve the self assembly of surfactant templated nanostructures from solution in physical confinement by two or more discreet surfaces and/or on two or more sides, enabling the creation of a unique class of materials which preferably comprise one or more properties of the surfactant templated nanostructure. Example surfactant templated nanostructures can be self assembled via a physical confinement of a templating solution similar to those described by Brinker et al. (U.S. Pat. No. 6,264,741) and references therein. Solutions typically comprise at least one hydrophobic compound, one hydrophilic compound, and at least one amphiphilic surfactant. Classically, as solvent is removed, the solution may exceed the critical micelle concentration of the surfactant to induce the formation of the nanostructure in the physically confined volume. The solution may include initiators which are triggered via external electromagnetic field, temperature, and/or aging. After formation, the material can be washed to remove excess solution or to extract surfactant. Surfactant can also be removed via calcinations. In other words, as solvent evaporates, the silica condenses around the surfactant structure, producing a three dimensional inverse replica of the surfactant phase. This method enables pore sizes to be controlled, which is particularly useful for separations.

Structures formed by biosurfactants, (e.g. phospholipids) (see, for example, U.S. Patent Publication No. 2007/0269662) can be produced in a lamellar phase to block transport or via the incorporation of transport regulating molecules such as ion channels to define the pores of the material, typically without removing the surfactant. This structure is a biomimetic surfactant nanostructure ("BSNS"), which has a surfactant defined structure similar to previously described surfactant templated nanostructures, and optionally comprises the additional function of the surfactant phase partially or completely solvating structures that actively or passive regulate transport ("transporters") across the membrane. By co-assembling these films with components of or into electrochemical cells as electrolytes, they have the potential to reduce 'crossover' of aqueous molecules and/or ions. By assembling these films between Nafion membranes, a free standing surfactant templated membrane can be created. Many molecules, macromolecular assemblies, polymers, proteins, etc are solvated and can act as transporters in a lipid bilayer. Any surfactant(s), including but not limited to natural lipids, may be used including surfactants used to purify proteins, membrane proteins and ion channels. The simple nature of this method enables simple scaling into commercial manufacture and existing post manufacture membrane process. Hierarchical structures produced according to the present invention have applications include optics, separations, fuel cells, energy storage, energy conversion, chemical manufacture, ion exchange, purification, electrochemistry, surface coatings, sequestration, biosensing for medical diagnosis and/or environmental monitoring, chemical and biological warfare agent sequestration, and actuator development. Physical confinement can be used to integrate BSNS's with size exclusion membranes, ion exchange membranes, gas diffusion layers, catalysts and/or other materials used in electrochemical cells, optionally via multiscale self assembly.

Although the use of natural lipids has been demonstrated for surfactant templated nanostructures which include transporters, other surfactants may optionally be used. For example, surfactants already used for purification of membrane proteins have the potential to simultaneously template nanostructures and embed ion channels. Other lipid mimetic surfactants could be used to increase stability, resistance or other physical properties of the resultant nanostructure. Examples of surfactants are Brij, sodium dodecylsuphate, anionic surfactants such as sodium laureth sulfate, perfluorooctanoate, perfluorooctanesulfonate, or sodium dodecyl sulfate, cationic surfactants such as cetyl trimethylammonium bromide, or zwitterionic surfactants such as 1,2-di-O-tetradecyl-sn-glycero-3-phosphocholine. Any zwitterionic surfactant is of particular interest especially if the surfactant spontaneously self assembles into vesicles.

Transporters of interest may comprise either natural or synthetic channels. One or more channels can be included in the surfactant templated nanostructure as transporters to control permeability, transport, and convert molecular gradients into other forms of energy. Channels can be passive to enable passive selective membrane transport (e.g. gramicidin), active to enable membrane transport against free energy potentials (e.g. rhodopsin), active to allow passive membrane transport under selective conditions (e.g. voltage gated channels), and/or active enabling molecular conversion using passive membrane transport (e.g. ATPase). Furthermore, Transporters can work in conjunction when activated by external stimuli including electromagnetic field, pressure, and chemical recognition. Transporters can actively drive transport against free energy gradients. Materials with biomimetic surfactant nanostructures assembled between porous surfaces are of particular interest for dialysis, separations, electrochemical cells, fuel cells, and batteries. These channels can create membranes with sub nanometer pore sizes for a variety of electrolysis applications including fuel cells. Non biological transporters can be included in biomimetic surfactant nanostructures including but not limited to carbon nanotubes. Many molecules, macromolecular assemblies, polymers, proteins, etc are solvated in a lipid bilayer. This class of structures can regulate transport across a lipid membrane via selective regulation of passive diffusion or active regulation. Active enzymes or synthetic variants could be included in the membrane to produce a high voltage batteries, chemo-electric energy conversion, photo-chemo energy conversion, and/or photo-electric energy conversion.

Embodiments of the present invention utilize surface functionalization chemistry to enable and/or enhance the assembly of surfactant mesophases. Surface functionalization chemistry changes the surface property or properties of a material without changing the bulk properties. An example of surface functionalization chemistry is the chemistry to assembly a self assembled monolayer (SAM) of octadecyltrichlorosilane on a silicon wafer. The surface of the wafer becomes hydrophobic but the mechanical and optical properties remain the same. The interaction between the surfactant and the chemically modified surface drives the self assembly and imbues stability to the thin film after assembly. This has been well studied in the assembly of a self assembled monolayer on a solid surface. For example, a single molecular layer of octadecyltrichlorosilane can be assembled on a silicon wafer to make the surface hydrophobic. Previous studies with surfactant bilayers (i.e. supported lipid bilayers) have demonstrated the effect of substrate preparation on the physical properties of the final material. Embodiments of the present invention enable the assembly of surfactant mesophases on solid and porous supports. Typical surface functionalization chemistries include surface grafting, covalent surface modification, surface adsorption, surface oxidation, surface ablation, and surface rinsing. Chemicals can be deposited in the liquid phase and/or the vapor phase. Molecules that can be covalently attached to a surface including but are not limited to silanes, organics, inorganics, metals, and metal oxides. Metal oxides are of interest because they can dramatically increase the surface tension of the material. For example, the assembly of an alkyl silane can make a hydrophilic surface hydrophobic. The surface modification can also enable the ordering and assembly of the surfactants. For example, calcium can enhances the assembly of surfactants; doping calcium into the supporting material can reduce the defects in the surfactant mesophase. For another example, silica can stabilize the hydrogen bonding network of lipids. In one embodiment, surface functionalization chemistry is used to coat a polyethersulfone ultrafiltration membrane with silica. The result is enhanced rejection of solute by the surfactant mesophase assembly, a result of enhanced assembly in the ordered, lamellar phase.

Embodiments of the present invention utilize localization of the assembly of surfactant mesostructures, which is particularly useful for preventing the wetting of a porous surface by a self assembly solution. If the self assembly solution wets the porous surface, the mesostructure may be disrupted. One localization mechanism is to drive the surfactant solution through a phase change at an interface where assembly is to occur using the addition of solvent and/or solute. In one embodiment, the porous material is first substantially saturated with an aqueous solution (Solution 1). Second, a self assembly solution comprising TEOS, dimyristoyl phosphatidylcholine (DMPC), ethanol and water (Solution 2) is deposited on the surface. DMPC is preferably in the gas phase in Solution 2 as it is deposited on the surface. Solution 1 and Solution 2 mix at the surface of the porous material. The DMPC is driven to the lamellar phase due to the increase in water concentration. In this embodiment, the self assembly of DMPC is preferably visualized by the solution rapidly increasing in viscosity and opacity. This process enables rapid self assembly and can be repeated to assemble multiple layers. For example, after the deposition of Solution 2, another coating of Solution 1 followed by Solution 2 could be applied.

Figure 4:
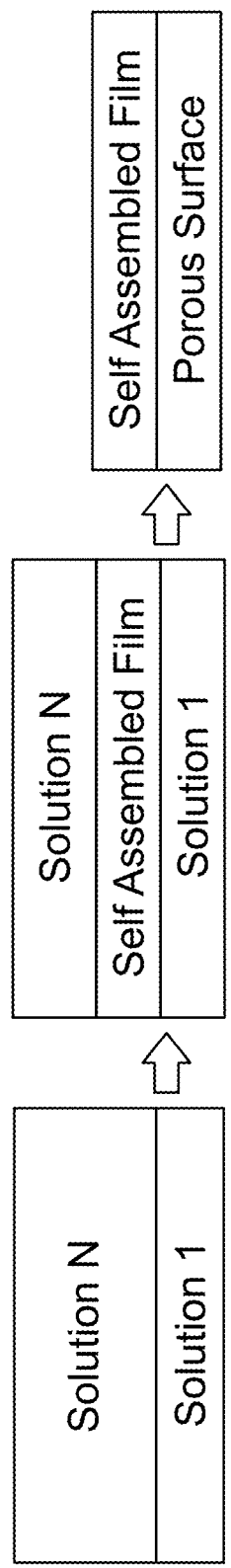
FIG. 4 illustrates a process to localize surfactant mesophase thin film self assembly to the surface of a porous material. The result is a freestanding surfactant mesophases material adhered to a porous material.

This mechanism is illustrated in FIG. 4. The porous support is wet by a solution (Solution 1). A subsequent Solution (Solution N) is introduced. Surfactants in Solution 1 or Solution N are driven through a phase change by the addition of Solution N and/or Solution 1 respectively. After the assembly at one or more levels of the solute, a second set of solutions (Solution 1 and Solution N) can be introduced to repeat the process and/or add additional coats. Surfactant mesophase self assembly occurs at the interface between Solution 1 and Solution N. The final material is a free standing hierarchical material, preferably adhered to a support, that has some or all of the properties of both the self assembled surfactant mesostructure and the support. This technique is particularly useful for assemblies on porous supports. Examples of such properties that may occur in the resulting material include control of transport of ions and molecules, increase thin film durability, and/or protection and/or encasement of thin films with well known antimicrobial nanoparticles.

In one embodiment, a porous membrane is wet with a polar solvent. In this embodiment, the polar solvent is Solution 1. The polar solvent may comprise water, ethylene glycol, glycerol or a mixture thereof. The polar solvent may or may be acidic or basic. Subsequently, an aliquot of self assembling solution in organic solvent is deposited. In this embodiment, the organic solvent is Solution N, which preferably comprises surfactants. In this specific embodiment, Solution N comprises 5 wt % tetraethyl orthosilicate (TEOS), 1 wt % DMPC in organic solvent. The organic solvent may comprise, but is not limited to, one or more alchohols, alkanes, esters, ethers, or a mixture thereof. At the interface of the two solvents, the surfactant is driven through a phase transition to form a surfactant mesostructure by the presence of Solution 1. Finally, the solvents evaporate driving the assembly of silica to stabilize the surfactant mesostructure at the interface between Solution 1 and Solution N. FIG. 5 illustrates a slab model of the structure, a schematic of the structure, and a images of a hydrophilic Teflon membrane before (LEFT) and after (RIGHT) interfacial assembly.

The assembly within the self assembled film and the assembly of the thin film with a porous surface make this a multiscale self assembled material. As shown in FIG. 5, on the microscale is the assembly of the two films A and B. In this embodiment, A is a nanostructured thin film and B is a porous membrane. On the nanoscale is the assembly of alternating lamella of silica and lipid bilayers illustrated in both A and enlarged in C. Within the lipid bilayer is an optional ion channel, gramicidin (the beta ribbon structure in C). In the photograph, the left side is a membrane before coating and on the right side is a membrane after coating. The membranes are hydrophilic PTFE with 0.1 micron pores and are nominally 47 mm in diameter. The membrane on the right is tinted yellow from the natural color of the lipids, Soy PC (95%) from Avanti Polar Lipids (Alabaster, Ala.), used in the embodiment described above.

Other methods can be used to localize the self assembly. Self assembly can by induced through changing one or more thermodynamic variables including temperature, pressure, volume and/or the number of molecules and/or by the application of electromagnetic field. External stimuli including optical energy, ultraviolet light, electrophoretic fields, and/or alternating current electric fields may direct the assembly to align molecules, pores, or channels. Both optical and electrical external fields can direct the assembly of model, colloidal systems.

Figure 37:
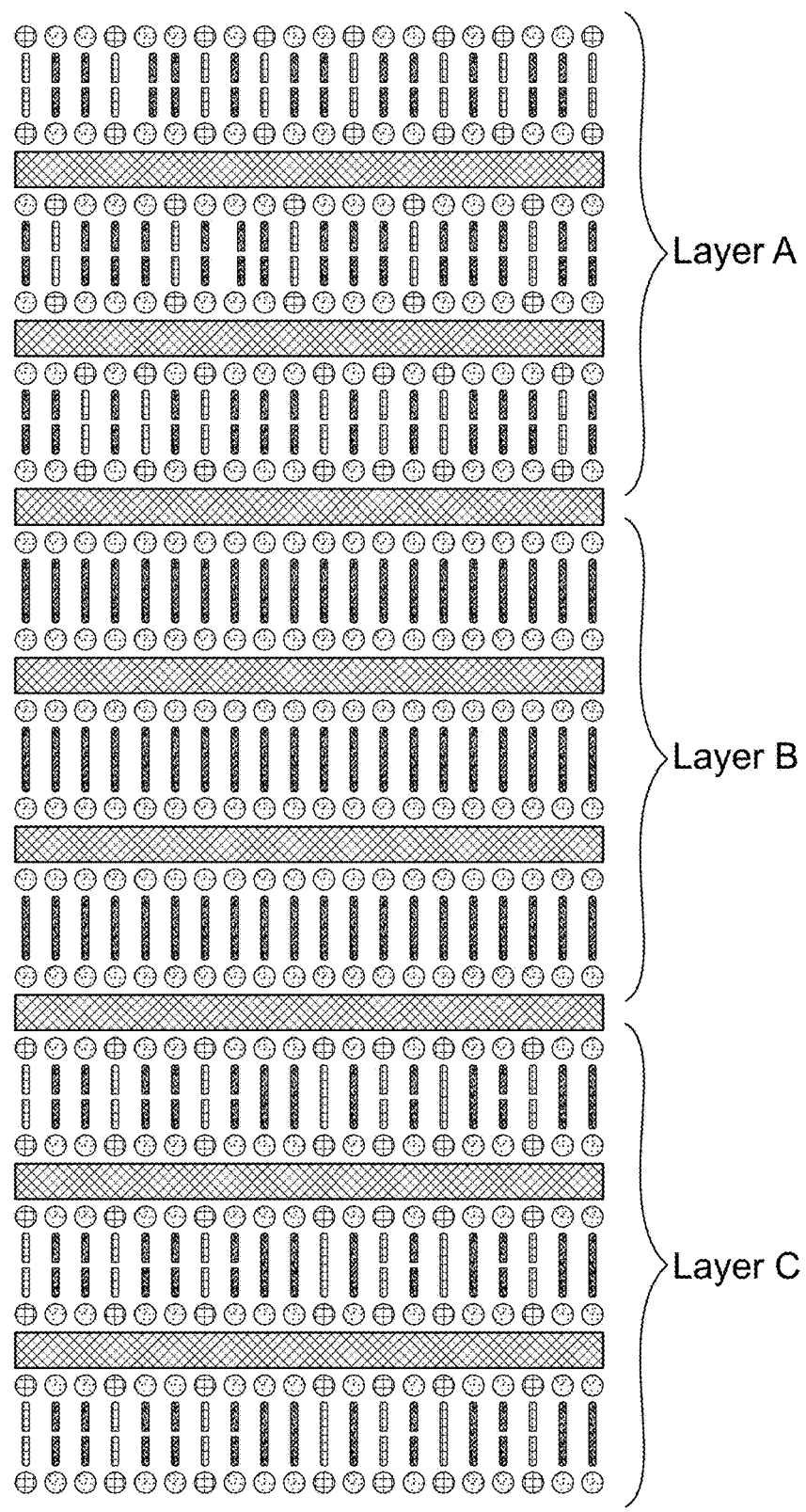
FIG. 37 depicts an embodiment of a lamellar structure with three layers of distinct self assembled material.

An additional layer can be deposited on a precursor layer or layers. Those layers can be cured. The additional layer can be symmetric or asymmetric. A primer layer may be used to enable improved assembly of the second layer. An embodiment of such a structure is presented in FIG. 37, which depicts an embodiment of a lamellar structure with three layers of distinct self assembled material. In this embodiment, each layer is a z-dimensional nanostructure. One or more of the layers may optionally not be lamellar in the multilayered structures. Layer A is a z-dimensional lamellar structure comprising a mixture of single chain surfactants. Layer B is a z-dimensional lamellar structure comprising a single dumbbell shaped molecule. Layer C is a z-dimensional lamellar structure containing a mixture of dumbbell molecules and single chain surfactants. Although in this figure each layer is represented by three lamellae, a layer may comprise any number of lamellae. One method to create such a structure is to assemble a single self assembled layer via any method, including the ones described herein, cure the layer, then deposited another layer of any composition, including the compositions described herein, via any method, including those described herein. This process can be repeated as many times as desired.

Physical Confinement Manufacturing Methods

Embodiments of the present invention utilize physical confinement of a surfactant self assembly solution which preferably simultaneously templates the film structure, drives film assembly, and assembles the thin film with the surfaces used for physical confinement resulting in a single unique material. During physical confinement based self assembly, both multiscale assembly and hierarchical assembly can occur. In embodiments of the present invention, there can be many scales of assembly, such as self assembly on the nanoscale within the nanostructured thin film and self assembly on the macroscale between the nanostructured thin film and the surface(s) used for physical confinement. In embodiments of the present invention, there can be many levels of assembly including intermolecular assembly (e.g. surfactant-surfactant assembly), molecular assembly (e.g. silica condensation), material assembly (e.g. the thin film assembling with the surfaces), the assembly based upon interaction of the surfactant with the solvent, and the assembly based upon the interaction of the surfaces with the self assembly solution.

The interplay of the physical and chemical topology of the confining surfaces, the method used to induce assembly, and the mixture of the self assembling solution all can determine the final structure of the material. Unique classes of surfaces can be integrated with surfactant template nanostructures via the present invention, including but not limited to surfaces comprising one or more of the following characteristics: solid, porous, chemically layered (e.g. a thin film self assembled on a surface or a chemical spin coated on a solid surface), physically layered (e.g. one or more surfaces on top of a solid surface), comprising macroscopic features, comprising microscopic features, comprising non-radially symmetric surfaces, an inability to form a stable meniscus, more than two dimensions of physical features, and/or non homogeneous surface chemistry. Surfaces used for assembly can be designed for modification and/or removal after assembly without destroying the remaining material such that surfaces can be removed after assembly without complete annihilation of the material. Embodiments of the present invention preferably comprise robust methods to rationally design, simultaneously assemble, template and integrate surfactant templated nanostructures. Hierarchical assembly can produce materials in a single step that normally would require multiple steps, e.g. membrane electrode assemblies, sensors, or switches.

Two important aspects of the assembly of self assembled surfactant thin films on porous plastic supports are the surface functionalization chemistry of the support and the interfacial polymerization method. Taken together with the physical confinement method, these enable the formation of the final material, a self assembled surfactant thin film at the surface of a porous plastic support.

Embodiments of surfactant mesophases of the present invention can perform separations. The assembly method and the resulting biomimetic surfactant nanostructure are illustrated in FIG. 6. In this embodiment, two membranes or porous surfaces are prepared as supports for a self assembly solution using one of a variety of protocols, which are defined under "Material Preparations" in the examples section. Protocols of importance include but are not limited to surface cleaning with solvents, surface oxidation, and/or surface chemical deposition. The material was composed of two PES membranes integrated with a biomimetic surfactant templated sol-gel thin film. Two polyethersulfone (PES) membranes were soaked in 18.2 MΩ water then placed on two different planar Teflon pieces, used for physical confinement. An aliquout (~500 ul) of 10 wt % of 10 mol DLPC: 1 mol gramicidin in stock silica solution was dispensed via micropipette on one of the PES membranes. The second Nafion membrane backed by Teflon was used to sandwich the BSNS solution between the two membranes, as shown in FIG. 6A. The pieces were allowed to sit together in contact. Samples were dried at room temperature for greater than one hour before being heated to 80° C. for over 3 hours. Finally, to model the assembly of a membrane electrode assembly, some samples were heated to over 130° C. for 15 minutes.

Figure 6B:
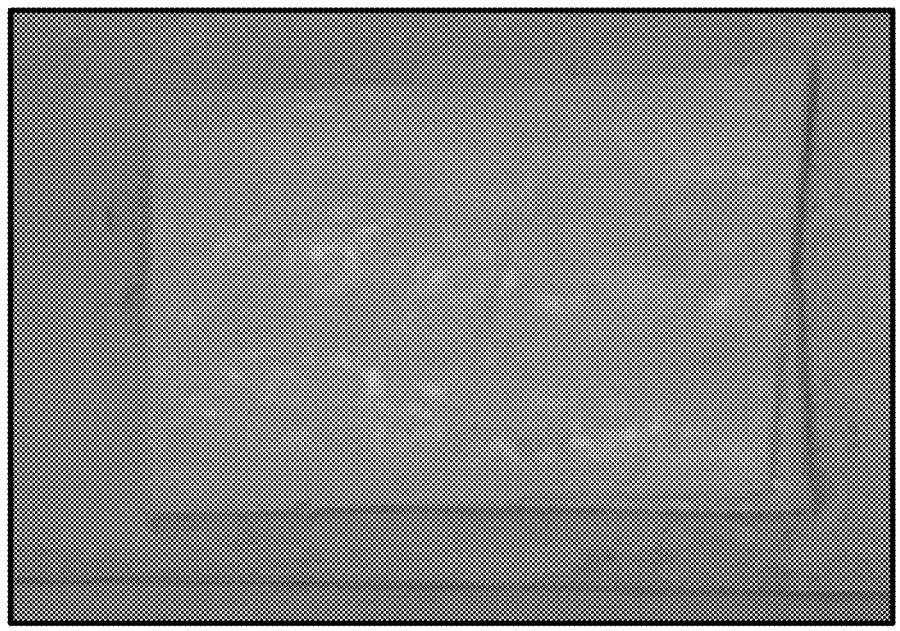
FIGS. 6A and B illustrate the physical confinement method used to create the displayed free standing surfactant templated membrane.
Figure 6A:
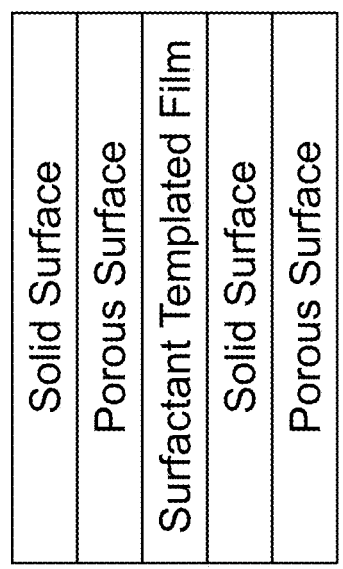

After cooling the samples slowly, the Teflon materials were removed to produce free standing membranes, as shown in FIG. 6B. In this embodiment, Teflon was used for physical confinement. Alternatively, any solid surface can be used, including metal, plastic, ceramic, glass, and organic (e.g. wood). The membrane is 4 cm×4 cm. The confinement simultaneously drives assembly and integrates the resultant film with the physical confining assembly.

Figure 7:
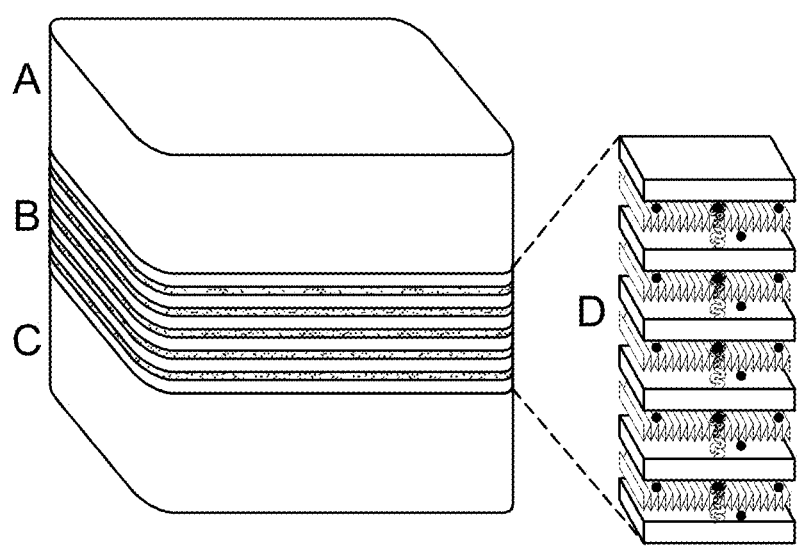
FIG. 7 is a schematic of a biomimetic surfactant nanostructure assembled via physical confinement.

FIG. 7 is a schematic of the resulting biomimetic surfactant nanostructure structure in this embodiment: two supporting porous materials sandwiching a lamellar nanostructure with alternating silica layers and lipid bilayers. The material is a multiscale self assembled material. Microscale assembly is of the three films (A, B, and C). In this embodiment, A and C are porous membranes and B is a nanostructured thin film. Nanoscale assembly is the lamellar alternating silica layers and lipid bilayers (B and D). Within the lipid bilayer is the ion channel, gramicidin (the beta ribbon structure in D). Alternatively, only one of supporting porous materials (A or C) may be used.

Physical confinement also enables the use of roll coating. A self assembly solution is sandwiched between a porous support material and a cylindrical roller. The temperature of the roller can be controlled to control the evaporation rate of the solution. The solution can be directly applied to the roller. The roller can be applied more than once to the self assembly solution on the porous material. The roller can push or pull the support material through one or more process steps. The sandwich enables an even deposition of material on the porous support material.

FIG. 8 shows a several different physical confinement methods: confinement by two solid surfaces (A), confinement of the self assembly solution and two porous materials (B) and a prototype high-throughput device and system to assemble many materials with unique chemistries simultaneously (C). The high-throughput device is a Teflon plate with holes in it and a solid piece of Teflon sandwiched a piece of Nafion. Surfactant templating solution was added to each well followed by a Nafion membrane and a piece of Teflon such that the Nafion was supported by Teflon. The material was self assembled in physical confinement using a multistep drying protocol. After assembly, the setup was disassembled to retrieve the new, freestanding membrane material. The central images of FIGS. 8A-8C are of the system during assembly. The bottom images of FIGS. 8A-8C are of the disassembled structure after assembly of the material.

FIG. 8 illustrates several different examples of physical confinement of surfactant templated sol gel solution and the resulting materials. A surfactant templated sol gel solution was deposited on a freshly oxidized silicon wafer. Afterwards, a silica coverslip with a self assembled monolayer of octadecyltrichlorosilane was used to sandwich the solution between the two discreet surfaces. Once drying was complete, a thin film remained on the surface after the removal of the coverslip. FIG. 8A shows a hydrophobic and a hydrophilic surface sandwiching a surfactant templated sol gel solution. After drying the film, the hydrophobic surface was removed. The images are of the film after removal.

FIG. 8B shows a schematic of another embodiment of a physically confining "sandwich". To assemble the membranes, two Nafion membranes were soaked in silica precursor solution then placed on two different planar Teflon pieces. An aliquout (~100 μl) of 5 wt % BSNS solution was dispensed via micropipette on one Nafion membrane. The second Nafion membrane backed by Teflon was used to sandwich the BSNS solution between the two membranes. (Alternatively, in other embodiments the membranes may be supported by any solid surface or gas diffusion layers (GDLs) on a solid surface.) The surfaces were held together by alligator clips. Samples were allowed to dry at room temperature for greater than one hour before being heated to 80° C. for over 3 hours. Finally, to model the assembly of a membrane electrode assembly, some samples were heated to over 130° C. for 15 minutes. After cooling the samples slowly, the Teflon surfaces were removed to produce free standing membranes.

The resulting membrane was stable to shear forces that are generated by rubbing the membrane with two fingers and to any strain forces induced by peeling with tweezers. No precautions were necessary to prevent the membranes from being damage during in typical laboratory typical of a Nafion membrane. The center image is of a typical sample membrane without the surfactant in the templating solution after assembly. The final material is a translucent white. The bottom image is of a representative free standing BSNS after assembly with the surfactant in the templating solution. The membrane has a yellow color unique to lipids assembled into a BSNS in physical confinement. Lipids evaporated on a surface do not yellow after a similar heat treatment. Due to the comparable periodicity of the surfactant templated nanostructure and the wavelength of visible light, the yellow color is likely a result of scattering from the lamellar nanostructure. These membranes were stable despite dehydration, up to 130° C. heat treatment, and pressure treatment via two solid surfaces and alligator clips.

FIG. 8C shows a modification of FIG. 8B, illustrating a prototype high-throughput device and system to assemble many materials with unique chemistries simultaneously. A Teflon plate with holes in it and a solid piece of Teflon sandwiched a piece of Nafion. Surfactant templating solution was added to each well followed by a Nafion membrane and a piece of Teflon such that the Nafion was supported by Teflon. The material was self assembled in physical confinement using a multistep drying protocol. After assembly, the setup was disassembled to retrieve the new, freestanding membrane material. The center image is of the system during assembly. The bottom image is of the disassembled structure after assembly of the material.

Figure 9A:
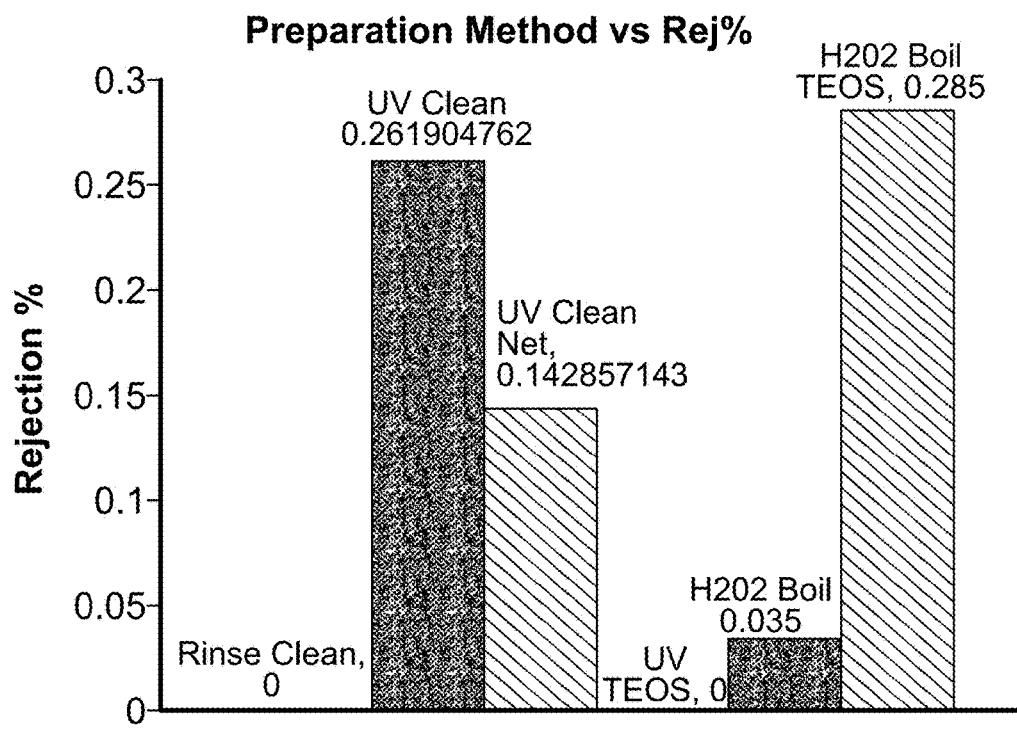
FIG. 9A illustrates the effect of membrane material surface chemistry preparation on the rejection levels of the resultant material.
Figure 9B:
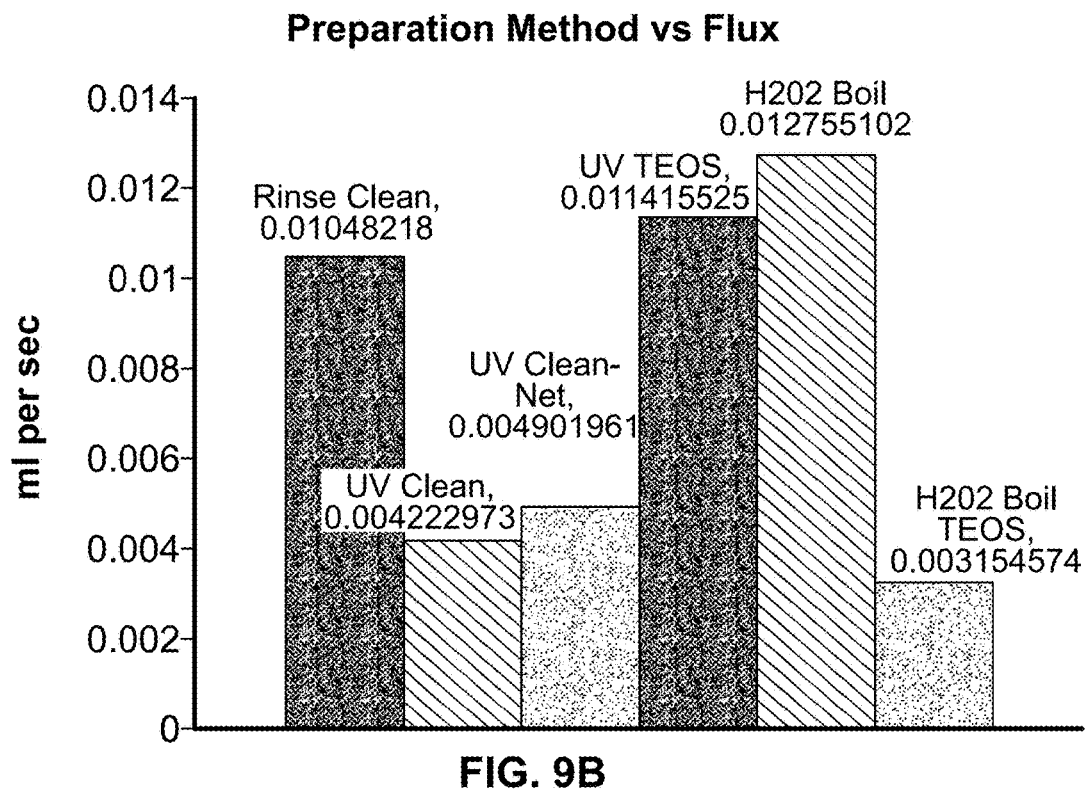
FIG. 9B illustrates the effect of membrane material surface chemistry preparation on the flux levels of the resultant material.

The following embodiments of the present invention demonstrate how surface functionalization chemistry enhances the assembly of the surfactant mesostructure, which can be observed by the improved rejection of solute. The surfactant mesophases are used as reverse osmosis membrane to separate methanol from water. FIG. 9 shows the effect of surface preparation techniques versus the flux and methanol rejection of the membrane. Here, performance is defined by two metrics: methanol rejection percentage and solution flux. Methanol rejection percentage is one minus the ratio of the permeate methanol concentration to the feed methanol concentration. The rejection percentage of 25% v/v methanol (Rej %) as a function of the Preparation Method of the porous surfaces used to support the free standing surfactant templated thin film is shown in FIG. 9A. Solution flux is the volume of solution per time for constant area through the membrane, shown for each preparation method in FIG. 9B. Three representative methods were examined: chemical cleaning (Rinse Clean), surface oxidation (UV Clean and $H_2O_2$ Boil), chemical deposition (TEOS), and combinations thereof. In this embodiment, the self assembly solution contained 10 wt % of 10 mol DLPC: 1 mol gramicidin in stock silica solution. In this embodiment, the self assembly solution was sandwiched by two 0.03 micron polyethersulfone (PES) membranes. The effective area of the membrane was 1.13 cm². Separations were performed at 5 PSI. Methanol separation was not observed in control experiments with the stock PES membranes. Because the pore size of a PES membrane (30 nm) is much greater than the diameter of methanol (0.41 nm), rejection of methanol was not expected. Rejection of methanol (FIG. 9 samples: UV Clean UV Clean Net, $H_2O_2$ Boil, $H_2O_2$ Boil TEOS) demonstrates the surfactant mesophase membrane's ability to perform a small molecule reverse osmosis separation.

Figure 10:
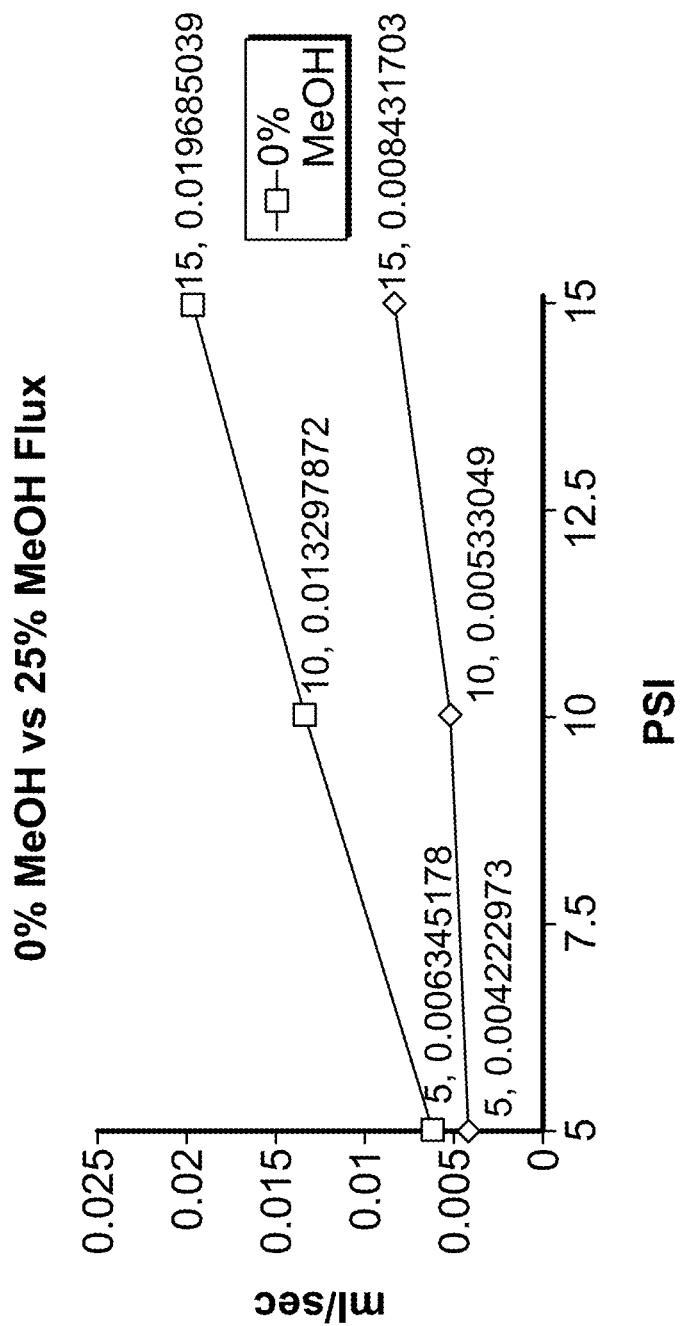
FIG. 10 shows the effect of concentration polarization of methanol on the flux through a biomimetic surfactant nanostructure.

Furthermore, FIG. 10 compares the flux of pure water and 25% w %/w % methanol in water through a single free standing biomimetic surfactant mesophase membrane, assembled from a 10 lipid wt % solution comprising 10:1 DLPC to Gramicidin between two PES membranes prepared using UV clean, at 5 psi-15 psi. The >50% reduction in the flux of the 25 w %/w % methanolic solution vs. pure water flux at all pressures is a result of concentration polarization, an increase in solute (methanol) concentration at the membrane surface due to the selectivity of the membrane for water. Furthermore, as the flux increases with pressure, the relative difference between the flux of 25% w %/w % methanol solution and pure solvent (18.2 MΩ water) increases. This is expected since the effects of concentration polarization are a function of membrane flux; that is, more methanol is accumulated at the surface when the flux of the solution through the membrane increases.

Embodiments of the present invention use the conformal coating of self assembled surfactant thin films on hollow fiber membranes. Ultrafiltration and microfiltration membranes can be constructed as hollow cylinders. In the wall of the fiber are pores typically ranging in size from about 30 nm to hundreds of microns. In one embodiment, a hollow fiber is coated with silica using the H2O2 Boil TEOS method. The fiber is then rinsed with water. Afterwards, the fiber is filled with surfactant self assembly solution. After filling the fiber with surfactant self assembly solution it is sealed at both ends. The solvent is allowed to evaporate through the pores of the membrane. After heating for one day in an oven at 80° C., the inside of the fiber is preferably rinsed with water. The inside of the fiber is coated by the surfactant self assembled thin film.

Materials constructed in accordance with embodiments of the present invention preferably integrate a self assembled nanostructure and/or thin film with surfaces used for confinement; the resulting material then preferably has some or all of the properties of both the self assembled nanostructure and the surfaces. Examples of such surface properties that may occur in the resulting material include control of transport of ions and molecules, increase thin film durability, and/or protection and/or encasement of thin films. Surfaces used for assembly may be removed or modified after assembly without annihilating the material.

Although theory suggests that surfactant templated nanostructures can produce useful structures for separations, the challenge of defect free assembly has prevented them from being so used. By employing one or more membranes to physically confine a surfactant templated nanostructure self assembled solution, the resultant selectivity of the final material can be a composite of the integrated membrane(s) and the nanostructured thin film. In one embodiment, a biomimetic thin film with high conductivity and high selectivity can be assembled on a Nafion film. Because of the thin nature of the film, the conductivity of the thin film is negligible compared to Nafion. The structure of the film makes the conductivity of other ions more difficult. The biomimetic thin film is a z-dimensional crystal of lipid bilayers and sol-gel silica. Within each lipid bilayer is an ion channel, gramicidin. Because of the combined resistance of the resultant material, a short circuit through the membrane caused by a pinhole defect in the biomimetic film is not possible. Furthermore, the final material can be free standing, e.g. it can be handled, moved, manipulated and applied without additional the need for special techniques and/or equipment. Hierarchical structures produced in this method have applications in optics, separations, fuel cells, electrochemistry, surface coatings, sequestration, biosensing for medical diagnosis and/or environmental monitoring, chemical and biological warfare agent sequestration, and actuator development.

There are many different configurations to physically confine a surfactant templated sol gel solution, such as those comprising self assembly of model colloidal systems. One configuration of physical confinement is introducing a surfactant self assembly solution between two or more discreet surfaces. One example is a surfactant sol gel solution sandwiched between two planar surfaces. One configuration of physical confinement is introducing a surfactant self assembly solution into a volume that has two or more sides. An example is a single folded surface, which has three interior sides: the top surface, the bottom surface, and the surface of the fold. Another configuration is the physical confinement of a self assembly solution by a single surface with three dimensional topography, such as surfaces with no symmetric axes, molded surfaces, microfabricated surfaces, or etched surfaces. In this example, the sides of the single three dimensional surfaces confine the surfactant templated sol gel solution.

Figure 11A:
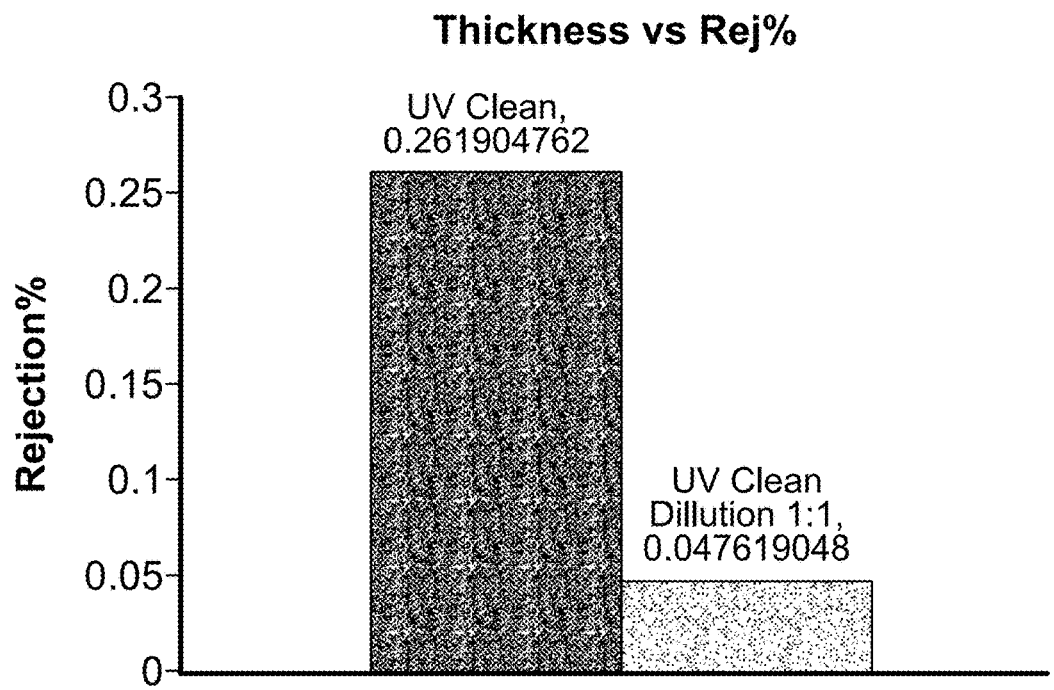
FIG. 11A shows the lesser methanol rejection of a membrane produced with a diluted self assembly solution as compared to a membrane produced with a stock assembly solution.
Figure 11B:
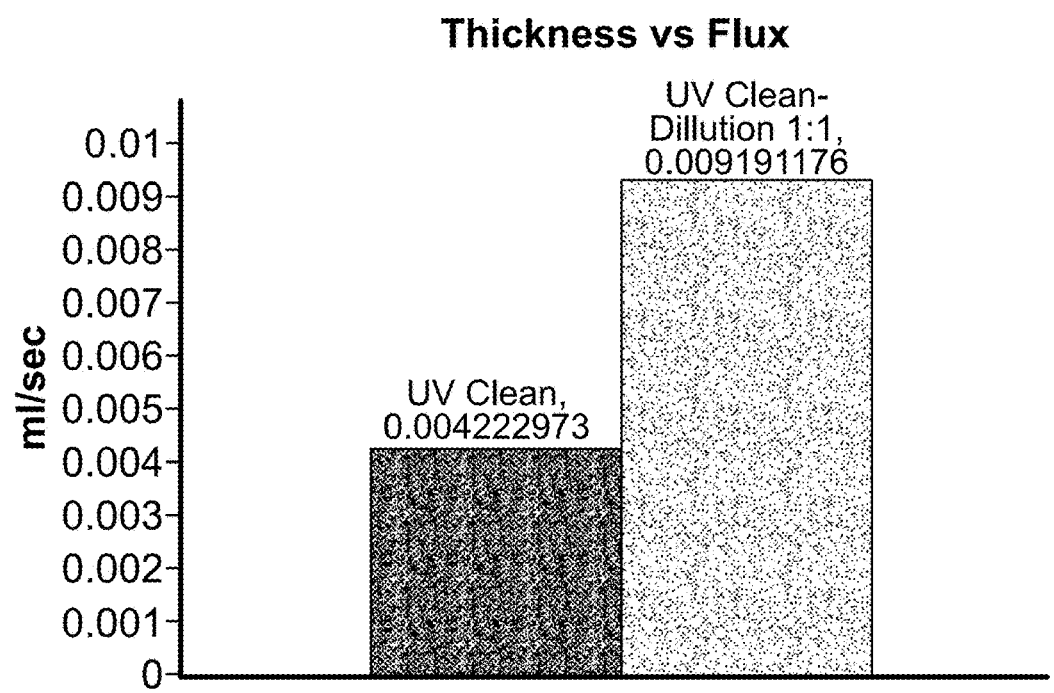
FIG. 11B shows the greater solution flux of a membrane produced with a diluted self assembly solution as compared to a membrane produced with a stock assembly solution.

In FIG. 11, BSNS membranes prepared from a stock and a diluted self assembly solution are compared. The stock membrane was prepared with a typical lipid solution 10 wt % of 10 mol DLPC: 1 mol gramicidin in stock silica solution. A dilute membrane was prepared with a typical lipid solution 10 wt % of 10 mol DLPC: 1 mol gramicidin in stock silica solution diluted 1:1 v %/v % with ethanol. Both membranes were assembled between two PES membranes prepared via UV Clean. The effective area of the membranes was 2 cm². With a lower concentration of BSNS self assembly solution and constant area of the supporting membrane and constant volume of the self assembly solution, there is less material to assemble into the BSNS film. The membrane produced with the diluted self assembly solution (UV Clean Dilution 1:1) behaves likes a thinner membrane compared to the membrane produced with the stock self assembly solution: it has lesser methanol rejection (FIG. 11A) and greater solution flux (FIG. 11B) than a 10 wt % of 10 mol DLPC: 1 mol gramicidin in stock silica solution assembled between two PES membranes prepared via UV Clean (Standard Biomimetic surfactant nanostructure).

Figure 12:
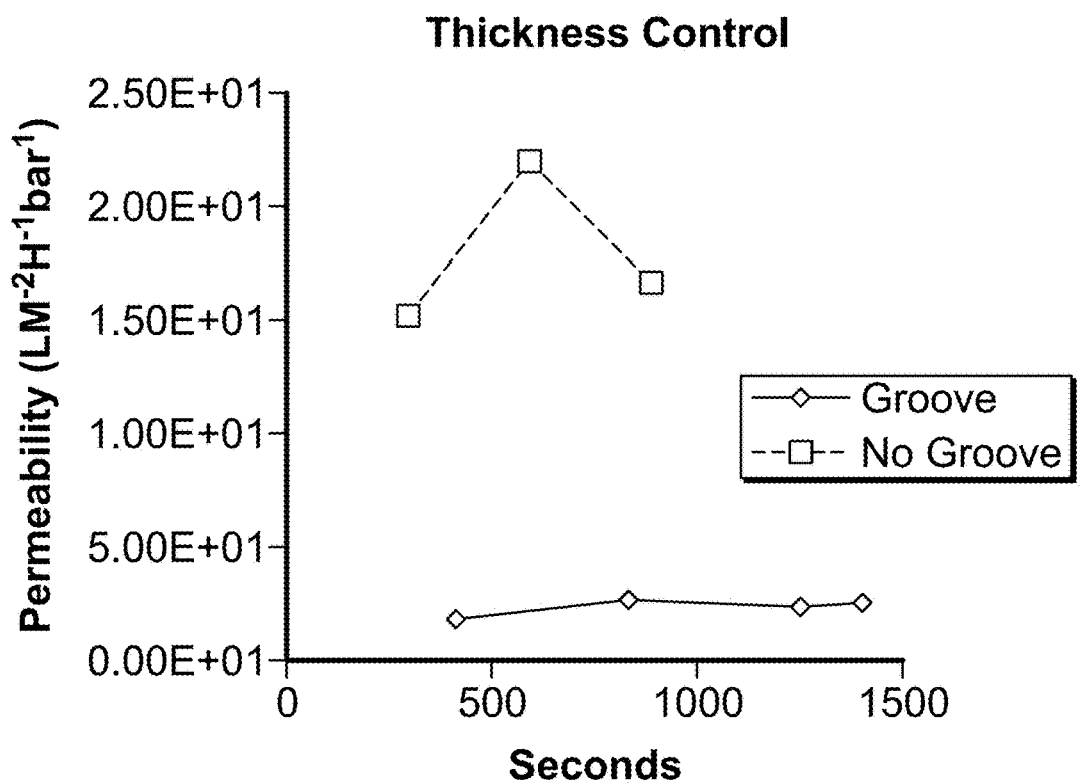
FIG. 12 shows membrane thickness control via physical confinement and its effect on permeability.

In one embodiment of the present invention, the thickness of the resultant thin film is controlled by physical confinement of the membrane in a groove. A one dimensional cell is constructed preferably comprising at least one linear groove running the length of the cell. The membrane preferably sits flat at the bottom of the groove. The membrane is preferably first coated with water. Then, surfactant self assembly solution is placed on the membrane. The volume of the solution is preferably chosen such that it exceeds the height of the groove. The excess volume is then preferably removed with a blade, a straight edge and/or a roller. The thickness of the final film is determined by the depth of the groove and the solids contents of the surfactant self assembly solution. FIG. 12 shows the decrease in permeability of a membrane self assembled in physical confinement with a linear groove (Groove) compared to a membrane self assembled in physical confinement between a roller and a flat piece of Teflon (No Groove). Two 20 wt % DLPC solution were self assembled on a UV Clean 0.1 micron PES membrane. The solution was self assembled using the interfacial method and by physically confining the solution between a roller and the porous membrane. Before assembly, one membrane was placed at the bottom of a groove. The depth of the groove was half a millimeter. The result was an increase in the volume of self assembly solution that coated the membrane. The membranes were loaded into a dead end cartridge. The water permeability was measured at 5 PSI. When the water permeability was measured, the material that was assembled in the groove had a lower permeability than the material assembled on a flat surface. The increase in confining volume of the membrane self assembled in a groove results in a thicker stabilized surfactant mesostructure thin film. The increase in thin film thickness results in decreased thin film permeability.

One potential confinement scheme comprises a surfactant templated thin film assembled into complex three dimensional geometries, such as the self assembly of colloids in physical confinement where one or more surfaces has asymmetric three dimensional topology (Yang et al, "Opal chips: vectorial growth of colloidal crystal patterns inside silicon wafers", Chem. Commun. 2000, 2507-2508). For example, a surface can be a molded polydimethylsiloxane (PDMS) surface with three dimensional topology, or alternatively an etched silicon wafer. The surfactant templated nanostructure preferably assembles preferentially in the groves due to solvent evaporation from between the sides of the three dimensional solid surface(s). This scheme templates and integrates the surfactant templated nanostructure with a three dimensional surface. Some embodiments comprise localize assembly within channels, and/or nanoscale patterns for microfluidic and optical applications, This architecture preferably gives the thin film the stability of the solid surface and the access to through transport that is not possible with other assembly methods. The preferable result is a multiscale self assembled material for which the surfaces protect and scaffold the nanomaterial and the nanomaterial adds a new functionality. Another physical confinement scheme combines chemical patterning with physical confinement to enable self assembly and patterning of the surfactant templated nanostructure. This scheme has been demonstrated to self assemble and pattern model colloidal systems (Brozell et al., "Formation of Spatially Patterned Colloidal Photonic Crystals through the Control of Capillary Forces and Template Recognition", Langmuir, 21, 2005, 11588-11591). In this scheme, the thin film assembly is driven by the physical confinement of two surfaces. One or more moieties on the chemically patterned surface(s) cause the thin film to be unstable. Post assembly, the thin film is destroyed in the unstable regions. In one example, a thin film could be assembled between a patterned wettability surface and a hydrophilic surface. There are many methods to pattern surface wettability. One example is to create a uniformly hydrophobic surface using a hydrophobic self assembling silane then selectively remove the silane with deep UV lithography. Two examples of hydrophobic silanes are octadecyltrichlorosilane ($CH_3(CH_2)_{17}SiCl_3$, OTS) (90% Aldrich) and fluoroalkyltrichlorosilane ($CF_3(CF_2)_{10}C_2H_4SiCl_3$, 1,1,2,2, tetramethylene fluorodecyl tricholorosilane, FDTS). They are assembly by allowing a freshly oxidized surface to incubate in 2.5 mM solution (100 ml vol.) with anhydrous hexadecane (99% Sigma-Aldrich) or HPLC-grade toluene (99% Sigma-Aldrich) is preferably used as the solvent. All silanisation reactions are preferably carried out in glass containers under nominally dry ambient conditions (relative humidity<20%). After 60 min incubation, samples are preferably removed from the solution, the surface is rinsed extensively with chloroform and acetone, and dried under a stream of nitrogen. Silanes are preferably lithographically removed via a combination of short-wavelength UV lithography (187, 254 nm) using an ozone-generating medium pressure Hg lamp (UVP, Inc) enveloped in quartz sheath and a quartz lithographic mask with chrome features. Other methods for patterning wettability include micro contact printing. Patterned surfaces include those surfaces displaying a pattern of electrodes.

This invention enables the assembly of self assembled thin films technologies, including but not limited to stabilized surfactant mesostructure thin films and surfactant templated sol-gel thin films, on many surfaces unable to be used with standard techniques of dip coating and spin coating. Many surfaces can be used for physical confinement, such as Teflon, plastic, acrylic, Nafion, ceramic, silica, silicon, a semiconductor, an oxide, gold, glass, metal, polymers, poly di-methyl siloxane (PDMS), molded polymers, membranes, poly carbonate membranes, size exclusion membranes, ion exchange membranes or graphite. These surfaces can be planar, radially or spherically symmetric (e.g. ball bearings), cylindrically symmetric (e.g. rollers), have two dimensional physical and/or chemical topology, and/or have three dimensional physical and/or chemical topology. A surface may be a roller or a press used in manufacturing. Surfaces can be layered, including one or more chemical and/or physical layers. Chemical layers include but are not limited to self assembled layers, physically absorbed layers, and deposited layers (e.g. Langmuir Blodgett assembled layers or spin coated layers). Physical layers include but are not limited to: microporous surfaces, macroporous surfaces, layers with desirable electrical properties, and layers with desirable optical properties.

Porous surfaces, such as Nafion (of any thickness, including but not limited to Nafion 117), ion exchange membranes, carbon felt, carbon cloth, cellulose membranes, poly amide membranes, polyvinyl membranes, poly carbonate membranes, other membranes, gas diffusion layer, gas diffusion electrode, metals, Teflon, plastic, silica gels, Nafion, carbon cloths, Ultrex™ (Membranes-International Ltd.), Neosepta® AHA membrane (Eurodia Industrie SA), size exclusion membranes, and/or gas diffusion electrodes can be used. For porous materials, the physical and chemical topology of the material and its pore size typically define the final structure and function of the material. Pores sizes can be either macroscale or microscale or both. A macroscale pore allows for the permeation of the surfactant through the material, preferably assembling the surfactant templated nanostructure within the membrane. A microscale pore structure typically prevents or limits the permeation of surfactant throughout the material, preferably assembling the surfactant templated nanostructure on or near the surface of the membrane. The pore size characterization (macropore vs micropore) is preferably defined by the physical chemistry of the surfactant, not the geometry of the pore. Surfactants have a coherence length. Thus, a material may have macroscale pores for one surfactant solution and microscale pores for a different surfactant solution. For example, lipids vesicles at 1 mg/ml concentration in aqueous conditions will self assemble on top of a colloidal crystal with 45 nm pores, in which case the surface is microporous. Triton-X, a different surfactant, will permeate a colloidal crystal with 45 nm pores, in which case the surface is macroporous.

Figure 13:
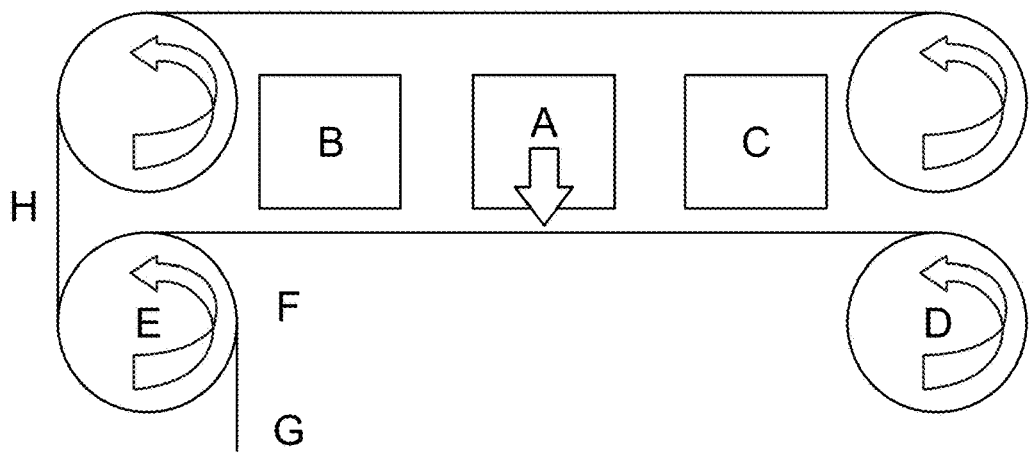
FIG. 13 is a schematic of an embodiment of an automated roll to roll style process for manufacturing membranes.

Particular embodiments of this invention include the automated manufacturing of the surfactant self assembled thin films including stabilized surfactant mesostructures, biomimetic surfactant mesostructures and sol-gel templated mesostructures. This invention includes many automated or mass production manufacturing techniques for these films including spray coating, painting, inkjet printing, roll coating, reverse roll coating, blade coating, gravure coating, gap coating, immersion coating, curtain coating, metering rod coating, slot coating, air knife coating and knife coating. FIG. 13 illustrates a representative, but not limiting, configuration of an automated system to manufacture self assembled thin films on membranes and other materials. Each Point, labeled with a letter A-H, may or may not be included in a manufacturing system. Point A is where the deposition of the self assembly solution occurs. Point B and Point C are pre and post processing steps respectively. In these steps the material may be subject to one, some, or all of the following: changes in temperature, exposure to an oxidative environment (e.g. ozone producing UV light, ozone gas), deposition of chemicals (e.g. to promote adhesion), chemical rinse or cleaning, the addition or removal of material, chemical etchants, pressure, and/or tension, etc. Point D is the material feed. This material can be anything including, but not limited to, a membrane, a PTFE membrane, a PES membrane, a PVP membrane, a plastic, carbon cloth, carbon felt, or any other material. Before assembly, the material can be washed in water and/or other solvents, temperature treated, placed in an ultra sonic bath, and/or have other molecules deposited on it. Point E is the final material. Material at this point can be, but is not limited to, a roll of membrane, a spiral membrane cartridge, or an intermediate point in a larger process. Point F is the material feed going through manufacturing. Point G is separate material being fed into the final material at Point E. Point H is a separate material which undergoes one, some, or all of the processing of the material in Point F and is fed into the material in Point E. In some instances, the material from either Point F or Point G will induce physical confinement of the self assembly material deposited on Point F and rolled into point E. The orientation of this device is only exemplary, and the elements may be re-arranged in many suitable orientations with respect to the vertical direction for carrying out the method steps shown. Additional conventional supports, such as guides, rollers, and the like, may be used to support, tension, turn, and/or twist the feed membrane and the biomimetic surfactant nanostructure.

Figure 14:
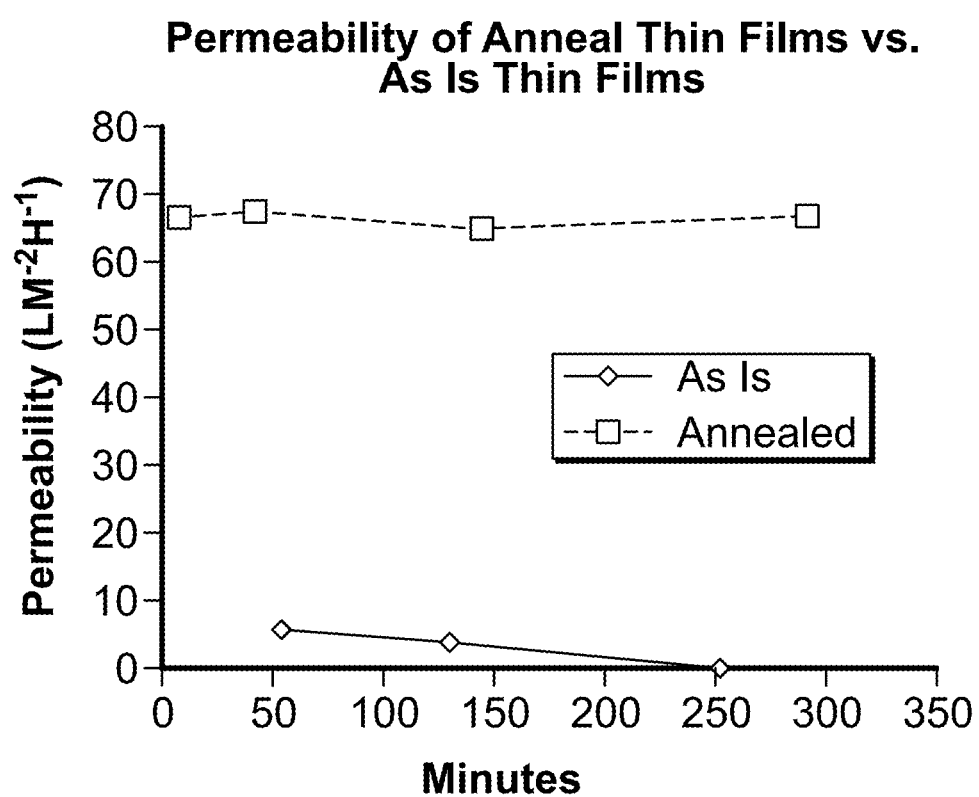
FIG. 14 shows the effect of annealing on membrane permeability.

Certain embodiments of methods of the present invention comprise one or more annealing steps after the deposition of the surfactant self assembly solution. The addition of a specific solution enables some of the surfactant to escape from the ordered phase into the disordered phase. The solution is preferably chosen based on the phase diagram of the multi-component mixture which includes at least two solvents and the surfactant. The subsequent addition of a second specific solution and/or evaporation drives some of the surfactant into the ordered phase. The second solution is also preferably chosen from the multi-component phase diagram such that the surfactant is driven into the desired ordered phase. The ordered phase of the surfactant after any of the annealing processes can be unique, and the surfactant can be in another phase within the material. The process may be repeated with all three or any combination of the steps one or more times. This process anneals the surfactant mesophase to remove defects and excess surfactant and/or to add an additional phase of surfactant. This annealing process is similar to the annealing of metal or glass to reduce the likelihood of material fracture. In FIG. 14, the permeability of two membranes are compared where the only difference is the annealing step. The membranes are UV Clean 20 wt % 10:1 DLPC to Gramicidin on 0.1 micron PES membrane. The permeability of the membranes was measured using a home built cross flow membrane test cell. The pressure drop across the cell was 55 PSI. The annealed membrane shows higher permeability with no loss in rejection to fluorescein salt.

Figure 15:
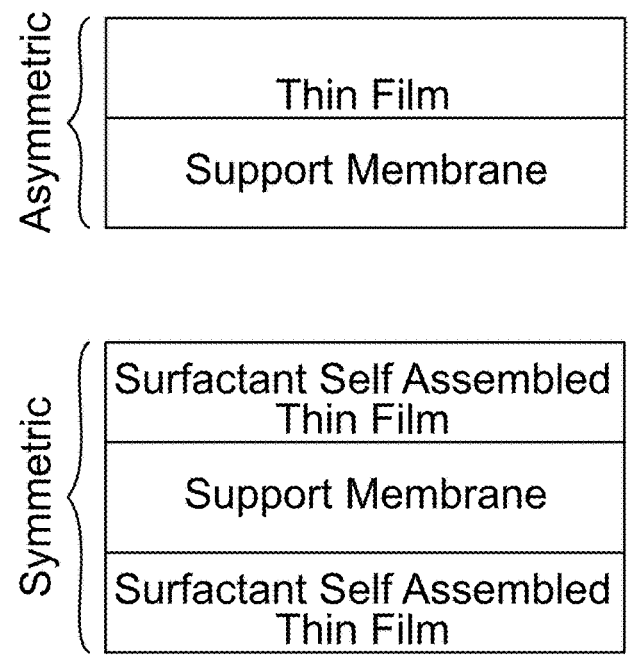
FIG. 15 shows the difference between symmetric and asymmetric membranes.
Figure 16:
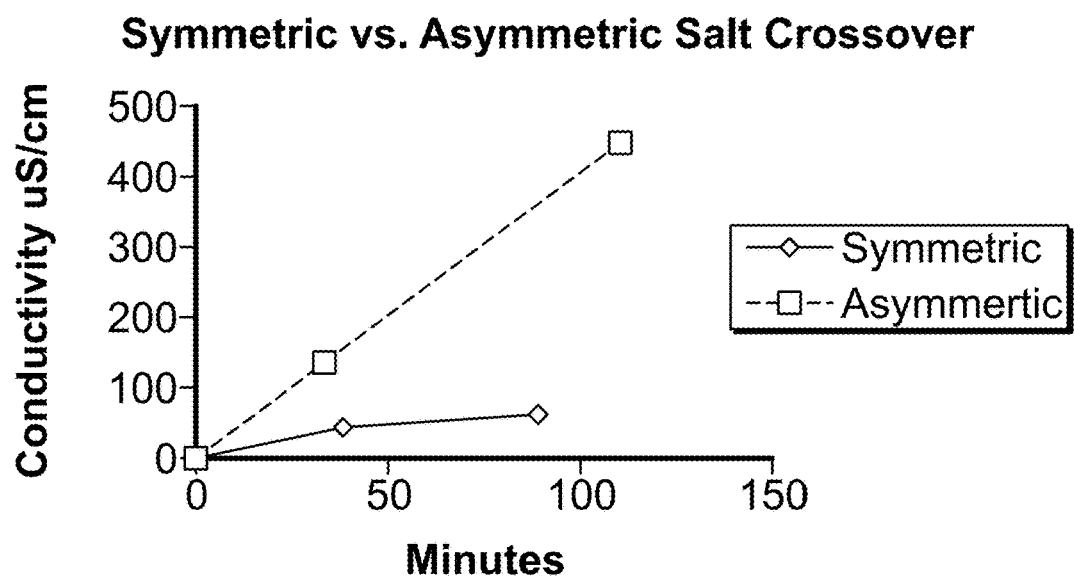
FIG. 16 is a plot of the back diffusion of salt comparing a symmetric and an asymmetric free standing biomimetic surfactant nanostructure.

Embodiments of the present invention allow for the deposition on both sides of the material to create symmetric membranes. When the interfacial self assembly method is used, resulting in an asymmetric membrane; that is a membrane with a thin film on only one side. The process to deposit a self assembled surfactant thin film can be repeated on the other side of the porous material. A schematic comparing asymmetric and symmetric membranes is shown in FIG. 15. In one embodiment, a UV Clean 20 wt % DLPC on 0.1 micron PES membrane was assembled. After curing the membrane for one day at 80° C., the process was repeated on the other side of the PES membrane. A forward osmosis experiment was conducted between two 10 L buckets of water. The conductivity of the feed was less than 1 µS/cm. The conductivity of the brine was 110 mS/cm. The solute in the brine was NaCl. The pressure drop was 5 PSI from the feed to the brine. The membrane area was 3 square inches and it was tested in a homebuilt cross flow test cell. As expected, the double-sided membrane demonstrated a lower diffusion rate of salt form the brine into the feed of the experiment, as shown in FIG. 16.

Embodiments of the present invention comprise surface functionalization chemistry of the final material. Surfactants can be cationic, anionic, or zwitterionic. For reverse osmosis, this presents a challenge for salts since according to DLVO theory salt in solution will form a double layer at the membrane surface. The opposite is true for a hydrophobic surface in solution. There will be a decreased density of water at the surface resulting in a decreased density of dissolved ions. Surface functionalization chemistry can render surfaces hydrophilic or hydrophobic depending on the application (e.g. forward osmosis versus reverse osmosis).

Figure 17:
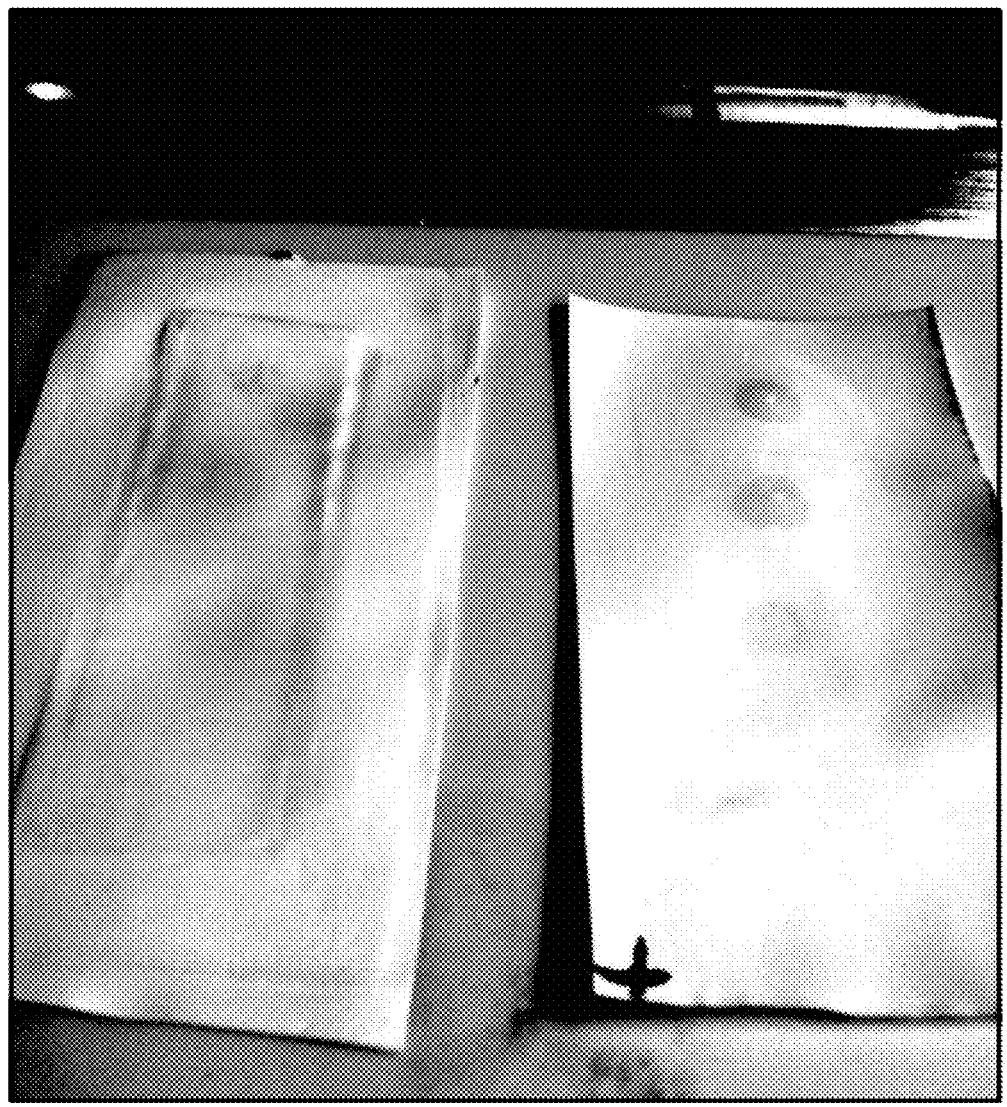
FIG. 17 shows the effect of surface functionalization chemistry on membrane hydrophobicity.

In one embodiment of the present invention, the surface of the material is methylated with $(CH_3 CH_2O)(CH_3)_3Si$ to render the material hydrophobic. The result is a hydrophobic membrane with sub nanometer porosity for the extraction of low surface tension liquids, e.g. alkanes and alcohols, from water. In FIG. 17, several 10 µl drops were placed on a UV Clean 20 wt % DLPC on 0.1 micron PES membrane (left sample) and a UV Clean 20 wt % DLPC on 0.1 micron PES membrane which after assembly and curing was surface functionalized with a methylated silane (specifically, 600 microliters of 10 wt % ethoxy(trimethyl)silane) (right sample). The resulting material is more hydrophobic than the original material, as shown by the water drop spreading less on the treated hydrophobic membrane surface than on the untreated hydrophilic membrane surface.

Figure 18:
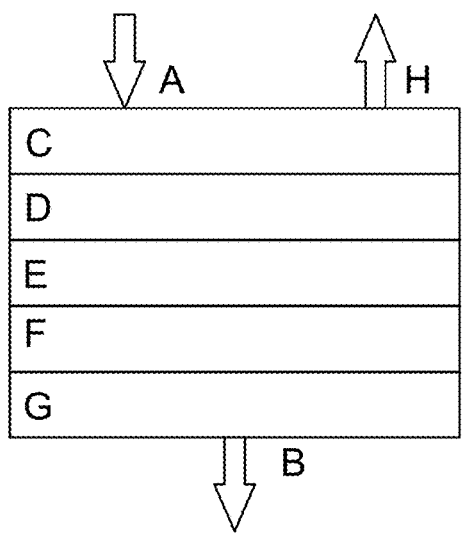
FIG. 18 shows a design for an embodiment of a cartridge using flat membranes for separation and concentration.

Self assembled thin films on porous supports can be used in many configurations for separations. FIG. 18 illustrates one embodiment of a flat sheet membrane cartridge configuration. In this configuration water flows perpendicular to the surface of the membrane. Water passing through the membrane (the permeate) has a lower concentration of solutes than the retentate (water remaining in the cartridge). (A) denotes the flow of the retentate and (B) denotes the flow of the permeate. (C) and (G) are a fitting or a combination of fittings holding the biomimetic surfactant nanostructure in place. (D) is an optional porous material supporting and/or structuring the biomimetic surfactant nanostructure. In some embodiments, this layer comprises metal washer, which is of particular importance in applications requiring the membrane to be backflushed and/or to prevent membrane leaking. (E) denotes the biomimetic surfactant nanostructure and (F) is an optional porous material to increase the mechanical stability of the biomimetic surfactant nanostructure. (H) is an optional outlet enabling flow or draining of rejected solution. All data presented in the Examples for this configuration were measured using a flat sheet membrane cartridge without a drain and/or rejection flow.

Figure 19:
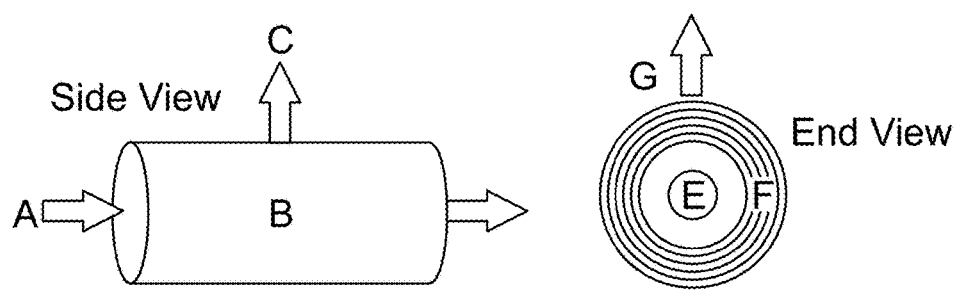
FIG. 19 shows a design for an embodiment of a spiral cartridge used for concentration of solutes.
Figure 20:
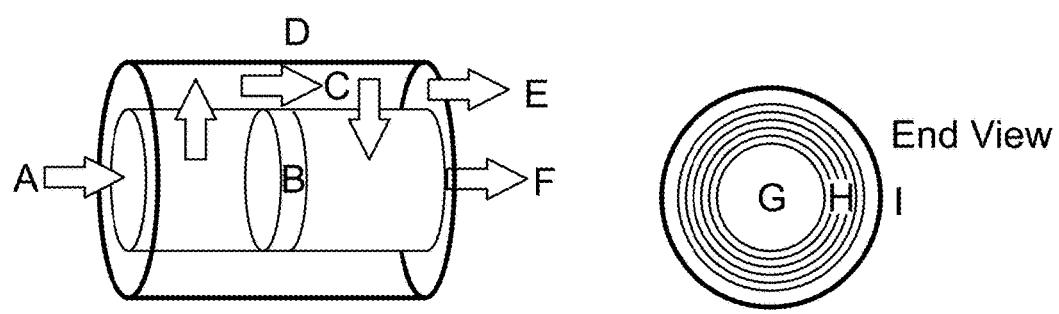
FIG. 20 shows a design for an embodiment of a spiral cartridge used for purification of water.

FIGS. 19 and 20 illustrate embodiments of the invention used in spiral wound membrane cartridges. In this configuration, water flow is tangential to the membrane surface. For concentration applications (FIG. 19), solution can pass directly through the core on which the membrane is wound. The retentate (the solution within the core) is enriched as it travels down the core and water selectively permeates tangentially through the spiral wrapped membrane. (A) denotes the flow of the retentate. (B) is the spiral membrane cartridge. (C) is the flow of the water being removed from the solution and (D) is the flow of the concentrate. (E) is a hollow core that is porous allowing for tangential flow. (F) denotes a membrane spiral comprising one or more layers. These layers may comprise a single piece or multiple pieces. Each layer can be identical or different. It is preferable to dispose a large pore mesh between the biomimetic surfactant nanostructure layers to distribute the pressure evenly across the biomimetic surfactant nanostructure surface. (G) is the direction of the flow of the removed water. For water purification and concentration applications (FIG. 20), the core preferably comprises a stop to prevent direct flow of feed solution. (A) denotes the flow of the retentate. (B) is a flow stop. (C) is the flow of the water being purified. (D) and (I) denote a solid layer to prevent the loss of water from the cartridge. (E) is the flow of rejected solution and (F) is the flow of purified water. (G) is a hollow core that allows for tangential water flow with a direct flow stop. The hollow core preferably comprises a pore size greater than 0.03 microns. (H) denotes the membrane spiral, which preferably comprises multiple layers. These layers may comprise a single piece or multiple pieces. Each layer can be identical or distinct. It is preferable to dispose a large pore mesh between the biomimetic surfactant nanostructure layers to distribute the pressure evenly across the biomimetic surfactant nanostructure surface. Water must flow through the membrane, and return into the core behind the stop, to be collected in the permeate. Rejected water falls out of the side.

Other configurations than those presented including configurations with differing material orientation, flow direction, additional depositions of chemical, insertion of one or more electrodes, and/or additions of thin films may be preferable on an application specific basis. For example, to use of the biomimetic surfactant nanostructure for ion exchange applications or in a fuel cell, inserting electrodes on either side of the biomimetic surfactant nanostructure is typically required.

Hollow membrane fibers may be used to filter water. The fibers enable greater permeability per element volume because the fibers have more surface area than the spiral wound elements. The ability of embodiments of the present invention to perform separations using surfactant mesophases, and the ability to form surfactant self assembling thin films on porous supports, enable the assembly of surfactant self assembling thin films on the inside and the outside of a hollow fiber. To coat a hollow fiber membrane on the inside, the H2O2 Boil TEOS protocol is preferably used to prepare the surface. Millipore water is preferably used to flush and pre-wet the fiber for interfacial assembly. Self assembly solution is then flushed through the inside of the fiber and preferably allowed to polymerize overnight. The ends of the fiber may optionally be blocked to prevent leaking of self assembly solution. To coat the outside of a fiber, the fiber preferably undergoes the same H2O2 Boil TEOS protocol. Then the fiber is flushed preferably coated with water. The outside of the fiber is then preferably coated with self assembly solution. One method to coat the outside of the fiber is to pull it through a circular orifice which contains self assembly solution. The self assembly solution is preferably allowed to polymerize overnight.

Figure 21A:
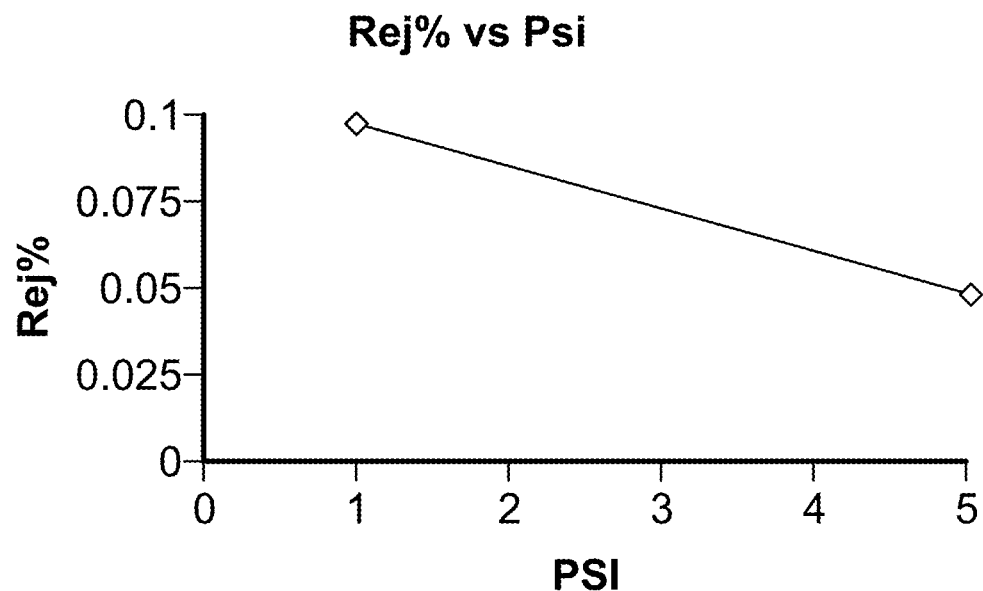
FIGS. 21A and B illustrate the effect of pressure on the rejection levels of an embodiment of a membrane in accordance with the present invention.
Figure 21B:
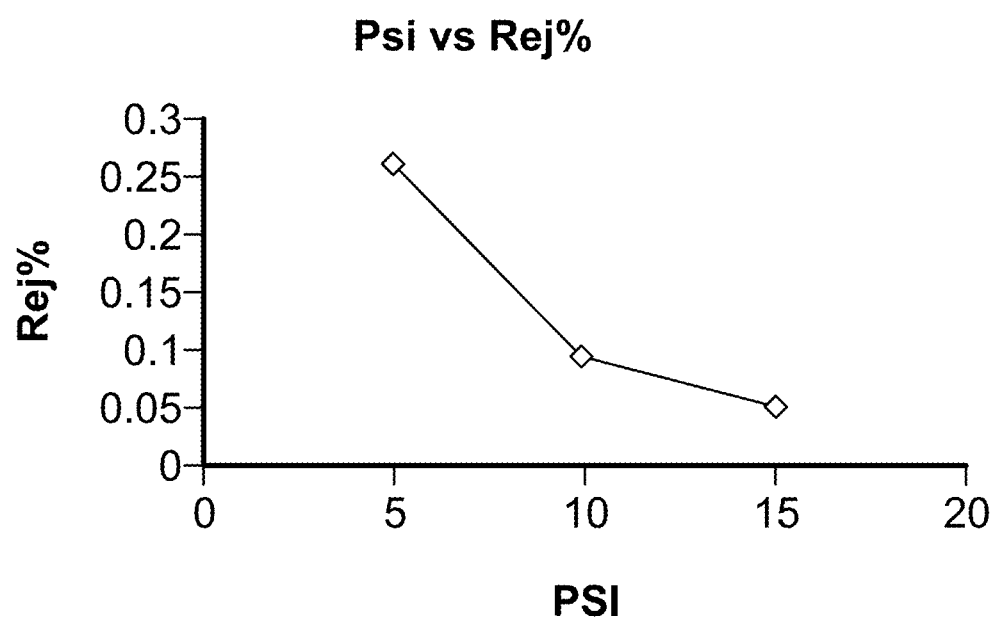
Figure 22A:
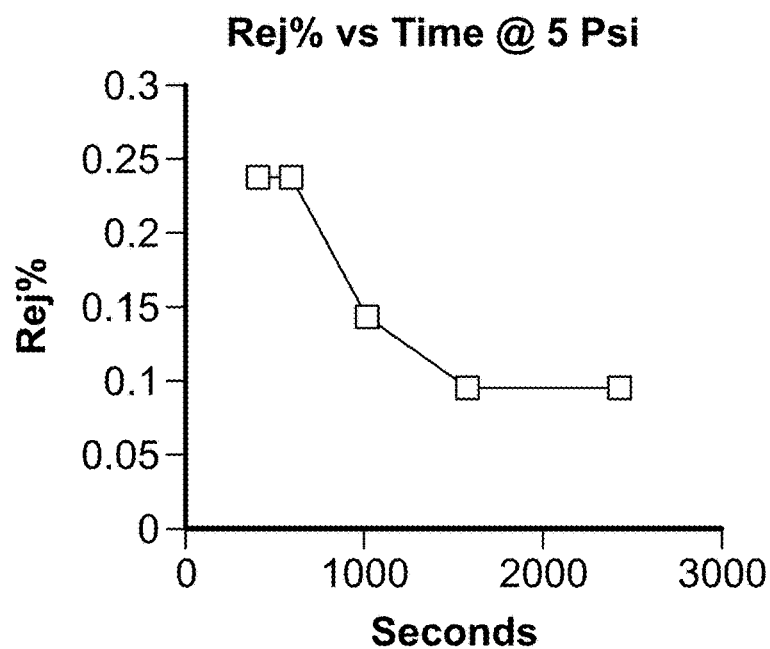
FIGS. 22A and B illustrate the effect of a mechanical backing on the long term stability of an embodiment of a membrane.
Figure 22B:
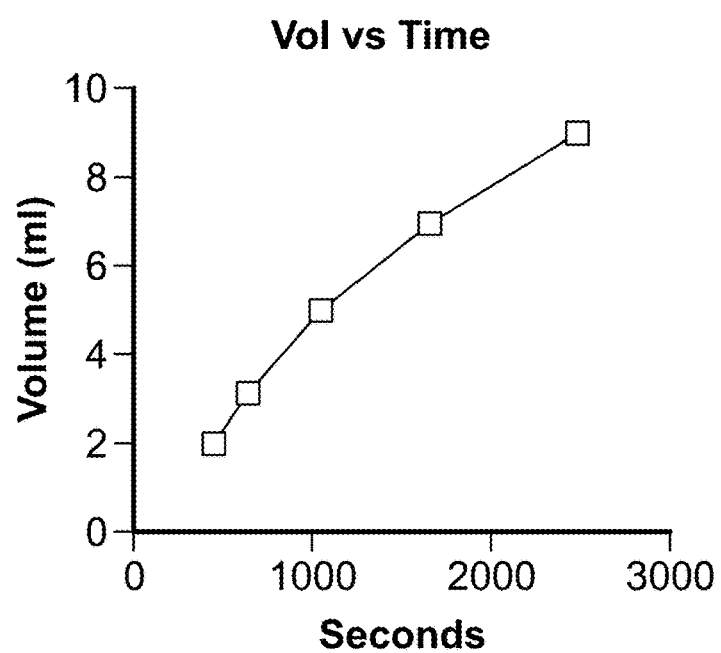

Certain methods in accordance with embodiments of the present invention stabilize the resulting thin film, allowing it better withstand mechanical deformation (tension and/or compression). Both mathematical models of lipid bilayer transport and experimental results confirm that solute permeability across a lipid bilayer decreases with increases in membrane thickness. For example, the negative correlation between lipid chain length and bilayer permeability has been experimentally measured. There are many ways to change membrane thickness including, but not limited to, lipid molecular structure (e.g. tail length, lipid class), mechanical tension, chemical swelling, chemical association, and/or lipid interdigitation. The same is true for stabilized surfactant mesostructure thin films. The effect of tension induced by normal surface pressure on a biomimetic surfactant nanostructure, more specifically the effect of pressure on rejection percentage, is demonstrated in FIG. 21. FIG. 21A is data for single free standing biomimetic surfactant nanostructure assembled from a 5 wt % lipid solution comprising 10:1 DLPC to Gramicidin between two PES membranes prepared using the UV clean. FIG. 21B is data for a single free standing biomimetic surfactant nanostructure assembled from a 10 wt % lipid solution comprising 10:1 DLPC to Gramicidin between two PES membranes prepared using the UV clean. The rejection of methanol through biomimetic surfactant nanostructures decreases with pressure because of the lateral tension induced by the solvent flow through the membrane. By inserting a mechanical backing, for example a porous mesh (~0.1 mm pores manufactured by DelStar, El Cajon, Calif.) on a metal mesh (~5 mm pores) disposed behind a single free standing biomimetic surfactant nanostructure (which was assembled from a 10 lipid wt % solution contain 10:1 DLPC to Gramicidin between two PES membranes prepared using UV clean with a methanol concentration of 20% w/w), the rejection of methanol reached steady state operation after approximately 40 minutes, as shown in FIG. 22A. Furthermore, the flux of solution through the membrane slowed as a function of time, as shown in FIG. 22B, suggesting the ability to concentrate methanol within the retentate.

Figure 23:
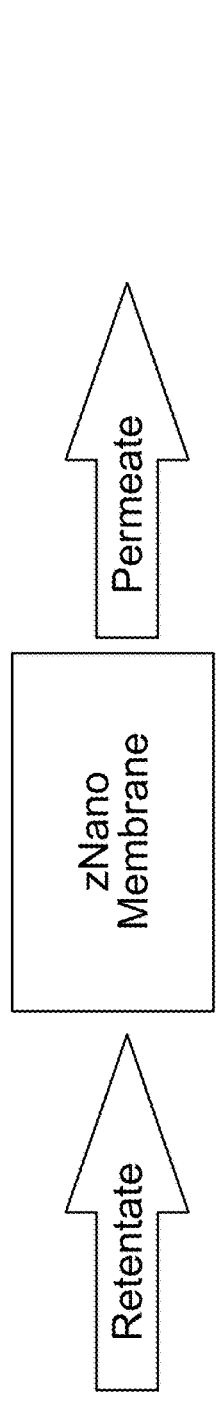
FIG. 23 demonstrates the use of an embodiment of the membrane to concentrate methanol.

Particular embodiments of this invention provide for the concentration of solutes via the membrane. Molecules, ions, and particles that are rejected by the membrane can be concentrated within the solute. One example method comprises configuring the membrane in a tangential flow apparatus. Particular embodiments of this invention can be used to concentrate methanol. As shown in FIG. 23, a volume (5.5 ml) of 20% w %/w % methanol solution (25 ml) was pumped through a single free standing biomimetic surfactant nanostructure, assembled from a 10 lipid wt % solution contain 10:1 DLPC to Gramicidin between two PES membranes prepared using UV clean. The membrane was backed with a millimeter sized porous mesh backed by a porous metal scaffold. A one inch metal washer was glued to the other side of the membrane with Devcon 5 minute epoxy. Flow rate was 0.074 ml/min and the average pressure was 11.4 PSI. The membrane area was 1.13 cm². The membrane was orthogonal to solution flow in a homemade membrane cartridge. The sides of the membrane were glued to prevent leaking. The concentration of methanol in the retained solution increased by 5.3%, as expected from a mass balance given the initial methanol concentration of the feed solution and the measured methanol concentration of the permeate solution.

Figure 24A:
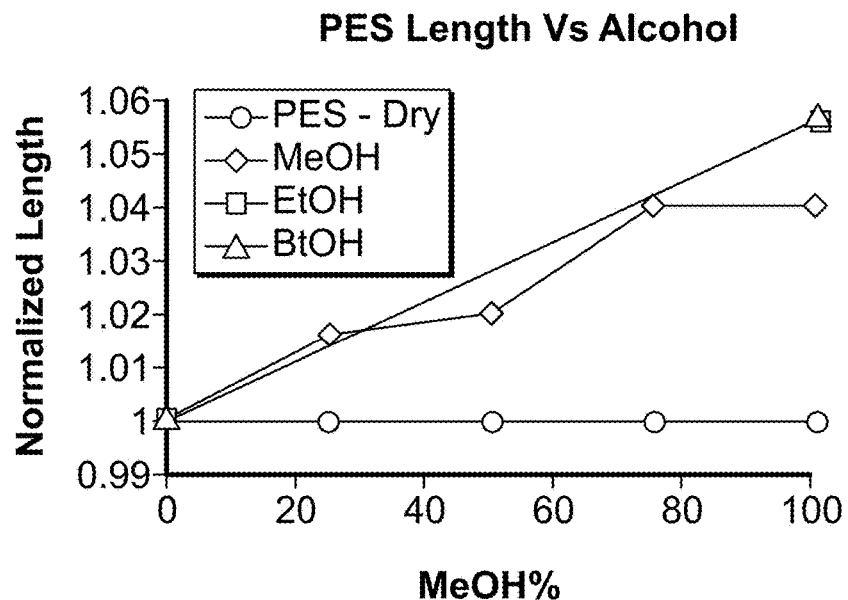
FIGS. 24A and B measure the effect of alcohol on various supports.
Figure 24B:
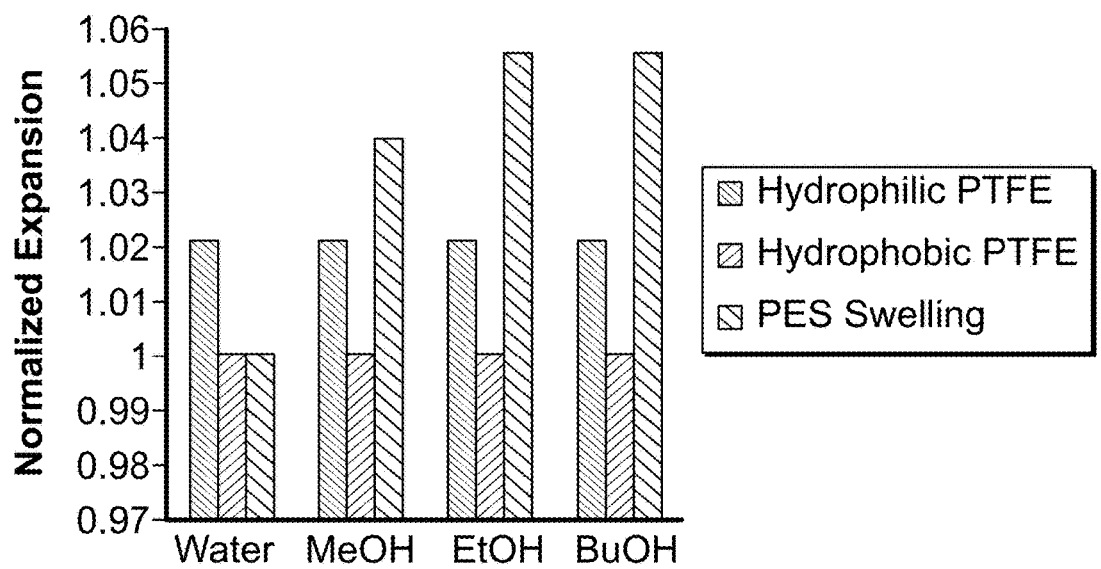

Certain embodiments of this invention provide for the formation of biomimetic surfactant nanostructures using various types of porous materials. The rational design and integration of specific membrane supports for enhanced material stability is critical for separations of specific solutes because of the limitation of supporting materials including, but not limited to, chemical stability in solutes, mechanical stability in solutes, pore size, pore shape, cost, separation efficiency, and system compatibility. One limitation of separating solvents like alcohols, ketones, acetone, or benzene is the chemical stability of the supporting membranes. For example, PES dissolves in many organic solvents, including acetone, and is mechanically unstable in alcohols. The mechanical stability of PES, HI-PTFE (hydrophilic), and HO-PTFE (hydrophobic) differs in alcohol. Here, the mechanical stability of the membrane is defined as the expansion of the material in mixtures of alcohol. FIG. 24A shows the expansion of a 5 cm×1 cm piece of PES as a function of alcohol type and alcohol concentration. FIG. 24B shows the expansion of 5 cm×1 cm pieces of HI-PTFE and HO-PTFE membranes as a function of PTFE membrane type, alcohol type and alcohol concentration. Normalized to water, PES expands 6% in pure ethanol and pure butanol. Normalized to water, both HI-PTFE and HO-PTFE do not expand in pure ethanol and pure butanol. This makes both HI-PTFE and HO-PTFE ideal for use with small organic solvents. Expansion of the support induces a lateral tension on the biomimetic surfactant nanostructure, which reduces its performance.

Figure 25A:
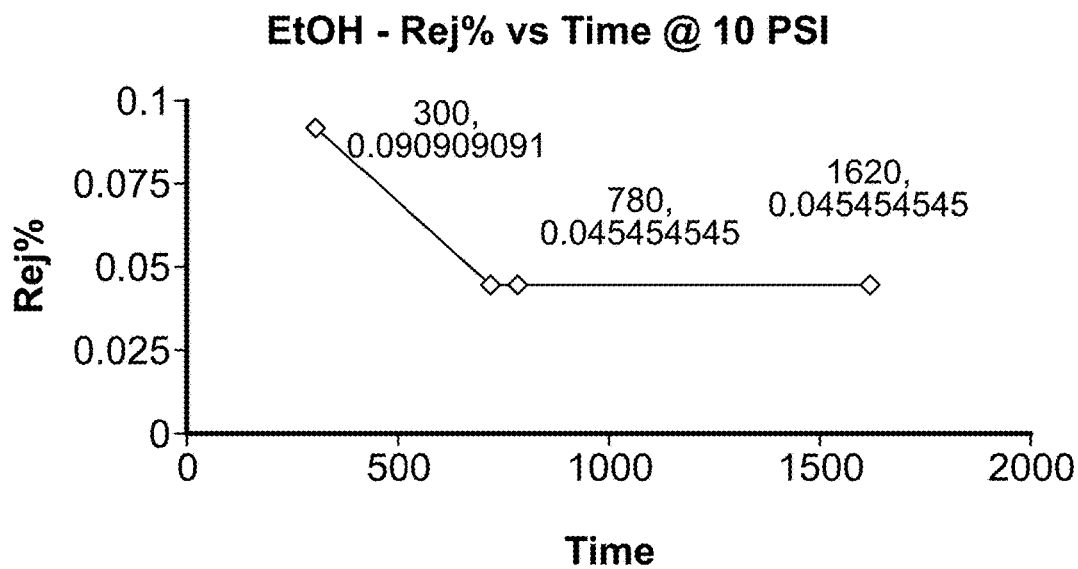
FIGS. 25A and B demonstrate the effect of an underlying support on the separation of ethanol.
Figure 25B:
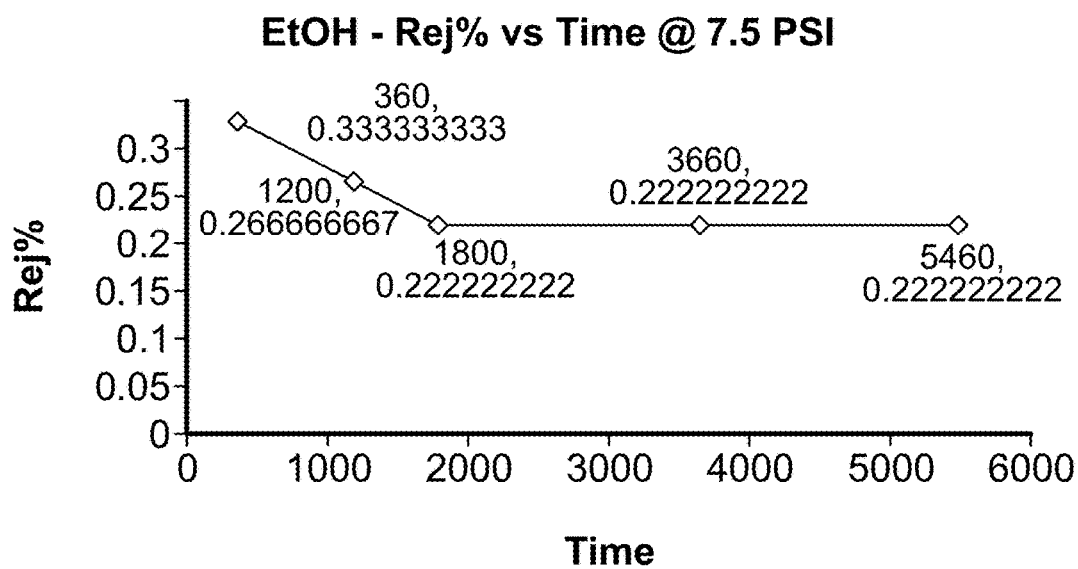

FIG. 25 compares two particular embodiments of the invention separating 25 ml of 10 w %/w % aqueous ethanol solution from water. A single free standing biomimetic surfactant nanostructure was assembled from a 10 lipid wt % solution contain 10:1 DLPC to Gramicidin between two HI-PTFE membranes prepared using UV clean. The membrane was backed by both a millimeter sized porous mesh and a porous metal scaffold. As shown in FIG. 25B, this configuration demonstrates a 17.5% increase in rejection percentage at comparable pressure versus a single free standing biomimetic surfactant nanostructure was assembled from a 10 lipid wt % solution contain 10:1 DLPC to Gramicidin between two PES membranes prepared using the UV preparation method (FIG. 25A). Both embodiments had a mechanical backing of porous sheet metal to stabilize the membrane.

Figure 26:
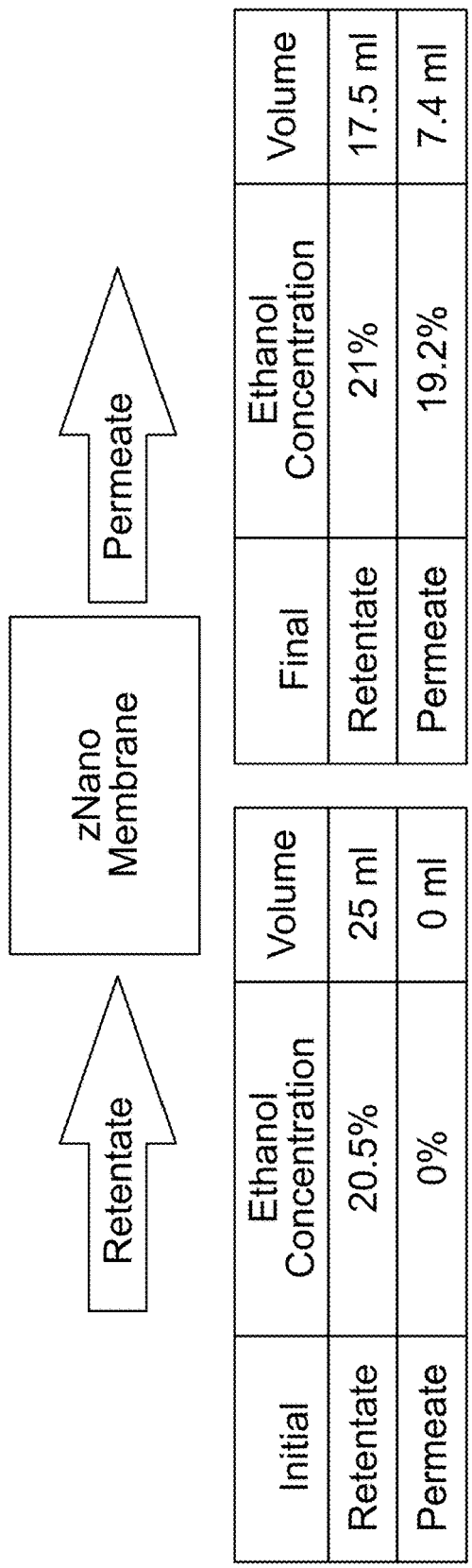
FIG. 26 demonstrates the use of an embodiment of the membrane to concentrate ethanol.

In certain embodiments of this invention, ethanol can be concentrated. In FIG. 26 the results of an ethanol concentration experiment are listed. A volume (7.4 ml) of 20.5% w %/w % ethanol solution (25 ml) was pumped through a single free standing biomimetic surfactant nanostructure, which was assembled from a 10 lipid wt % solution contain 10:1 DLPC to Gramicidin between two HI-PTFE support membranes prepared using UV clean. The membrane was backed by a millimeter sized porous mesh further backed by a porous metal scaffold. A one inch metal washer was glued to the other side of the membrane with Devcon 5 minute epoxy. The membrane area was 1.13 cm². Flow rate was $1.2 \times 10^{-5}$ m³/m²/sec with a pressure of 5 PSI. The pressure normalized flow rate was $3.48 \times 10^{-10}$ m³/m²/sedPa. The loss was 0.1 ml. The membrane was orthogonal to solution flow in a homemade membrane cartridge. The sides of the membrane were glued to prevent leaking. The ethanol concentration of the retentate increased by 2.4% over the initial ethanol concentration as expected from the mass balance given the measured ethanol concentration of the permeate.

Figure 27:
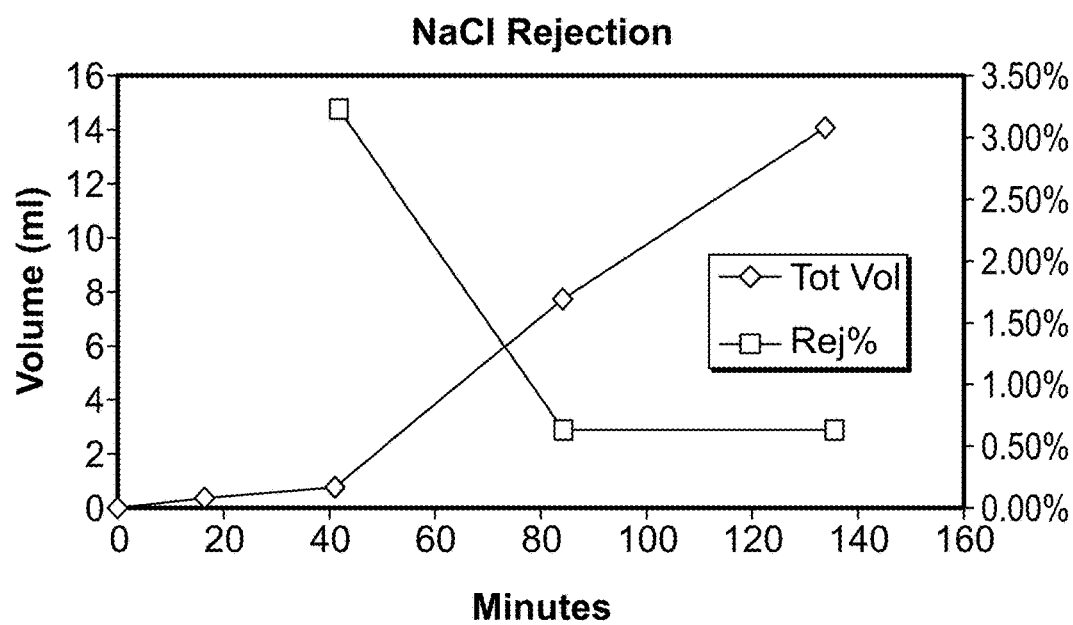
FIG. 27 demonstrates NaCl rejection by an embodiment of the membrane.

In certain embodiments of this invention, aqueous NaCl can be separated from water, as shown in FIG. 27. The material was 10 wt % Soy PC (95%) from Avanti Polar Lipids (Alabaster, Ala.) in standard silica solution assembled between two UV cleaned PES membranes (0.030 micron pores). The volume of the NaCl solution was 233 ml with a conductivity of 15.4 mS/cm. Conductivity was measured using a Horiba B-173 conductivity meter. The membrane was backed by both a millimeter sized porous mesh and a porous metal scaffold. The area of the membrane was 1.13 cm². The pressure was 5 psi.

Figure 28:
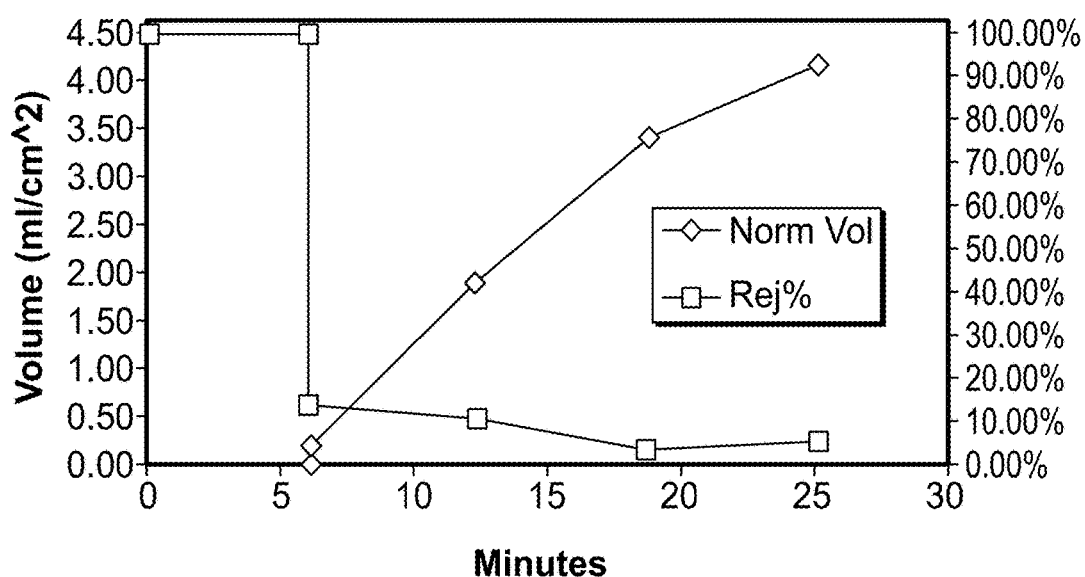
FIG. 28 demonstrates $MgSO_4$ rejection by an embodiment of the membrane.

In certain embodiments of this invention, aqueous $MgSO_4$ can be separated, as shown in FIG. 28. The membrane was 30 wt % Soy PC (95%) from Avanti Polar Lipids (Alabaster, Ala.) in stock silica solution assembled between two UV cleaned PES membranes (0.030 micron pores). The volume of the $MgSO_4$ solution was 13.2 ml with an initial conductivity of 9.0 mS/cm. The final conductivity was 9.2 mS/cm. Conductivity was measured using a Horiba B-173 conductivity meter. The membrane was backed by both a millimeter sized porous mesh and a porous metal scaffold. The area of the membrane was 1.13 cm². The pressure was 5 psi.

Multilayer Membranes

Figure 29:
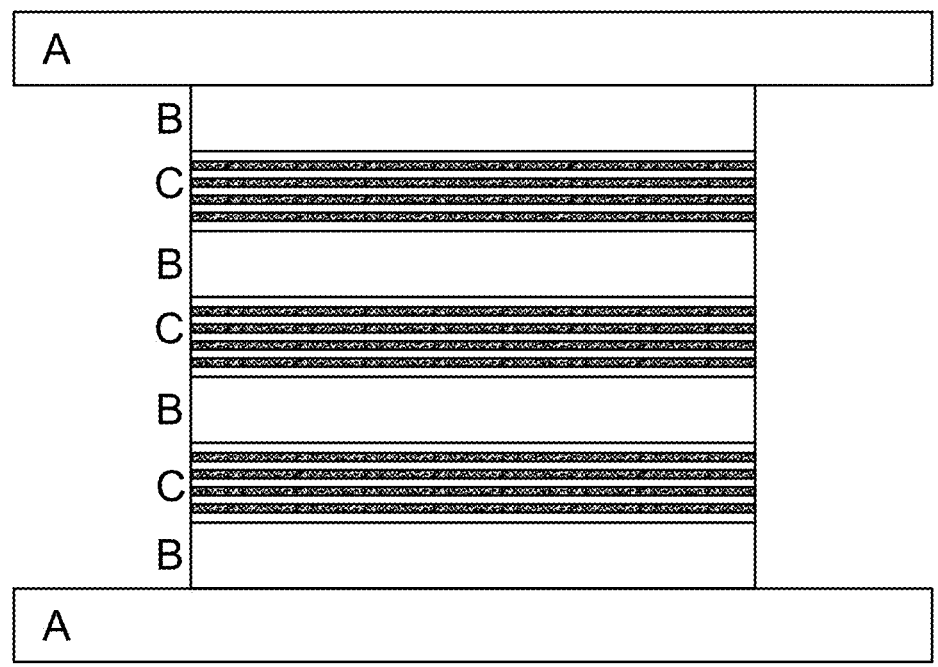
FIG. 29 shows a cross section of an embodiment of a multilayer membrane.

Embodiments of the present invention comprise multilayered membranes. Multilayer membranes preferably alternate lamellar layers of self assembled material and support material. In one exemplary embodiment is illustrated in FIG. 29. Two solid surfaces (A) sandwiched alternating layers of porous material (B) and surfactant templated sol-gel self assembly solution (C). Specifically, HI-PTFE membranes were prepared via $H_2O_2$ Boil TEOS and rinsed in 18.2 MΩ water. After HI-PTFE membrane preparation, alternating layers of membrane and 400 microliters of BSNS solution were constructed on a solid surface with the first final layers being $H_2O_2$ Boil TEOS HI-PTFE membranes. The three stack membrane was sandwiched by another solid surface, dried at room temperature for more than one hour, and then dried at 80° C. for more than three hours. The resulting membrane was glued to a mechanical backing. The confinement simultaneously drives assembly and integrates the resultant film with the physical confining assembly.

Figure 30A:
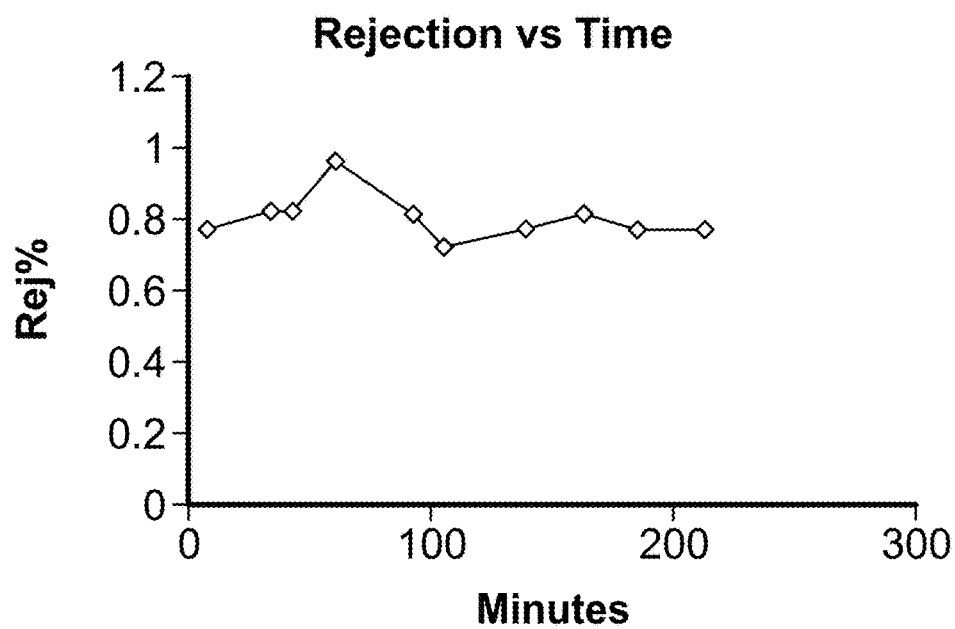
FIG. 30A shows ethanol rejection of an embodiment of a 3 BSNS layer membrane.
Figure 30B:
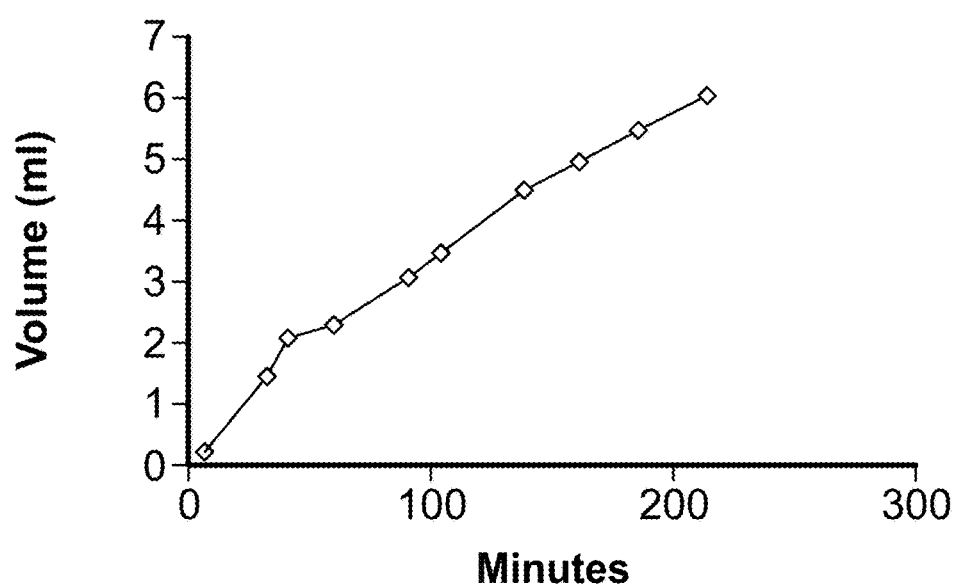
FIG. 30B shows water flux of an embodiment of a 3 BSNS layer membrane.

In an example of a multilayered membrane, a three BSNS layer free standing biomimetic surfactant nanostructure was assembled using 10 lipid wt % solution containing 10:1 DLPC to Gramicidin. The porous material was four HI-PTFE membranes prepared using the UV preparation method ($H_2O_2$ Boil TEOS and rinsed in 18.2 MΩ water). After preparation, alternating layers of $H_2O_2$ Boil TEOS HI-PTFE membrane and BSNS solution were placed on a solid surface with the final layers being $H_2O_2$ Boil TEOS HI-PTFE membranes. The stack of membranes was sandwiched by another solid surface, dried at room temperature for more than one hour, and then dried at 80° C. for more than three hours. The resulting membrane was glued to a mechanical backing. The area of the membrane was 6.16 cm². A separation of 10% w %/w % ethanol solution was performed at 2.5 PSI. The multilayered membrane rejected ethanol at an average of 80.5%, as shown in FIG. 30A, and demonstrated nearly constant water flux for more than 200 minutes, as shown in FIG. 30B.

The physical properties of embodiments of multilayered membranes can be fundamentally and non-trivially different than multiple single membranes stacked in series. The separation of a multi-layered material shows improved performance over a single layer membrane material and a calculation of the performance of three single layer membranes in series. Below is a table comparing the rejection and the flux of a single layer (Single Layer), three single layers in series (Three Single Layers), and a triple multilayer (Triple Multilayer). For the calculation of the Three Single Layer, the pressure was calculated by multiplying the pressure for one layer by the number of layers, the flux was calculated by dividing the flux for one layer by the number of layers, and the rejection percentage was calculated by raising one minus the rejection percentage to the number of layers then subtracting that number from one. The pressure, flux and rejection of the multilayered membrane are better than projected for membranes in series. This may be attributed to the differences in assembly conditions between the single layer (where each porous material has a solid surface on one side) and the multilayer (where all but two porous materials do not have a solid surface on either side).

TABLE 4

| | Number of Layers | Pressure | Flux (m^3/m^2/sec/Pa) | Ethanol Rejection (%) |
|---|---|---|---|---|
| Single Layer | 1 | .5 | $1.50 \times 10^{-10}$ | 22% |
| Three Single Layers | 3 | 2.5 | $5.00 \times 10^{-11}$ | 53% |
| Triple Multilayer | 3 | 5 | $2.33 \times 10^{-11}$ | 80% |

Figure 31:
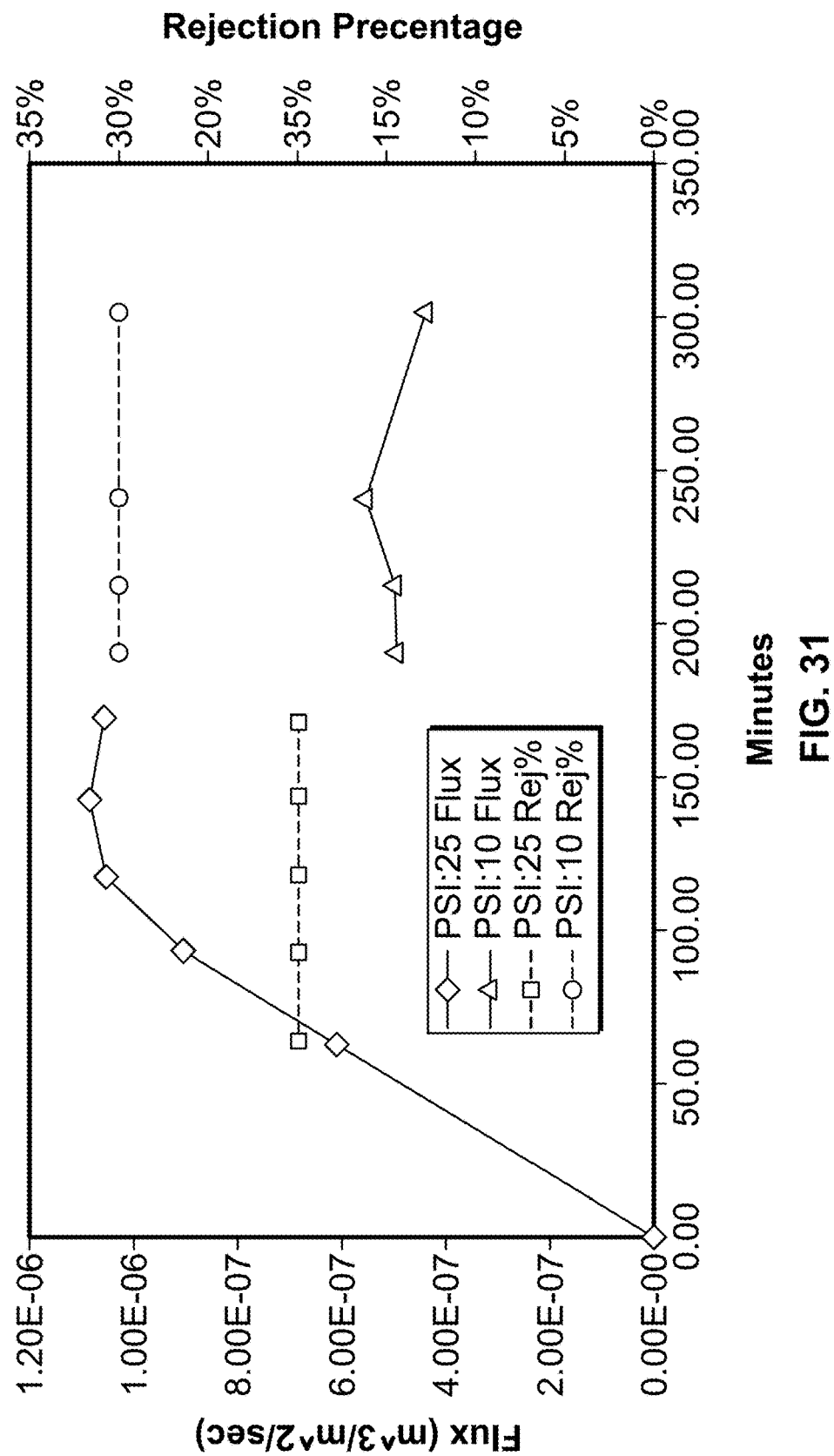
FIG. 31 shows butanol rejection of an embodiment of a 4 BSNS layer membrane.

In one embodiment of a multilayer membrane, a four biomimetic layer membrane was assembled using 10 lipid wt % solution containing 10:1 DLPC to Gramicidin. The porous material was five HI-PTFE membranes prepared using the UV preparation method ($H_2O_2$ Boil TEOS and rinsed in 18.2 MΩ water). After preparation, alternating layers of $H_2O_2$ Boil TEOS HI-PTFE membrane and BSNS solution were placed on a piece of Teflon with the final layers being $H_2O_2$ Boil TEOS HI-PTFE membranes. The stack of membranes was sandwiched by another solid surface, dried at room temperature for more than one hour, and then dried at 80° C. for more than three hours. After drying, the resulting membrane was glued to a mechanical backing. The sample area was 6.15 cm². A separation of 5% w %/w % butanol solution was performed at 25 PSI and 10 PSI. Flux and rejection data is shown in FIG. 31. The lines with diamonds refer to the axis on the left (flux). The lines with squares refer to the axis on the right (Rejection Percentage).

Electrochemical and Related Applications

TABLE 5 compares the selectivity of a Nafion membrane versus a calculation for a free standing BSNS comprising 10 mol % gramicidin, a transporter. The values listed for Nafion are from the literature. The values listed for the BSNS are based on calculations parameterized by experimental measurements. The proton and methanol conductivity of each lipid bilayer was modeled using parameters from single channel gramicidin conductivity measurements and giant unilamellar vesicle ('GUV') experiments respectively. Proton conductivity was determined to be 602.6 S per cm² and methanol permeability was determined to be $1.2 \times 10^{-5}$ cm/sec per bilayer. The BSNS equivalent circuit was the equivalent circuit of 100 lipid bilayers in parallel, roughly a one micron thick material. Proton conductivity and methanol permeability were divided by the total number of layers in accordance with the equivalent circuit model of a lipid bilayer. As such, these values represent an estimate of the performance of a direct methanol fuel cell (DMFC) constructed using this BSNS. Membrane crossover in a typical DMFC requires dilution of methanol to 3 M-4 M at the anode and reduces fuel cell power density (W cm$^{-2}$) by roughly ~50%. However, for the BSNS described above, we predict a 1733× decrease in methanol permeability and a $5.93 \times 10^{-8}$ decrease in polyvalent cation permeability versus Nafion. The resulting DMFC would be approximately 50% more efficient and could operate on 'neat' methanol.

TABLE 5

| | Nafion 117 | Predicted BSNS | Ratio BSNS to Nafion |
|---|---|---|---|
| Thickness | ~100 μm | ~1 μm | .001 |
| Conductivity (S) | 7.5 S/cm² (Lee W et al) | 6.026 S/cm² | .803 |
| Methanol Permeability (P) | $2.08 \times 10^{-4}$ cm/sec (Lee W et al) | $1.2 \times 10^{-7}$ cm/sec | $5.7 \times 10^{-3}$ |
| Polyvalent Cation Permeability | $5.93 \times 10^{-8}$ cm²/sec (Xia J et al) | $>10^{-16}$ cm²/sec | $1.69 \times 10^{-7}$ |

Figure 32A:
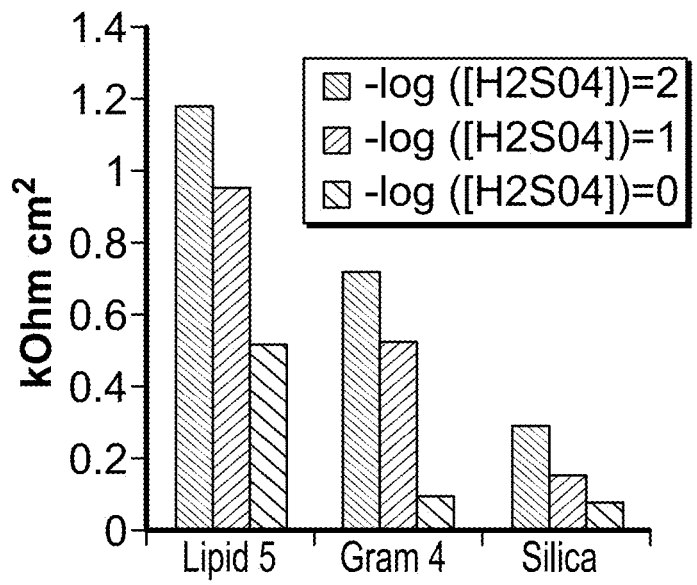
FIGS. 32A-D shows the through plane conductivity, methanol permeability and stability of a biomimetic surfactant nanostructure.
Figure 32B:
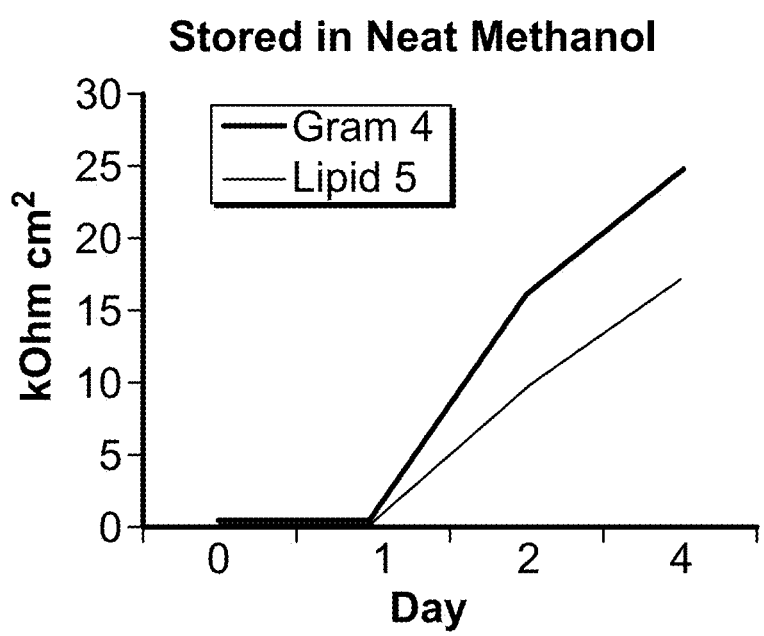
Figure 32C:
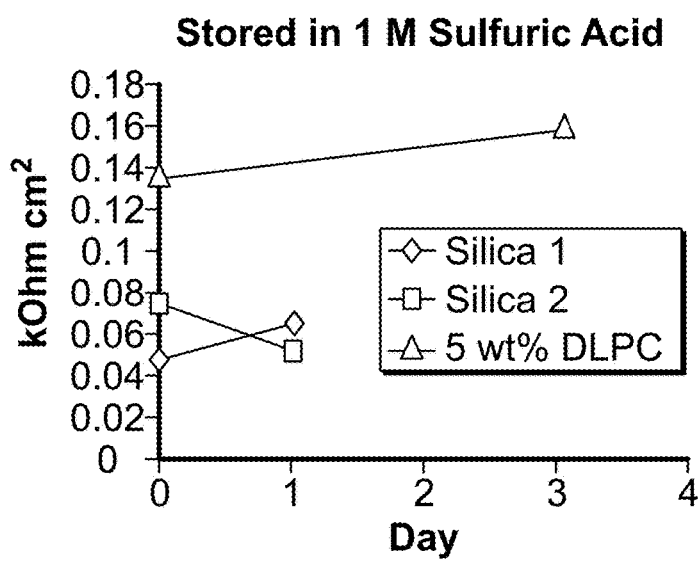

Biomimetic surfactant nanostructures, some comprising Gramicidin, were self assembled between two Nafion membranes as described in FIG. 8. The BSNS self assembly solution comprised lipids (Lipid 5, Lipid 1, Lipid 2, 5 wt % DLPC, 10 wt % DMPC), comprised lipids and gramicidin (Gram 4, 10 wt % 10 DMPC: 1 Gram), or comprised neither lipids nor gramicidin (Silica, Silica 1, Silica 2). Transporter materials were characterized by through plane conductivity measurements. Through plane conductivity was measure by sandwiching the membrane between two steel plates ~1 cm² and measuring the resistance with an ohm meter. Membranes and steel plates were stored in specific concentrations of acid for at least 2 minutes before measurement. FIGS. 32A-32C compare the conductivity of a control and three free standing BSNS hierarchical membranes with and without a transporter. In FIG. 32A, the through plane resistance of the three types of membranes: Silica (lipid free), Lipid 5 (transporter Free), and Gram 4 (transporter including) were compared at various concentrations of sulfuric acid. We measured a 6.375× increase in resistance for the transporter-free BSNS membrane (Lipid 5) versus the transporter-including BSNS membrane Gram 4. As expected from experiments with vesicles in solution, this result demonstrates that the inclusion of the transporter Gramicidin in the BSNS increases the conductivity of the biomimetic surfactant nanostructure. Furthermore, the resistance of the control membrane (silica) was comparable to the transporter containing BSNS (Gram 4) at 1 M sulfuric acid. Therefore resistance was membrane-limited, not transporter-limited. When compared to TABLE 5, this suggests that the thickness of the BSNS layer is less than 1 micron.

Stability of these materials in acidic and high concentration alcohol is important for fuel cell applications. The conductivity of the membranes was maintained over approximately one day despite storing the samples in either pure (neat) methanol (FIG. 32B) or 1 M $H_2SO_4$ (FIG. 32C). As shown in FIG. 32B, after day 1, there is a dramatic increase in resistance, suggesting material failure. In FIG. 32C, two surfactant free materials (Silica 1, Silica 2) and one surfactant containing material (5 wt % DLPC) were stored in 1 M sulfuric acid. After three days, the resistance of the surfactant containing material has not significantly changed. This suggests that the material has remained assembled despite the corrosive environment. This stability suggests that materials according to this embodiment may be useful for electrolysis, separations and fuel cell applications.

Figure 32D:
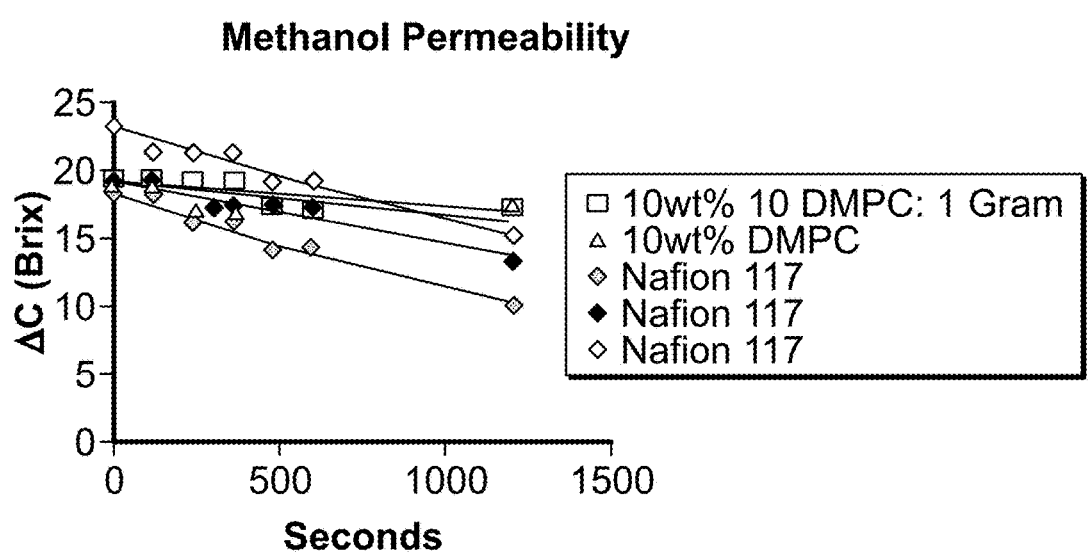

For direct methanol fuel cells and molecular separations, a reduction in the permeability of methanol through a membrane is important. This embodiment, a free standing BSNS, has a 4× decrease in methanol permeability compared to Nafion. Methanol permeability was measured by separating methanol with a either a Nafion 117 or a free standing BSNS, in equal volumes of 18.2 MΩ Millipore water and a high concentration aqueous (18-23 Brix) methanol solution. The methanol concentration of the initially pure water was measured as a function of time using a Atago 4436 PAL-36S Digital Pocket Methyl Alcohol Refractometer. The permeability coefficient relates the flux to the concentration gradient using the following equation $$J = \frac{d}{dt}\Delta C * \frac{V}{A} = P\Delta C$$

where J is the flux ($cm^2\ sec^{-1}$), P is the permeability (cm/sec), ΔC is the concentration gradient (Brix), V is the volume of one side, and A is the interfacial area. The ratio of volume to area for the permeability cell was 0.3 cm. The concentration gradient (ΔC) versus time (as shown in FIG. 32D) was fit to a single exponential with a rate coefficient k. The permeability was calculated using $$P = k\frac{V}{A}$$

where P is the permeability (cm/sec), V is the volume of one side ($cm^3$), A is the interfacial area ($cm^2$), and k ($sec^{-1}$) is the rate constant from the fit. The methanol permeability was measured for three Nafion 117 membranes, a biomimetic nanostructured membrane not comprising a transporter, and a biomimetic nanostructured membrane comprising a transporter. For the Nafion 117 membranes, the average methanol permeability coefficient over three experiments was $1.2 \times 10^{-1}$ cm $sec^{-1}$. This is in close agreement with the Nafion 117 methanol permeability value in TABLE 5. For the sample embodiments of the invention, the average methanol permeability was $0.3 \times 10^{-5}$ cm $sec^{-1}$. Despite the inclusion of the transporter in the BSNS (10 wt % DMPC: 1 Gram), the permeability coefficient was the same as the transporter-free BSNS (10 wt % DMPC). As expected from experiments with vesicles in solution, this result demonstrates that the inclusion of Gramicidin in the BSNS does not increase the methanol permeability of the biomimetic surfactant nanostructure. Thus the lipid structure is preserved despite the inclusion of the transporter. The methanol permeability was reduced by a factor of four for the invention versus Nafion 117.

Figure 33:
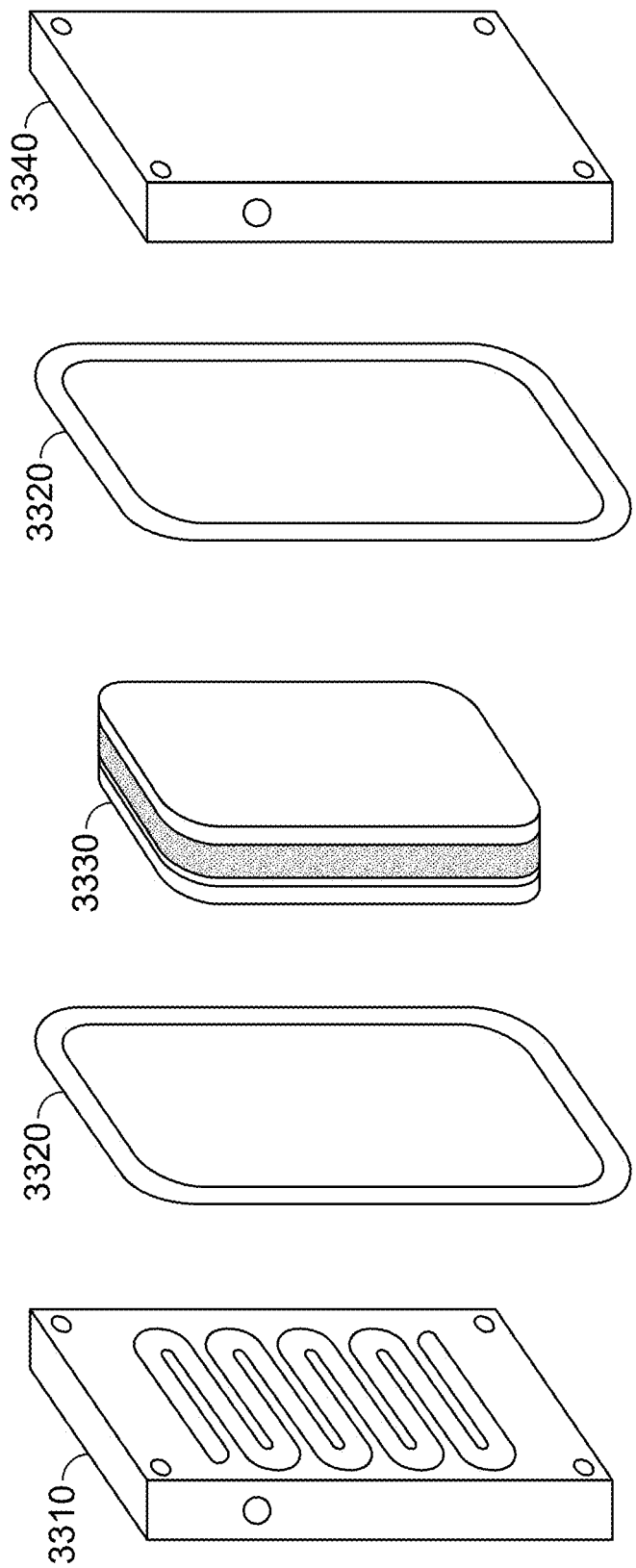
FIG. 33 is a schematic of a multiscale self assembled membrane used in an electrochemical cell.

Embodiments of the present invention may be used as an electrolyte, membrane electrode assembly, or electrochemical cell for electrochemistry; one configuration is illustrated in FIG. 33. The high conductivity and low crossover of biomimetic surfactant nanostructures make them desirable as electrolytes for liquid fed fuel cells and batteries. Biomimetic surfactant nanostructure 3330 is disposed between gasket layers 3320 and anode flow plate 3310 and cathode flow plate 3340. Either or both of the flow plates optionally comprise a serpentine graphite plate. The plates may be different. The integration of a BSNS containing passive transporters, or alternatively a stabilized surfactant mesostructure, with one or more Nafion membranes to create a free standing membrane preferably comprises greater selectivity than current industrial membranes. This has an important application for both fuel cells and batteries where membrane "crossover" of fuel or electrolyte reduces efficiency and energy storage capacity.

Biomimetic surfactant nanostructure 3330 may optionally comprise a multiscale self assembled membrane electrode assembly (MEA), which may optionally comprise one or more of the following: the catalyst, the membrane, the gas diffusion layer (GDL), and/or a carbon paper. The sandwiched portion of the MEA is the surfactant templated nanostructure produced using physical confinement. The membrane may be supported by any solid surface or GDL on a solid surface. A complete membrane electrode assembly (MEA) comprising a catalytic layer on the GDLs may be produced in a similar method. Alternatively, this device could comprise an electrolyte for a battery if a conductive ion exchange membrane is substituted for the GDL.

Similarly, redox flow batteries, such as vanadium ion redox batteries (VRB), have reduced efficiency due to membrane crossover of aqueous redox ions. The elimination of crossover in redox flow batteries by using the above BSNS would enable a battery with an efficiency >90%, similar to lithium ion batteries, which do not suffer from electrolyte crossover.

A similar configuration could be used for separations such as urea removal, dialysis, desalinization, distillation, alcohol purification and the chloro-alkali process.

Materials made in accordance with embodiments of the present methods may be suitable for use: as a membrane in a membrane electrode assembly for direct methanol fuel cells, as a membrane electrode assembly for fuel cells, as a membrane in a membrane electrode assembly used for biofuel cells, as a membrane in a membrane electrode assembly used for an electrochemical cell, in active devices and smart devices via synergies of channels, in chloro—alkali cells, in electrochemistry, in chemical manufacture, and/or in enzymatic conversion of molecules.

Single-Chain Surfactants

Assembly of a mesostructured sol gel thin film comprising single chain surfactants on a porous material changes its hydrophilicity, its surface charge and its filtration properties. Assembly can be via any roll to roll coating methods including dip, reverse roll, gravure, knife, slot die, silk screen or other comparable coating techniques. Mesostructured sol gel materials include surfactant mesophases encapsulated or stabilized using sol gel chemistry. Mesophases may comprise single chain surfactants with one or more chain lengths of surfactant. Surfactants can be cationic, anionic, zwitterionic, non-ionic or a combination there of. Surfactant mesophases may be lamellar, micellular, hexangonal, cylindrical, random, or a combination there of. One method to create a surfactant mesophases is to coat a porous material with a mixture of alcohol, water, surfactant, and sol-gel precursor. The resulting thin film can be annealed via the addition of alcohol after coating. In an embodiment of this method, thin films are cured for >48 hrs at >40 Celsius. The ratio of surfactant to sol-gel precursor determines the final structure of the mesophase. Porous materials include plastics, ceramics and metals. Other porous materials include microfiltration membranes, ultrafiltration membranes, and nanofiltration membranes. Pore sizes of relevant porous materials can be classified by poly ethylene glycol (PEG) exclusion, by average pore diameter, or by both. The minimum size of PEG in solution which is the retained by the porous material during filtration is known as the molecular weight cutoff (MWCO). Relevant pore sizes are preferably between approximately 0.001 microns and 0.3 microns. Relevant molecular weight cutoffs for porous materials are preferably between approximately 100 g/mol and 500,000 g/mol.

Due to the more energetically favorable interaction, a water droplet will spread over a larger area on a surface with increased hydrophilicity. Water droplets are on the order of 10 microliters. For solid materials, the hydrophilicity can be quantitatively measured using the contact angle of the droplet. Solid silica surfaces are known to have a contact angle which approaches zero, indicating complete wetting. Solid plastic surfaces used for filtration are known to have contact angles between 40 and 50 degrees. For porous materials, water will wet the material preventing contact angle measurements. Instead, hydrophilicity of porous materials can be qualitatively compared via the spreading area of a water drop where the area of the water drop will be greater for the more hydrophilic material. Increased hydrophilicity of a porous material used for filtration is desirable for increasing flux and reducing fouling.

Figure 38:
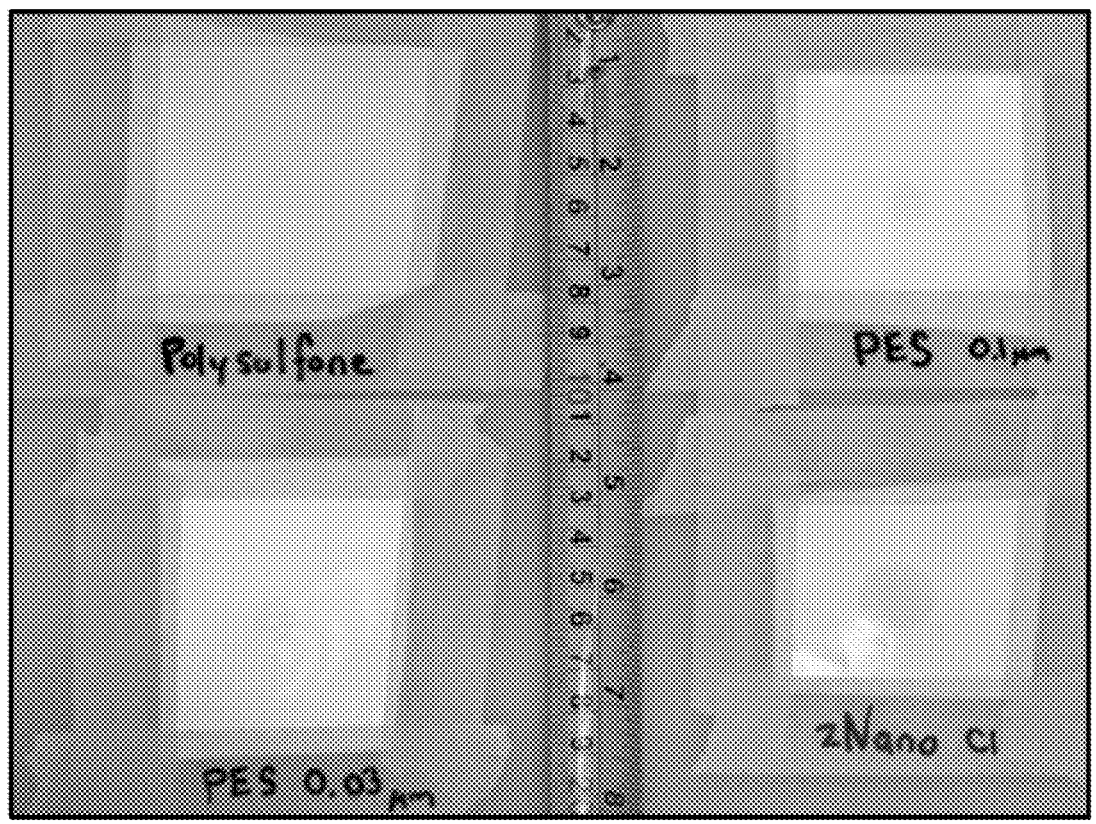
FIG. 38 shows increased wetting of microfiltration membranes by coating with a mesostructured sol gel film.

FIG. 38 shows the relative spreading of a water droplet on materials with and without a mesostructured sol gel film. The top left material (Polysulfone) is a polysulfone ultrafiltration membrane with a 100,000 Dalton molecular weight cutoff (MWCO). It is a control without the mesostructured film. The bottom left material (0.03 um PES) is a microfiltration membrane with an average pore diameter of 0.03 microns. It is a control without a mesostructured film. The top right material (0.1 um PES) is a microfiltration membrane with an average pore diameter of 0.1 microns. It is a control without a mesostructured film. The bottom right material (zNano C1) is a mesostructured sol gel thin film coated on a microfiltration membrane with an average pore diameter of 0.03 microns. The mesostructured thin film was created from a self assembly solution. The self assembly solution was prepared by adding cetyl trimethyl ammonium bromide (CTAB), a cationic single chain surfactant, to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. The support membrane is then rinsed in water, oxidized then coated with the self assembly solution. The resulting thin film can be annealed via the addition of alcohol after coating. Using this method, thin films are cured for >48 hrs at >40 Celsius. In the middle of the image is a ruler to provide a scale bar for the image. To measure hydrophilicity, 10 microliters of water purified using reverse osmosis was placed on each material. The diameter of each water drop (clockwise from top left) was 0.298 cm, 0.923 cm, 1.726 cm, and 0.893 cm. The material with the mesoporous sol gel film had increased wettability in comparison to the Polysulfone, the PES 0.03 um and the PES 0.1 um materials. As the pore size of the non-mesostructured control materials increased, the spreading of water increased despite the comparable hydrophilicity of polysulfone (Polysulfone) and polyethersulfone (PES 0.03 um and PES 0.1 um). The mesostructured material does not conform to this trend. Despite the smaller pore size (0.03 um pore), the material with the mesostructured sol gel films had comparable or superior hydrophilicity to the PES 0.1 um membrane (0.1 um pore).

Figure 39:
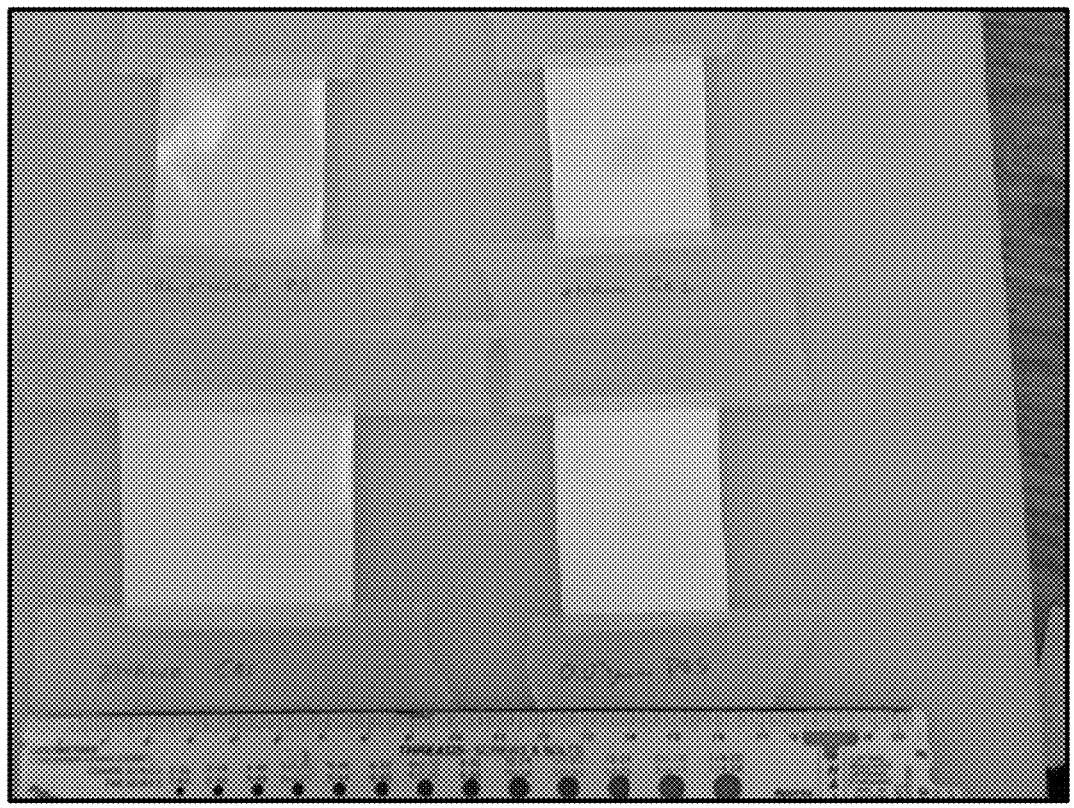
FIG. 39 shows increased wetting of ultrafiltration membranes by coating with a mesostructured sol gel film.

FIG. 39 shows the relative spreading of a water droplet on materials with and without a mesostructured sol gel film. The top left material (10k MWCO PS) is a polysulfone ultrafiltration membrane with a 10,000 Dalton molecular weight cutoff (MWCO). It is a control without the mesostructured film. The bottom left material (zNano CA1) is a mesostructured sol gel thin film on an ultrafiltration membrane resulting in a material with a MWCO of 35,000 Daltons. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. 1. Support membrane is then rinsed in water, oxidized then coated with the self assembly solution. The resulting thin film can be annealed via the addition of alcohol after coating. Using this method, thin films are cured for >48 hrs at >40 Celsius. The top right material (zNano CA2) is a mesostructured sol gel thin film on an ultrafiltration membrane resulting in a material with a MWCO of 35,000 Daltons. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CTAB is a cationic single chain surfactant. The bottom right material (0.03 um PES) is a microfiltration membrane with an average pore diameter of 0.03 microns. It is a control without a mesostructured film. At the bottom of the image is a ruler to provide a scale bar for the image.

To measure hydrophilicity, 10 microliters of water purified using reverse osmosis was placed on each material. An image of the result is provided in FIG. 39. The diameter of each water drop (clockwise from top left) was 0.267 cm, 1.03 cm, 0.76 cm, and 0.73 cm. The materials with the mesoporous sol gel films had increased wettability in comparison to both the 10k MWCO PS and the 0.03 um PES material. As the pore size of the non-mesostructured control materials increased, the spreading of water increased despite the comparable hydrophilicity of polysulfone (10k MWCO PS) and polyethersulfone (0.03 um PES). The mesostructured material does not conform to this trend. The materials with the mesostructured sol gel films had comparable or superior hydrophilicity to the 0.03 um PES membrane despite their smaller pore size (35,000 daltons MWCO).

Mesostructured sol gel thin films comprising single chain surfactants on a porous material improve the porous material's function as a filter relative to the uncoated porous material. The classes of solutions where filtration is improved are solutions containing surfactants and emulsions. Plausibly, this is because the mesostructured has improved hydrophilicity and is composed of a large fraction of surfactants. Emulsions are defined as solutions comprising at least water, surfactants and organic molecules. There can be one or more moieties of surfactants. There can be one or more moieties of organics.

Figure 40:
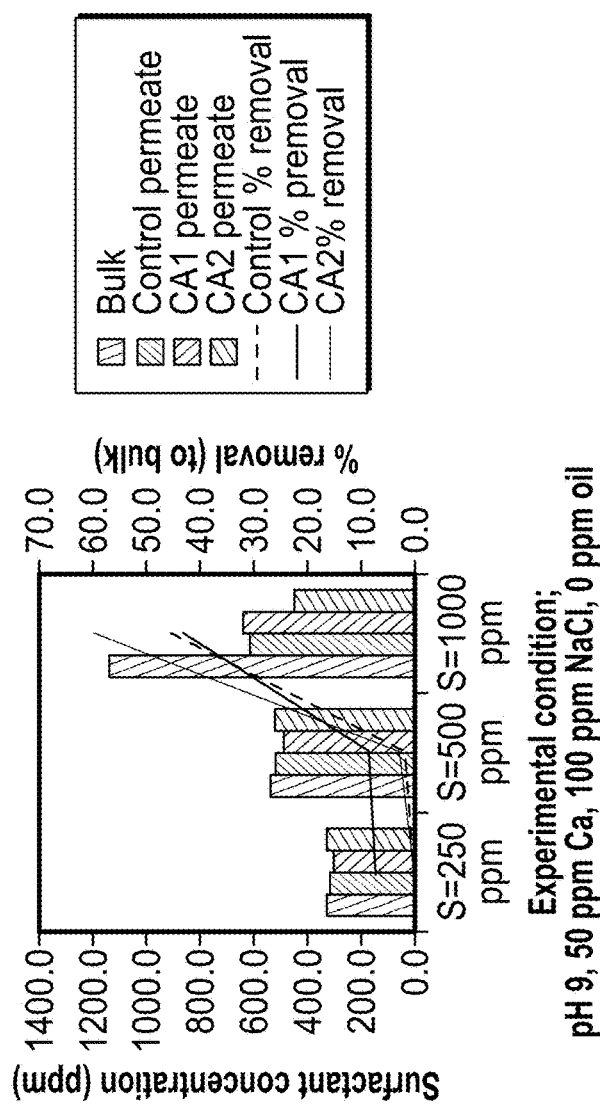
FIG. 40 demonstrates the improved filtration properties of a porous material coated with a mesostructured sol gel film for solutions containing surfactants and no oil.

FIG. 40 demonstrates the improved filtration properties of a porous material with and without a mesostructured sol gel film for a solution containing surfactants. The solution filtered was 100 ppm NaCl, 50 ppm CaCl, and between 250 ppm and 1000 ppm sodium dodecyl benzene sulfonate (SDBS). The pH of the solution was adjusted to 9 using NaOH. After preparation, the solution, Bulk was filter by three 1"×3" materials, Control, CA2, CA1, in parallel using a homemade crossflow filtration cell in a dead end mode, meaning 100% water recovery. Materials filtered the Bulk solution for at least 10 minutes before beginning the experiment. The pressure was 5.5 PSI. All turbidity and permeability data is after one hour of filtration. All optical absorption measurements are after 40 minutes of filtration.

FIG. 40 compares the surfactant concentration of four samples (Bulk, Control, CA 1, and CA 2) are compared in the graph on top of Slide 3. Bulk is the solution filtered. Control is a polyethersulfone (PES) membrane with an average pore size of 0.1 microns. CA1 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CA2 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CTAB is a cationic single chain surfactant.

The top of FIG. 40 is a double y-axis column graph which compares the removal of surfactants by a porous material with and without a mesostructured sol gel film as a function of surfactant concentration. The values corresponding to the left side y-axis are the columns and are a measure of the concentration of surfactants as measured by the optical absorption of the benzene ring. The values corresponding to the right y-axis are the lines and are the rejection of surfactant calculated using the equation below:

$$\text{Rejection} = \frac{C_{bulk} - C_{permeate}}{C_{bulk}}$$

Below the graph is a table with five columns. The first column ('Experiment') lists the concentration of the solutes and the pH of the feed water. The second column ('SDBS ppm') lists the concentration of the SDBS in the feed water. The third column ('SDBS NTU') lists the turbidity of the feedwater. The final two columns are the filtration properties of the materials: permeability ('permeability'), measured in gallons per square feet of membrane per day and turbidity ('NTU'), measure in Nephelometric Turbidity Units (NTU).

The graph in FIG. 40 demonstrates the improved rejection of the porous material with a mesostructured sol gel film. With 250 ppm to 500 ppm of surfactant, the rejection of surfactant of the porous material with and without a mesostructured sol gel film is less than 10%. With 1000 ppm of surfactant, the rejection of the surfactant by each material is greater than 40%. The rejection of the surfactant by the CA2 material is 15% greater than the Control material. At 1,000 ppm, SDBS is at a concentration greater than its critical micelle concentration, known to be approximately 418 ppm. The result is larger average particle size enabling rejection by the materials. The increase in rejection by the CA2 material is most likely due to the decrease in the material's pore size.

The table in FIG. 40 demonstrates the improved permeability and rejection of the porous material with a mesostructured sol gel film. At low concentrations of surfactant, the permeability of CA1 and CA2 are lower than the Control. This is expected due to the addition of the mesostructured material on both porous materials, CA2 and CA1. At 1,000 ppm of surfactant, unexpectedly the permeability of both the CA2 and CA1 materials were greater than the control. The CA2 material has 34% greater permeability than the control. The CA1 material has 19% greater permeability than the control. This is most likely due to the improved wetting of the materials, CA1 and CA2 in comparison to the Control. A comparison of turbidity numbers in each column within each row confirm the results of the measurements conducted by optical absorption. There is at most 20% rejection of SDBS at concentrations below 500 ppm. At 1,000 ppm of SDBS, the rejection of each material as measured by turbidity is 62%, 69% and 73% for the CA2 material, CA1 material, and Control material. The increase in rejection at 1,000 ppm is consistent with the optical absorption measurements. The relative rejection between the CA2 material and the Control material is inconsistent since the rejection of CA2 is higher in absorption measurements and the rejection of the Control material is higher in turbidity measurements. Because turbidity is a scattering technique, scattering intensity is a function of both particle size and particle concentration. Therefore, the filtration of the surfactants through CA2 may produce fewer, smaller particles. If this is true, the permeate would have higher turbidity despite lower concentration. Therefore, the optical absorption technique is more reliable.

Figure 41:
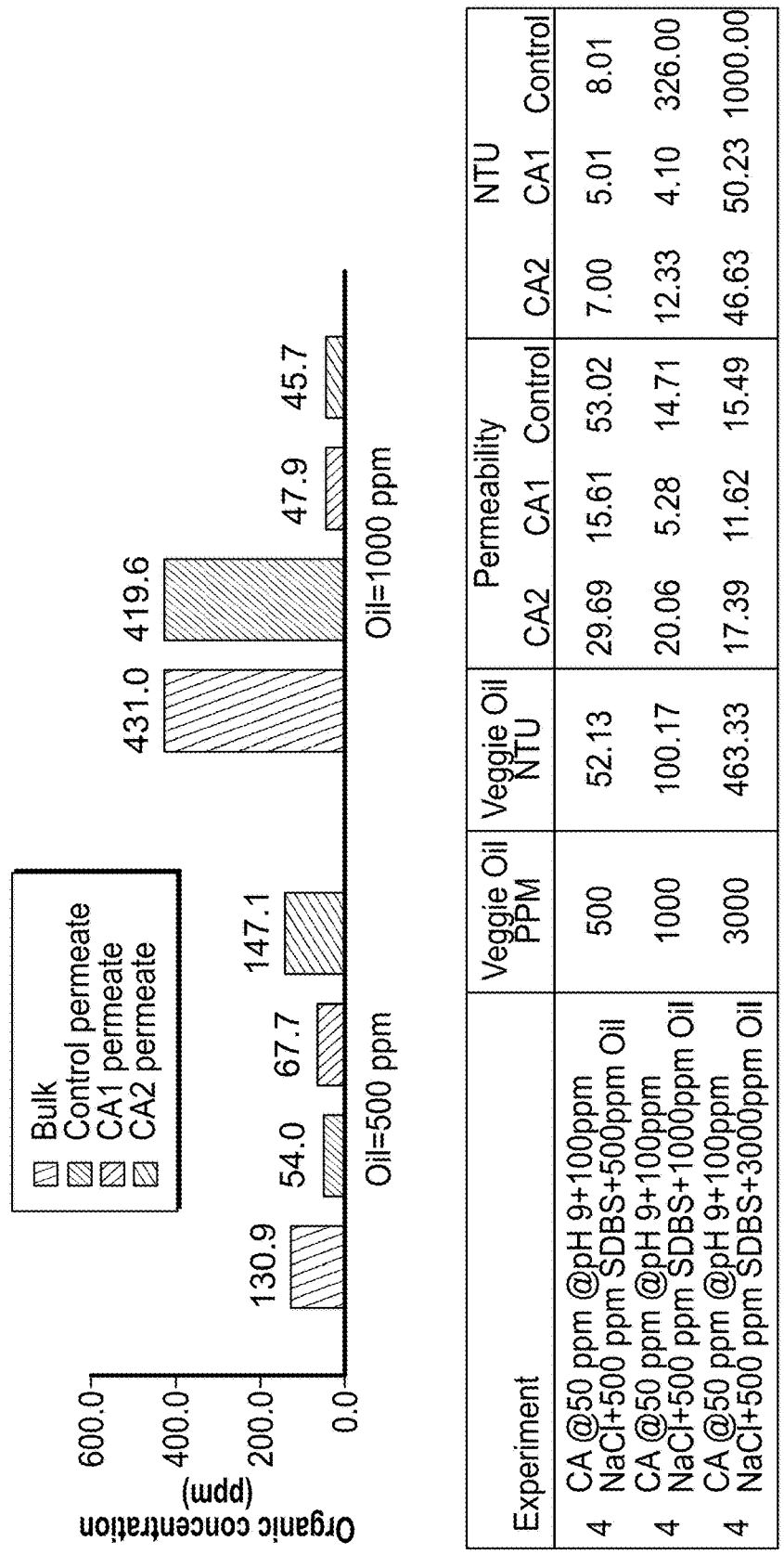
FIG. 41 demonstrates the improved filtration properties of a porous material coated with a mesostructured sol gel film for solutions containing surfactants and oil.

FIG. 41 demonstrates the improved filtration properties of a porous material with and without a mesostructured sol gel film for filtering an emulsion. To produce the emulsion, the following protocol was used. Briefly, a solution of 500 ml of 18.2 MOhm water, containing 200 milligrams of sodium chloride, 100 milligrams of calcium chloride and between 500 milligrams and 2,000 milligrams of sodium dodecylbenzene sulfonic acid (SDDBSA) was prepared. The solution was mixed for two minutes on a hot plate at room temperature using a stir bar. The pH of the solution was adjusted to 9 using sodium hydroxide. An emulsion was created via the addition of 1 gram to 6 grams of vegetable oil ('Veggie Oil'). The emulsion was subsequently stirred for one hour on a hot plate at room temperature. Finally, the emulsion was added to 1500 liters of pH 9 18.2 MOhm water. The resulting solution was circulated with a small pump to enable mixing. After preparation, the emulsion, Bulk was filter by three 1"×3" materials, Control, CA2, CA1, in parallel using a homemade crossflow filtration cell in a dead end mode, meaning 100% water recovery. Materials filtered the Bulk solution for at least 10 minutes before beginning the experiment. The pressure was 5.5 PSI. All turbidity and permeability data is after one hour of filtration. All optical absorption measurements are after 40 minutes of filtration.

The graphs in FIG. 41 compare the surfactant concentration of four samples (Bulk, Control, CA 1, and CA 2). Bulk is the solution filtered. Control is a polyethersulfone (PES) membrane with an average pore size of 0.1 microns. CA1 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CA2 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. The graphs compare the removal of organics by a porous material with and without a mesostructured sol gel film as a function of oil concentration. The values corresponding to the y-axis are the columns and are a measure of the concentration of Veggie Oil as measured by the optical absorption of the benzene ring.

The first column in the table in FIG. 41 ('Experiment') lists the concentration of the solutes and the pH of the feed water. The second column ('Veggie Oil PPM') lists the concentration of the SDBS in the feed water. The third column ('Veggie Oil NTU') lists the turbidity of the solution to be filtered ('Bulk'). The final two columns are the filtration properties of the materials: permeability ('permeability'), measured in gallons per square feet of membrane per day and turbidity ('NTU'), measure in Nephelometric Turbidity Units (NTU).

The graphs in FIG. 41 demonstrate the improved rejection of the porous material with a mesostructured sol gel film. With 500 ppm of Veggie Oil, the rejection of organics is 58.7% by the Control, 48.2% by CA1 and −12.4% by CA2. This demonstrates improved rejection by the Control at 500 ppm. With 1000 ppm of Veggie oil, the rejection is 2.6% for the Control, 88.9% for CA1, and 89.4% for CA2. This demonstrates the rejection of the porous material with a mesostructured sol gel film when filtering highly concentrated emulsions.

The table in FIG. 41 demonstrates the improved permeability and rejection of the porous material with a mesostructured sol gel film. It also confirms the measurements in the graph above. At 500 ppm of Veggie Oil, the permeability of CA1 and CA2 are lower than the Control. This is expected due to the addition of the mesostructured material on both porous materials, CA2 and CA1. At 1,000 ppm of Veggie Oil, unexpectedly the permeability of CA2 is 36% greater than the Control. This is consistent with the relative increase in permeability, 34%, of CA2 when filtering 1,000 ppm SDBS in FIG. 40. The CA1 material has 36% of the permeability of the control suggesting increased fouling of the surface. A comparison of turbidity numbers in each column within each row confirm most of the results of the measurements conducted by optical absorption. The permeability of CA2 is 12% greater than the Control at 3,000 ppm of Veggie Oil. One specific difference is the rejection of turbidity by the CA2 material at a concentration of 500 ppm Veggie Oil is 86.6%. This suggests that either the optical absorption measurement or the turbidity measurement is incorrect. Because the rejection of the CA2 is greater the 80% for 1,000 ppm of Oil by both turbidity and optical absorption, and greater than 80% at 3,000 ppm of Veggie Oil by turbidity, the optical absorption measurement at 500 ppm was most likely contaminated. In contrast, at both 1,000 and 3,000 ppm of Veggie Oil, the Control membrane has zero rejection by turbidity and optical absorption measurements. By eye, the Control permeate is indistinguishable from the Bulk at both 1,000 ppm and 3,000 ppm of oil. In comparison at 1,000 ppm of Veggie Oil, the CA2 and the CA1 materials produce 89.4% and 88.9% rejection by optical absorption, 87.7% and 96.0% rejection by turbidity respectively. In comparison at 3,000 ppm of Veggie Oil, the CA2 and the CA1 materials produce 90.0% and 89.2% rejection by turbidity respectively. This demonstrates the improved ability of the material to filter emulsions.

Water from the bilge of a boat ('Bilge Water') needs to be treated before it is discharged. Bilge water is composed of particles, oil, and surfactants. To compare the purification efficiencies of various membrane technologies, we created an oil water emulsion using a modified versions of Resolution MEPC. 107(49) Revised. Briefly, 0.9 g of either negatively charged Sodium Dodecylbenzene Sulfonic Acid (SDBSA) or positively charged cetyl trimethyl ammonium bromide (CTAB) was mixed with 178 ml of Tap Water for two minutes on a hot plate at room temperature. The emulsion was created via the addition of 9 g of SAE 20W-50 Valvoline and was subsequently stirred for one hour on a hot plate at room temperature. Finally, the emulsion was added to Tap Water such that the emulsion was 6 wt % of the final solution. For emulsions containing 30,000 ppm of NaCl ('Oil Water Emulsion 03+33 g per L NaCl'), 100 g of Instant Ocean (www.instantocean.com) was also added to the final solution. The final solution was mixed using a centripetal pump for one hour. The concentration of Valvoline was roughly 3,000 ppm in the final solution. It is important to note that there are zero suspended solids other than those in the emulsion. A table quantifying the turbidity of each model bilge water prepared is below.

TABLE 6

| Bilge Water Emulsion Turbidity | Surfactant Charge | Turbidity [NTU] |
| --- | --- | --- |
| Oil Water Emulsion 01 | Anionic | 264-514 |
| Oil Water Emulsion 02 | Cationic | >1000 |
| Oil Water Emulsion 03 + 33 g per L NaCl | Anionic | 98.7-162 |

It is important to note that there are zero suspended solids other than those in the emulsion.

Figure 42:
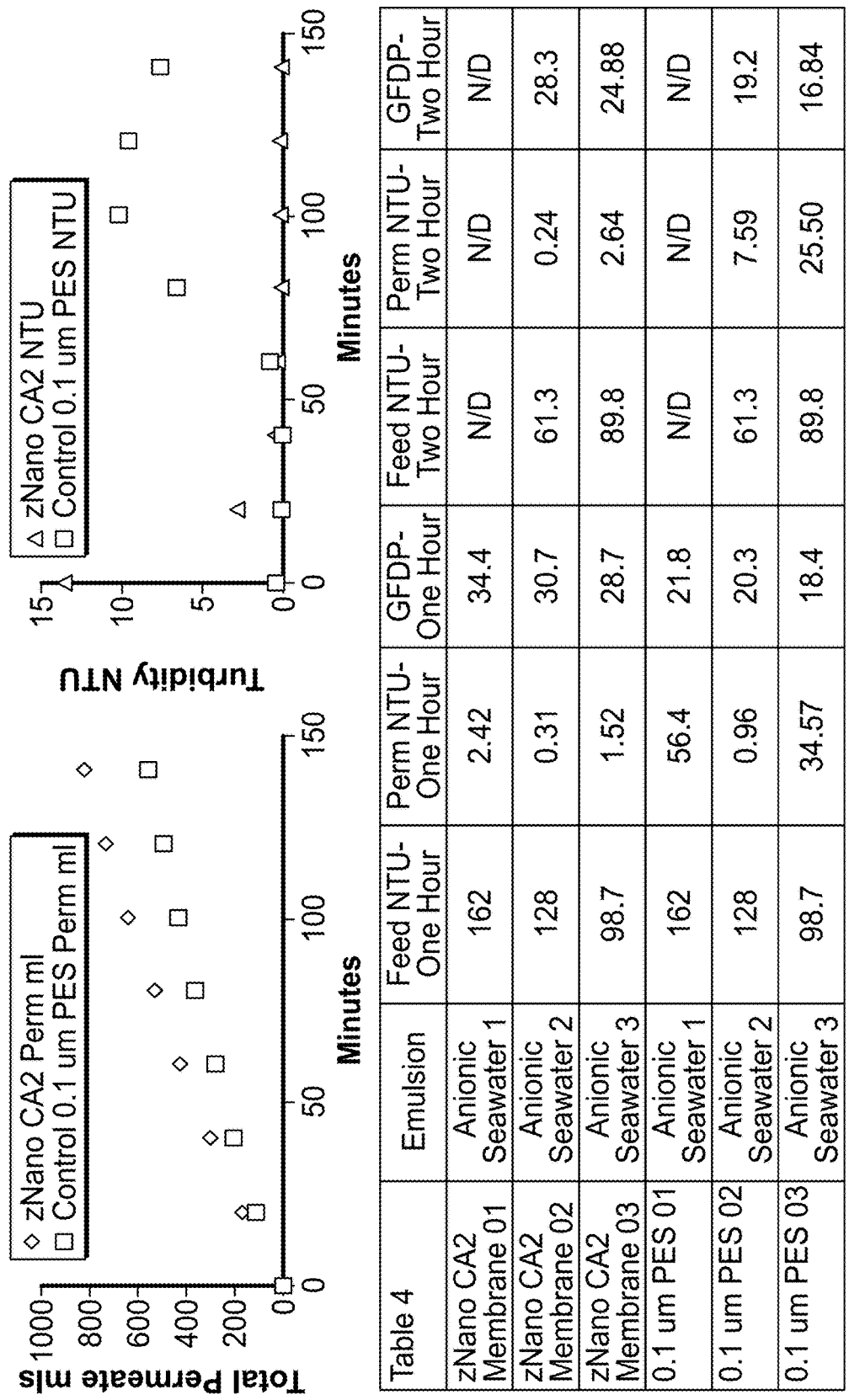
FIG. 42 demonstrates improved model bilge water filtration properties of a porous material when coated with a mesostructured sol gel film.

FIG. 42 demonstrates the improved model bilge water filtration properties of a porous material with a mesostructured sol gel film compared to a porous material without a mesostructured sol gel film. FIG. 42 compares the permeability and rejection of two materials, zNano CA2 ('CA2') and 0.1 um PES ('Control'). The Model Bilge Water was "Oil Water Emulsion 03+33 g per L NaCl". Control is a polyethersulfone (PES) membrane with an average pore size of 0.1 microns. CA2 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CTAB is a cationic single chain surfactant. After preparation, the emulsion, was filter by two 1"×3" materials, Control, CA2, in parallel using a homemade cross flow filtration cell in tangential flow filtration mode resulting in ~5% water recovery. Materials filtered the Bulk solution for at least 10 minutes before beginning the experiment. The pressure was 4.0 PSI. Turbidity and permeability data is reported every 20 minutes in the graphs on top of FIG. 42. Turbidity and permeability measurements were reported every hour in the table on the bottom of FIG. 42.

The top graph of FIG. 42 is a plot of the volume of permeates vs. time for both CA2 and the control filtering Model Bilge Water. The middle graph of FIG. 42 is a plot of permeate turbidity vs. time for both CA2 and the control filtering Model Bilge Water. After 140 minutes, CA2 had filtered 47.6% more water than the Control and the CA2 has turbidity rejection of 99.6% compared to 88.5% rejection of turbidity for the Control. This result demonstrates improved model bilge water filtration properties of a porous material with a mesostructured sol gel film compared to a porous material without a mesostructured sol gel film.

The table in FIG. 42 contains three experiments comparable to the above experiments. The first column is the material being used as a filter. The second column identifies which emulsion is being filtered, Anionic Seawater N; where N is the batch number and Anionic Seawater is prepared using the method previously described to create 'Oil Water Emulsion 03+33 g per L NaCl'. The third and fourth columns are a measurements of the bulk water's and the permeate water's turbidity after one hour. The fifth column is a measurement of the permeability of the material after one hour of filtration. The sixth and seventh columns are a measurements of the bulk water's and the permeate water's turbidity after two hours. The seventh column is a measurement of the permeability of the material after two hours of filtration.

The average increase in permeability of CA2 relative to the Control was 55.0% after one hour, and 47.6% after two hours. The average turbidity rejection of CA2 was 98.9% after one hour and 98.1% after two hours. This was superior to the Control. The average turbidity rejection of Control was 76.3% after one hour and 78.1% after two hours.

The charge of the headgroups of the surfactant can be changed to increase the permeability of the material. FIG. 43 contains a table where the charges of the surfactants comprising the mesostructure have been varied. The resulting structures were used to filter an anionic model bilge water. To create anionic model bilge water, we created an oil water emulsion using a modified version of Resolution MEPC. 107(49) Revised ('Model Bilge Water') (Revised guidelines and specifications for pollution prevention equipment for machinery space bilges of ships. MEPC 49/22/Add 2. ANNEX 13 Adopted Jul. 18, 2003.) Briefly, 0.9 g of anionic Sodium Dodecylbenzene Sulfonic Acid (SDDBSA) was mixed with 178 ml of Tap Water for two minutes on a hot plate at room temperature. The emulsion was created via the addition of 9 g of SAE 20W-50 Valvoline and was subsequently stirred for one hour on a hot plate at room temperature. Finally, the emulsion was added to Tap Water such that the emulsion was 6 wt % of the final solution. The permeability and rejection of five materials, CTAB 2:1 (+), DDO 2:1 (U), 50/50 CTAB/LA (N), Lauric Acid 2: MTAB 1(−), and the Control (U), filtering anionic model bilge water were compared to a Control. Control is a polyethersulfone (PES) membrane with an average pore size of 0.1 microns. CTAB 2:1 (+), DDO 2:1 (U), 50/50 CTAB/LA (N), and Lauric Acid 2: MTAB 1(−) are mesostructured sol gel thin film on a microfiltration membrane with an average pore size of 0.1 microns. The mesostructured thin film was created from a self assembly solution. The self assembly solution was prepared by adding surfactant to 0.32:0.64:0.04 volumetric parts of tetraethylorthosilicate, ethanol and water. The amount of surfactant added resulted in a final concentration of eight weight percent. The surfactant(s) used in each material and their relative molar ratios are listed in Table 7 below.

TABLE 7

| Chemistry | Surfactant 1 | Surfactant 2 | Molar Ratio of Surfactant 1 to Surfactant 2 |
| --- | --- | --- | --- |
| CTAB 2:1 (+) | Cetyl Trimethyl Ammonium Bromide | NONE | 1:0 |
| DDO 2:1 (U) | Dodecanol | NONE | 1:0 |
| 50/50 CTAB/LA (N) | Cetyl Trimethyl Ammonium Bromide | Lauric Acid | 1:1 |
| Lauric Acid 2:MTAB 1 (−) | Myristyl trimethyl ammonium bromide | Lauric Acid | 1:2 |

Finally, the self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. After preparation, the emulsion, was filtered by two of the 1"×3" materials:CTAB 2:1 (+), DDO 2:1 (U), 50/50 CTAB/LA (N), or Lauric Acid 2:MTAB 1 (−) and one 1"×3" Control material in parallel using three homemade cross flow filtration cell in tangential flow filtration mode resulting in ~5% water recovery. Materials filtered the Bulk solution for at least 10 minutes before beginning the experiment. The pressure was 4.0 PSI. Permeability and turbidity reported were measured after one hour.

The table in FIG. 43 compares four porous materials comprising four different mesostructured sol gel films to a porous material without a mesostructured sol gel film, Control. The first column of the table ('Chemistry') identifies the material's chemistry. The second column of the table ('Surfactant Charge') identifies the surface charge of each material. The third column of the table ('GFD/PSI') reports the permeability of each material in gallons per square feet per day per psi (GFDP). The fourth column of the table ('Turbidity') reports the turbidity of the water filtered by the material. By changing the surfactant in the thin film mesostructure, the permeability could be varied from 2.48 GFDP to 13.0 GFDP. Two materials had permeability greater than the control, 7.38 gfdp. Those materials were DDO 2:1 (U) (13.0 GFDP) and Lauric Acid 2:MTAB 1 (−) (9.29 GFDP). For the mesostructured samples, turbidity decreased with permeability. The correlation of rejection of turbidity and permeability suggests that the differences in performance are a result of differences in pore size. Filtration was unstable using the Control. In two of three samples, the turbidity of filtrate was greater than or equal to the Model Bilge Water being filtered. All of the permeates from the mesostructured thin film materials had turbidity less than both the Model Bilge Water turbidity and the average permeate of the Control, 399 NTU+601/−396.

Coatings of the present invention improve ultrafiltration of an emulsion. To produce the emulsion, the following protocol was used. Briefly, a solution of 500 ml of reverse osmosis water, containing 200 milligrams of sodium chloride, 100 milligrams of calcium chloride and 500 milligrams of sodium dodecylbenzene sulfonic acid (SDDBSA) was prepared. The solution was mixed for two minutes on a hot plate at room temperature using a stir bar. The pH of the solution was adjusted to 9 using sodium hydroxide. An emulsion was created via the addition of 1 gram to 6 grams of vegetable oil ('Veggie Oil'). The emulsion was subsequently stirred for one hour on a hot plate at room temperature. Finally, the emulsion was added to 1500 liters of pH 9 reverse osmosis water. The resulting solution was circulated with a small pump to enable mixing.

After preparation, the emulsion was filtered by two 1"×3" materials, CA2 and a Control ultrafiltration membrane with a molecular weight cutoff 35,000 daltons. Filtration through the two materials was done in parallel using a homemade crossflow filtration cell in a dead end mode, meaning 100% water recovery. Materials filtered the Bulk solution for at least 10 minutes before beginning the experiment. The pressure was 5.5 PSI. All turbidity and permeability data is after one hour of filtration.

In one experiment, the filtration performances (permeability and turbidity rejection) of two materials, PS35k MWCO and CA2 PS35k MWCO was compared. CA2 PS35k MWCO is a mesostructured sol gel thin film on the same 35,000 molecular weight polysulfone (PS 35k MWCO) membrane. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CTAB is a cationic single chain surfactant.

TABLE 8

| Membrane | GFD per PSI | Turbidity Rejection |
| --- | --- | --- |
| CA2 PS35k MWCO | 3.11 | 99.8% |
| PS35k MWCO | 1.13 | 99.2% |

Table 8 compares both the permeability and the turbidity rejection of PS35k MWCO and CA2 PS35k MWCO. PS35k MWCO is a porous material without a mesostructure and CA2 PS35k MWCO is a porous material with a mesostructured sol gel film. The first column ('membrane') identifies which material was used for the filtration. The second column (GFD per PSI) reports the permeability of the materials after one hour of filtration in gallons per square foot per day per psi (GFDP). The final column ('turbidity rejection') reports the rejection of turbidity in percentage after one hour of filtration. Turbidity is measured for the feedwater ($NTU_{feed}$) and the permeate ($NTU_{permeate}$) for both materials in NTU. Rejection is calculated according to the equation below:

$$\text{Rejection} = \frac{NTU_{feed} - NTU_{permeate}}{NTU_{feed}}$$

Table 8 shows that the permeability of the porous material with a mesostructured sol gel thin film (CA2 PS35k MWCO) has a permeability 2.75× greater than porous material without a mesostructured sol gel thin film (PS35k MWCO). A comparison of the turbidity rejection between the two materials reveals comparable results. The porous material with the mesostructured sol gel thin film (CA2 PS35k MWCO) has a turbidity rejection of 99.8% and the porous material without the mesostructured sol gel thin film (PS35k MWCO) has a turbidity rejection of 99.2%. The feed water was 1.513 NaBBS (500 ppm), 9.14 g Veg Oil (3000 ppm), 3000.39 g RO H2O, pH 9, and had a turbidity of greater than 1000 ($NTU_{feed}$).

One application of porous materials with a mesostructured sol gel thin films is to improve the filtration rate of laundry water in comparison to porous materials without a mesostructured sol gel thin films. The washing machine used was a Whirpool top loading washing machine. The amount of detergent ("all" free & clear), was used at the recommended level by the manufacturer. The load was a cold water, color wash of clothes mostly worn for office work. Laundry water (1.5 gallons) was collected between 8 and 16 minutes into the first cycle. The turbidity and conductivity of the laundry water were measured daily due to the continuous settling of particles within the water. Table 9 shows the results of measurements of the turbidity and conductivity of laundry water after 1, 2 and 4 days. Turbidity was measured using a 2100 Portable Turbidimeter from Hach. The water conductivity was measured using an Oakton Acron CON 6 portable conductivity meter.

TABLE 9

| Waste Water Characterization | DAY | Conductivity | NTU |
| --- | --- | --- | --- |
| Laundry Water Sample 1 | 1 | 1563 uS | 71.0 |
| Laundry Water Sample 1 | 2 | 1555 uS | 66.2 |
| Laundry Water Sample 1 | 4 | 1612 uS | 49.0 |

Figure 44B:
FIGS. 44A and B show the effectiveness of an embodiment of the present invention when filtering turbid laundry waste water.
Figure 44A:
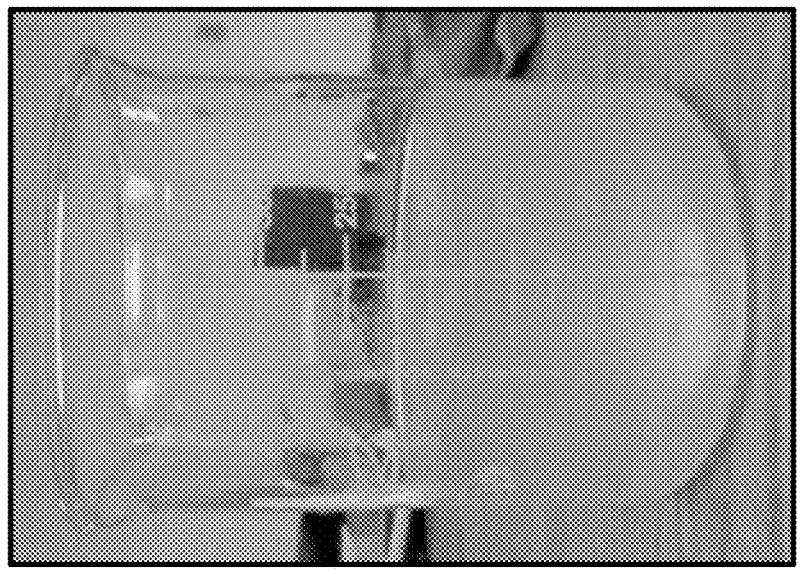

FIG. 44A is a picture of a beaker with 180 ml of the sourced wash water having a turbidity (i.e. water clarity) of 71 NTU. FIG. 44B is a picture comparing approximately 15 mls of tap water (for reference), zNano CA1 membrane filtered laundry water (described later), and unfiltered laundry water. This comparison reveals that the zNano CA 1 membrane removes most of the turbidity (cloudiness) of the laundry water. Below is a table characterizing both the turbidity and the conductivity of a typical waste laundry water sample over a four day period. The waste laundry water sample is the same in each row. The quality of the laundry water sample improves due to the slow settling of solids.

After collection, the sample was filtered by three 1"×3" materials, CA2, CA1 and a Control material. Filtration through the three materials was done in parallel using a homemade crossflow filtration cell in a dead end mode, meaning 100% water recovery. Materials filtered the Bulk solution for at least 10 minutes before beginning the experiment. The pressure was 5.5 PSI. All conductivity, turbidity and permeability data is after one hour of filtration. Control is a polyethersulfone (PES) membrane with an average pore size of 0.1 microns. CA1 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CA2 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CTAB is a cationic single chain surfactant.

TABLE 10

| Membrane | GFD per PSI | Turbidity Rejection | Conductivity Rejection |
| --- | --- | --- | --- |
| CA2 | 5.78 | 97.2% | −0.63% |
| CA1 | 4.30 | 97.00% | 0.78% |
| Control | 4.02 | 98.7% | 0.15% |

Table 10 compares the permeability, turbidity rejection, and conductivity rejection of CA2, CA1, and the Control. The first column ('membrane') identifies which material was used for the filtration. The second column (GFD per PSI) reports the permeability of the materials after one hour of filtration in gallons per square foot per day per psi (GFDP). The third column ('turbidity rejection') reports the rejection of turbidity in percentage after one hour of filtration. Turbidity is measured for the feedwater ($NTU_{feed}$) and the permeate ($NTU_{permeate}$) for both materials in NTU. Rejection is calculated according to the equation below:

$$Rejection = \frac{NTU_{feed} - NTU_{permeate}}{NTU_{feed}}$$

The fourth column ('conductivity rejection') reports the rejection of conductivity in percentage after one hour of filtration. Conductivity measures total dissolved solids within a water sample in ppm (parts per million), and is reported for the feedwater (ppm feed) and the permeate ($ppm_{permeate}$) from both materials. Rejection is calculated according to the equation below:

$$Rejection = \frac{PPM_{feed} - PPM_{permeate}}{PPM_{feed}}$$

The data in Table 10 confirms that the filtration properties of a porous material with a mesostructured sol gel film are improved compared to a porous material without a mesostructured sol gel film when filtering laundry water samples. The permeability of the CA2 and the CA1 material were 43.8% and 7.0% higher relative to the Control. All three materials have comparable turbidity rejection within 98%+/−1% and conductivity rejection of 0%+/−1%.

Table 11 describes the laundry water samples filtered by the three materials. Column one ('laundry water samples') identifies the sample. Column two ('turbidity') is a measure of the turbidity of the laundry water samples ($NTU_{feed}$). Column three ('conductivity') is a measure of the total dissolved solids of the laundry water samples ($ppm_{feed}$). The average turbidity of the laundry water samples was 83.3 NTU and the average conductivity was 717 ppm.

TABLE 11

| laundry water samples | Turbidity | Conductivity |
| --- | --- | --- |
| Sample 1 | 186 | 720 |
| Sample 2 | 29.1 | 674 |
| Sample 3 | 34.4 | 758 |
| Average | 83.3 | 717 |

FIG. 45 demonstrates the improved filtration properties of a porous material with a mesostructured sol gel film compared to a porous material without a mesostructured sol gel film when filtering 35,000 Dalton polyethylene glycol (PEG 35k). The PEG 35k Solution is prepared by mixing PEG 35k with reverse osmosis water resulting in a solution with a final PEG 35k of 1.0 wt %. After preparation of the PEG 35k Solution, the sample was filtered by three 1"×3" materials, CA2 PS100k, CA1 PS100k and a PS100k material. Filtration through the three materials was done in parallel using a homemade crossflow filtration cell in a dead end mode, meaning 100% water recovery. Materials filtered the Bulk solution for at least 10 minutes before beginning the experiment. The pressure was 5.5 PSI. All PEG 35k concentration measurements are performed using refractometry. PS100k is a polysulfone ultrafiltration membrane with a molecular weight cutoff of 100,000 Daltons. CA1 PS100k is a mesostructured sol gel thin film on a polysulfone ultrafiltration membrane with a molecular weight cutoff of 100,000 Daltons. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CA2 PS100k is a mesostructured sol gel thin film on a polysulfone ultrafiltration membrane with a molecular weight cutoff of 100,000 Daltons. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CTAB is a cationic single chain surfactant.

Figure 45A:
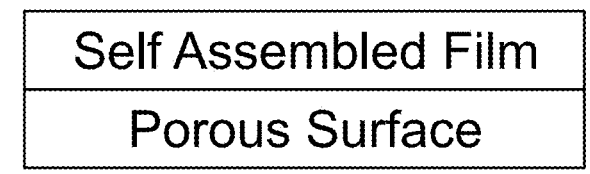
FIG. 45A is a schematic of a surfactant templated thin film assembled on a porous surface.
Figure 45B:
FIG. 45B is a schematic of an embodiment of a mesostructured sol gel film.

FIG. 45A is a schematic illustrating the CA2 PS100k and the CA1 PS100k materials. Specifically, a surfactant templated thin film is assembled on a porous surface. FIG. 45B is a schematic of an embodiment of a mesostructured sol gel film. The material is a multiscale self assembled material. On the microscale is the assembly of the two films: A and B. In this embodiment, A is a nanostructured thin film and B is a porous membrane. On the nanoscale is the assembly of alternating lamella of silica and lipid bilayers illustrated in A. Table 12 shows the increase in rejection of 35,000 molecular weight poly ethylene glycol by the material after the creation of the self assembled film on the porous surface. Specifically, Table 12 compares the PEG 35k rejection of CA2 PS100k, CA1 PS100k, and a PS100k. The first column ('membrane') identifies which material was used for the filtration. The second column (MW) reports the molecular weight of the polyethylene glycol (PEG) in the solution to be filtered. The third column ('turbidity rejection') reports the rejection of PEG in percentage after one hour of filtration. PEG concentration, measured using refractometry, is measured in the feed (brix$_{feed}$) and in the permeate (brix$_{permeate}$) for all materials. Rejection is calculated according to the equation below:

$$\text{Rejection} = \frac{brix_{feed} - brix_{permeate}}{brix_{feed}}$$

As expected, the PS100k rejects 0% of 35,000 molecular weight PEG. The addition of either mesostructured sol-gel film, CA2 or CA1, results in a material which rejects 80% of PEG 35k.

TABLE 12

| Membrane | MW | Rejection |
|---|---|---|
| CA2 PS100k | 35,000 | 80.00% |
| CA1 PS100k | 35,000 | 80.00% |
| PS100k | 35,000 | 0.0% |

A porous material with a mesostructured sol gel film compared to a porous material without a mesostructured sol gel film exhibits improved filtration properties when filtering laundry water samples. After collection of the laundry water sample, the sample was filtered by three 1"×3" materials, CA2 PS100k, CA1 PS100k and a PS100k material. Filtration through the three materials was done in parallel using a homemade crossflow filtration cell in a dead end mode, meaning 100% water recovery. Materials filtered the Bulk solution for at least 10 minutes before beginning the experiment. The pressure was 5.5 PSI. All conductivity, turbidity and permeability data is after one hour of filtration. PS100k is a polysulfone ultrafiltration membrane with a molecular weight cutoff of 100,000 Daltons. CA1 PS100k is a mesostructured sol gel thin film on a polysulfone ultrafiltration membrane with a molecular weight cutoff of 100,000 Daltons. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CA2 PS100k is a mesostructured sol gel thin film on a polysulfone ultrafiltration membrane with a molecular weight cutoff of 100,000 Daltons. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. CTAB is a cationic single chain surfactant.

Table 13 compares the permeability, turbidity rejection, and conductivity rejection of CA2 PS100k, CA1 PS100k, and a PS100k. The first column ('membrane') identifies which material was used for the filtration. The second column (GFD per PSI) reports the permeability of the materials after one hour of filtration in gallons per square foot per day per psi (GFDP). The third column ('turbidity rejection') reports the rejection of turbidity in percentage after one hour of filtration. Turbidity is measured for the feedwater (NTU$_{feed}$) and the permeate (NTU$_{permeate}$) for both materials in NTU. Rejection is calculated according to the equation below:

$$\text{Rejection} = \frac{NTU_{feed} - NTU_{permeate}}{NTU_{feed}}$$

The fourth column ('conductivity rejection') reports the rejection of conductivity in percentage after one hour of filtration. Conductivity measures total dissolved solids within a water sample in ppm (parts per million), and is reported for the feedwater (ppm$_{feed}$) and the permeate (ppm$_{permeate}$) from both materials. Rejection is calculated according to the equation below:

$$\text{Rejection} = \frac{PPM_{feed} - PPM_{permeate}}{PPM_{feed}}$$

TABLE 13

| Membrane | GFD per PSI | Turbidity Rejection | Conductivity Rejection |
|---|---|---|---|
| CA2 PS100k | 5.47 | 99.11% | 2.22% |
| CA1 PS100k | 1.36 | 98.51% | 2.91% |
| PS100k | 3.55 | 99.22% | 0.56% |

The data in the Table 13 confirms that the filtration properties of a porous material with a mesostructured sol gel film are improved compared to a porous material without a mesostructured sol gel film when filtering laundry water samples. The permeability of the CA2 PS100k and the CA1 PS100k material were 54.1% and −61.7% higher relative to a PS100k. All three materials have comparable turbidity rejection within 99%+/−0.5%. The conductivity rejection of the CA2 PS100k and CA1 PS100k membranes was 2.57%+/−0.34% compared to 0.56% for a PS100k. The difference conductivity rejection of the CA2 PS100k and CA1 PS100k, 2.57%, is statistically significant in comparison to the results for the PS100k and the materials in Tables 10-11.

Table 14 describes the laundry water samples filtered by the three materials. Column one ('laundry water samples') identifies the sample. Column two ('turbidity') is a measure of the turbidity of the laundry water samples ($NTU_{feed}$). Column three ('conductivity') is a measure of the total dissolved solids of the laundry water samples ($ppm_{feed}$). The average turbidity of the laundry water samples was 49.9 NTU and the average conductivity was 710 ppm.

TABLE 14

| Feed Water | Turbidity | Conductivity |
|---|---|---|
| Sample 1 | 46.9 | 742 |
| Sample 2 | 44.2 | 689 |
| Sample 3 | 58.7 | 700 |
| Average | 49.9 | 710 |

Figure 46:
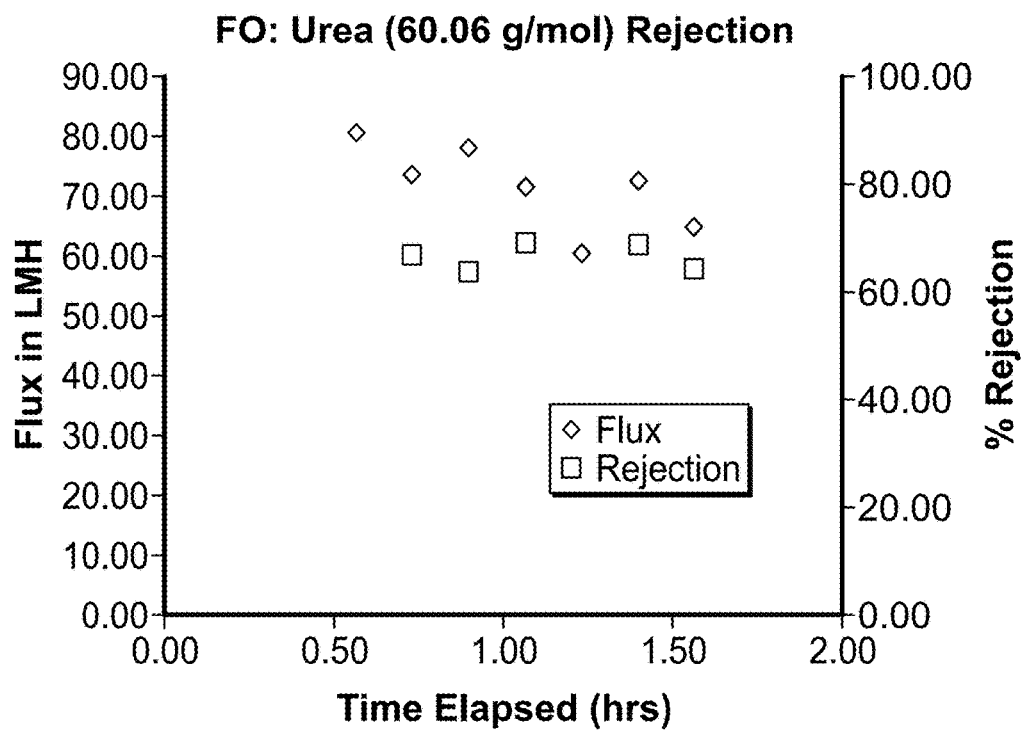
FIG. 46 shows urea rejection under forward osmosis of an embodiment of the present invention.

Mesostructured thin films on porous materials have a unique separation mechanism when used for forward osmosis. Typical forward osmosis/reverse osmosis membranes use the solution diffusion mechanism to separate water and solutes. FIG. 46 demonstrates how a mesostructured thin film on a porous material, CA1, has a process dependent separation mechanism. CA1 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius. The two different processes are forward osmosis and reverse osmosis. Using a typical cellulose triacetate or aromatic poly amide membrane, the rejection of solutes would be comparable in both a forward osmosis and a reverse osmosis process, e.g. >90% rejection of NaCl.

For forward osmosis measurements, salt backflux is an important membrane parameter. It is a measure of how much draw solute is permeating through the material in the opposite direction of water flux. Salt backflux is calculated using the following method. First, the both the conductivity and the volume of the feed water are measured at an initial time and a final time. The conductivity measurements G are converted to concentration C using a conversion factor:

$$C = 0.64 \frac{g/L}{mS/cm} \cdot G$$

The reverse salt flux is found the calculating the change in mass of salt in the feed over time, as follows:

$$L = \frac{(V_{f,t2} C_{f,t2} - V_{f,t1} C_{f,t1})}{(t_2 - t_1) \cdot A}$$

Where V is the volume of the feed water, C is the concentration of salt in the feed water, A is the area of the membrane, and t is time.

FIG. 46 shows the results of a CA1 material in a forward osmosis process. A CA1 material with surface area equal to 0.037 was mounted into a home built test cell. The average pressure drop from the feed to the brine was 3.0 psi. The concentration of the brine was 2M NaCl. The flow rate of the feed was 60 Gallons per Hour and the flow rate of the brine was 7 gallons per hour. In data not shown, the temperature corrected average flux over three experiments at the end of one hour was 59.7 liters per meter squared per hour and the average salt backflux was 1.9 grams per meter squared per hour. The y-axis on the left hand side corresponds to the diamond shaped markers and reports the flux through the CA1 material. The y-axis on the right hand side corresponds to the square markers and reports the urea rejection by the CA1 material. The average flux over a 90 minute period was 70.18 liters per meter squared per hour. The concentration of urea in the feed water was 3 grams per liter. In the forward osmosis experiment, the rejection of urea relative to the solution flux across the membrane was 67.55%. This is comparable to commercial forward osmosis membranes.

A reverse osmosis process (RO) separation using a CA1 material prepared using the same method used to prepare the CA1 material measured in FIG. 46 was also performed. A 10,000 Dalton (i.e. 10,000 molecular weight) polyethylene glycol (PEG 10k) solution was prepared for the RO separation. The PEG 10k Solution is prepared by mixing PEG 10k with reverse osmosis water resulting in a solution with a final PEG 10k of 1.0 wt %. After preparation of the PEG 10k Solution, the sample was filtered by one 1"×3" piece of CA1 material. Filtration through the three materials was done in parallel using a homemade crossflow filtration cell in tangential flow filtration mode, meaning 5% water recovery. The CA1 materials filtered PEG 10k solution for at least 10 minutes before beginning the experiment. The pressure was 4.0 PSI. The pressure drop across the membrane was 2-4 psi. All PEG 10k concentration measurements were performed using refractometry. Under tangential flow filtration the CA1 material displayed no rejection (0%) of 10k PEG in an RO separation. A typical forward osmosis material rejects >99% of 10k PEG. This demonstrates that the mesostructured sol-gel films on porous supports do not use the solution diffusion mechanism. One plausible mechanism is the electrostatic mechanism. In data not shown, replacing the cationic surfactant, CTAB, with an nonionic surfactant, e.g. dodecanol, in the mesostructure eliminates flux from osmotic gradients.

The surfactant composition of mesostructured thin films on porous materials can be varied, changing the performance of the material when used for forward osmosis. Membranes were prepared the same way as CA2 except the surfactant(s) were not CTAB. Table 15 shows the results of varying the surfactant in the mesostructured sol gel thin film on the porous material when used in a forward osmosis process. Tested materials had a surface area equal to 0.002 square meters using a home built test cell.

TABLE 15

| Membrane | Feed | Feed Flow (ml/min) | Brine Flow (ml/min) | ΔP | FO Flux LMH | Wt % | Solute | g/L (1 hr; 3 hr) |
|---|---|---|---|---|---|---|---|---|
| 1:0 MTAB | RO | 60 | 12 | 2 | 193 | 10 | NaCl | −0.3; −0.3 |
| 2:1 MTAB | RO | 60 | 12 | 2 | 156 | 10 | NaCl | −0.4; −0.3 |
| 50:50 M:L | RO | 60 | 12 | 2 | 89 | 10 | NaCl | 0.1; 4.1 |
| 1:2 Lauric | RO | 60 | 12 | 2 | 147 | 10 | NaCl | 0.48; 0.17 |
| 0:1 Lauric | RO | 60 | 12 | 2 | 116 | 10 | NaCl | −0.2; −0.3 |
| DLPC | RO | 60 | 12 | 2 | 77 | 10 | NaCl | 1.3; 1.8 |

The material tested is listed in the first column ('Membrane'). The second column ('Feed') is the feed water which was always reverse osmosis water. The third and fourth column are the flow rate of the feed water and the brine water respectively. Delta P is the pressure drop, 2.0 PSI, across the test cell from the feed to the brine. The sixth column ('FO Flux LMH') is the flux through the material. The seventh ('W/t %') and eighth ('Solute') columns are 10 wt % and NaCl for all samples. The final column (g/L) is the ratio of grams of NaCl flux in the opposite direction of Liters of water flux.

TABLE 16

| Chemistry | Surfactant 1 | Surfactant 2 | Molar Ratio of Surfactant 1 to Surfactant 2 |
|---|---|---|---|
| 1:0 MTAB | Myristyl trimethyl ammonium bromide | Lauric Acid | 1:0 |
| 2:1 MTAB | Myristyl trimethyl ammonium bromide | Lauric Acid | 2:1 |
| 50:50 M:L | Myristyl trimethyl ammonium bromide | Lauric Acid | 1:1 |
| 1:2 Lauric Acid | Myristyl trimethyl ammonium bromide | Lauric Acid | 1:2 |
| 0:1 Lauric Acid | Myristyl trimethyl ammonium bromide | Lauric Acid | 0:1 |

Table 16 gives the chemical name(s) and the molar ratio(s) of surfactants in the materials listed in the Membrane column. Only two of the materials have positive ratios of grams NaCl per Liter of water. Those materials were 1:2 Lauric and 50:50 M:L. Because they demonstrated salt flux in the opposite direction of water flux, it is confirmed that they are demonstrating forward osmosis.

Compared to DLPC, a material with a mesostructure composed of a surfactant with two chains, the 50:50 M:L and 1:2 Lauric produce 15.6% and 90.9% greater flux under identical operating conditions. Lower salt back flux relative to water flux is more desirable for forward osmosis membranes. After one hour, the salt back flux of 50:50 M:L and 1:2 Lauric are 7.7% and 37% of the salt back flux of the DLPC. After three hours, the salt back flux of 50:50 M:L and 1:2 Lauric are 228% and 9.4% of the salt back flux of the DLPC. The increased flux and decreased salt backflux demonstrates how these materials are improvements over a DLPC based structure for forward osmosis.

Figure 47:
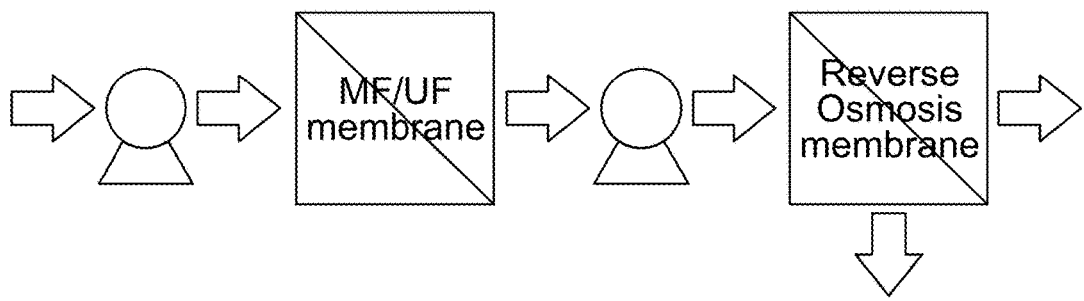
FIG. 47 is a schematic showing a simple flow diagram of a two stage microfiltration/ultrafiltration, reverse osmosis water treatment system.

The porous materials containing a mesostructured sol-gel film described within this application can be used in standard configurations for water treatment. One example of a standard configuration is a spiral wound element, which has been manufactured using a porous material containing a mesostructured sol-gel film described herein. This type of water treatment element could be used for any water treatment application such as wastewater treatment, bilge water treatment, emulsions, concentration of proteins, desalination, etc. FIG. 47 is a simple flow diagram of a two stage microfiltration/ultrafiltration, reverse osmosis water treatment system. Any porous material containing a mesostructure in a standard water filtration configuration is used to pretreat the high total organic carbon (TOC) wastewater before it is filtered by a standard reverse osmosis membrane. The material, manufactured into a standard water treatment element such as a spiral wound element or a hollow fiber membrane, can be used in any water treatment system.

Table 17 contains filtration results of a 4.0"×40" spiral wound element manufactured from a 40"×25' sheet of porous material containing a mesostructured sol-gel film, as described within this application, by a contract manufacturer. CA1 PS10k is a mesostructured sol gel thin film on a ultrafiltration membrane with a molecular weight cutoff of 10,000 Dalton polyethylene glycol. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. The support membrane is then rinsed in water, oxidized then coated with the self assembly solution. The resulting thin film can be annealed via the addition of alcohol after coating. Using this method, thin films are cured for >48 hrs at >40 Celsius.

A comparison of the unfiltered wastewater and the filtered wastewater is shown in Table 17. Column 1 is the Water Source. Column 2 is the turbidity of the water measured in NTU. Column 3 is a calculation of turbidity rejection relative to the wastewater. Column 4 is the conductivity of the water measured in part per million (ppm). Column 5 is a calculation of conductivity rejection relative to the wastewater. The element removed 91.9% of turbidity and 14.9% of conductivity.

TABLE 17

| Water Source | Turbidity NTU | Turbidty Rejection | Conductivity | Conductivity Rejection |
|---|---|---|---|---|
| Wastewater | 354; 354; 354 | N/A | 424 ppm | N/A |
| CA1 10k PS | 28.5; 28.7; 28.8 | 91.9% | 361 ppm | 14.9% |

Specific Embodiments of the Invention

The CA1 PS35k is a mesostructured sol gel thin film on an ultrafiltration membrane resulting in a material with a MWCO of 35,000 Daltons. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius.

The CA2 PS35k is a mesostructured sol gel thin film on an ultrafiltration membrane resulting in a material with a MWCO of 35,000 Daltons. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius.

The CA1 PS100k is a mesostructured sol gel thin film on a polysulfone ultrafiltration membrane with a molecular weight cutoff of 100,000 Daltons. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius.

The CA2 PS100k is a mesostructured sol gel thin film on a polysulfone ultrafiltration membrane with a molecular weight cutoff of 100,000 Daltons. The mesostructured thin film was created from a self assembly solution. The self assembly solution was prepared by adding cetyl trimethyl ammonium bromide (CTAB) to 0.32:0.64:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius.

The CA1 is a mesostructured sol gel thin film on a microfiltration membrane with an average pore size of 0.1 microns. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius.

The CA2 is a mesostructured sol gel thin film on a microfiltration membrane with an average pore size of 0.1 microns. The mesostructured thin film was created from a self assembly solution. The self assembly solution was prepared by adding a surfactant, either cetyl trimethyl ammonium bromide (CTAB) or a combination of myristyl trimethyl ammonium bromide (MTAB) and lauric acid (LA) from molar ratios of 1:0 to 0:1, at 0.32:0.64:0.04 volumetric parts of tetraethylorthosilicate, ethanol and water. The amount of surfactant added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius.

The CA1 PS10k is a mesostructured sol gel thin film on a ultrafiltration membrane with a molecular weight cutoff of 10,000 Dalton polyethylene glycol. The mesostructured thin film was created from a self assembly solution. The self assembly solution was prepared by adding cetyl trimethyl ammonium bromide (CTAB) to 0.48:0.48:0.04 volumetric parts of tetraethylorthosilicate, ethanol and water. The amount of CTAB added resulted in a final concentration of eight weight percent. The self assembly solution was sonicated using a Branson 1500 sonicator for 90 minutes at 40 Celsius. Support membrane is then rinsed in water, oxidized then coated with the self assembly solution. The resulting thin film can be annealed via the addition of alcohol after coating. Using this method, thin films are cured for >48 hrs at >40 Celsius.

Although the invention has been described in detail with particular reference to the described embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A filter comprising a porous plastic material comprising a functionalized top surface, said top surface of said porous plastic material coated with a hydrophilic coating comprising an inorganic mesophase derived from a sol-gel precursor, said inorganic mesophase comprising surfactant molecules, wherein the hydrophilic coating comprising the inorganic mesophase derived from the sol-gel precursor allows for transport across the inorganic mesophase and the porous plastic material.

2. The filter of claim 1 wherein said inorganic mesophase comprises silica or alumina or a combination thereof.

3. The filter of claim 1 wherein said hydrophilic coating comprises a stabilized surfactant mesostructure, said stabilized surfactant mesostructure comprising one or more single chain surfactants.

4. The filter of claim 3 wherein said single chain surfactants have a charge selected from the group consisting of anionic, cationic, zwitterionic, and non-ionic, and combinations thereof.

5. The filter of claim 3 wherein said stabilized surfactant mesostructure comprises between approximately 1 and approximately 20 wt % surfactants.

6. The filter of claim 1 wherein an average pore size of said hydrophilic coating is less than an average pore size of said porous plastic material.

7. The filter of claim 1 having an average pore size greater than 0.001 microns.

8. The filter of claim 1 wherein said porous plastic material has an average pore size between 0.002 microns and approximately 0.4 microns.

9. The filter of claim 1 wherein a molecular weight cutoff of said filter is less than a molecular weight cutoff of said porous plastic material.

10. The filter of claim 1 wherein said porous plastic material has a molecular weight cutoff between approximately 100 daltons and approximately 500,000 daltons.

11. The filter of claim 1 wherein said porous plastic material comprises a filter selected from the group consisting of a microfiltration membrane, an ultrafiltration membrane, a nanofiltration membrane, a backflushable membrane, and a reverse osmosis membrane.

12. The filter of claim 1 wherein said porous plastic material comprises polyethersulfone (PES), polysulfone (PS), polyvinyldiflouride (PVDF), poly acrylic nitrile (PAN), or a blend thereof.

13. The filter of claim 1 wherein a water permeability of said filter is at least 10% greater than a water permeability of said porous plastic material.

14. The filter of claim 1 wherein an emulsion permeability of said filter is at least 10% greater than an emulsion permeability of said porous plastic material.

15. The filter of claim 1 wherein rejection of a substance by said filter is at least 10% greater than rejection of said substance by said porous plastic material.

16. The filter of claim 15 wherein said substance is selected from the group consisting of polyethylene glycol, a salt, an organic material, total dissolved solids, and an emulsion.

17. The filter of claim 13 wherein rejection of a substance by said filter is at least 10% greater than rejection of said substance by said porous plastic material.

18. The filter of claim 17 wherein said substance is selected from the group consisting of polyethylene glycol, a salt, an organic material, total dissolved solids, and an emulsion.

19. The filter of claim 14 wherein rejection of a substance by said filter is at least 10% greater than rejection of said substance by said porous plastic material.

20. The filter of claim 19 wherein said substance is selected from the group consisting of polyethylene glycol, a salt, an organic material, total dissolved solids, and an emulsion.

21. The filter of claim 1 wherein turbidity of a filtrate filtered by said filter is at least 10% lower than turbidity of a filtrate filtered by said porous plastic material.

22. The filter of claim 13 wherein turbidity of a filtrate filtered by said filter is at least 10% lower than turbidity of a filtrate filtered by said porous plastic material.

23. The filter of claim 14 wherein turbidity of a filtrate filtered by said filter is at least 10% lower than turbidity of a filtrate filtered by said porous plastic material.

24. The filter of claim 1 wherein a diameter of a drop of water wetting said filter is at least approximately 10% greater than a diameter of a drop of water of the same volume wetting said porous plastic material.

25. The filter of claim 1 comprising a partially or completely electrostatic separation mechanism.

26. The filter of claim 1 formed into an element used in a water treatment system.

27. The filter of claim 26 wherein said element comprises a spiral wound element.

28. The filter of claim 26 wherein said water treatment system comprises a two stage process comprising a microfiltration/ultrafiltration stage and a reverse osmosis stage.

29. The filter of claim 1 useful for filtering a fluid selected from the group consisting of wastewater, wastewater comprising surfactants, wastewater comprising an emulsion, bilge water, grey water, laundry water, and emulsions.

30. A forward osmosis membrane comprising the filter of claim 1.

31. The forward osmosis membrane of claim 30 having a first molecular weight cutoff when said membrane is used in a reverse osmosis configuration and a second molecular weight cutoff when said membrane is used in a forward osmosis configuration, said first molecular weight cutoff being at least an order of magnitude different than said second molecular weight cutoff.

32. The forward osmosis membrane of claim 30 wherein a forward osmosis flux is greater than approximately 60 LMH and urea rejection is greater than approximately 60%.

33. The forward osmosis membrane of claim 30 which utilizes a forward osmosis separation method that is not a solution diffusion mechanism.

34. The forward osmosis membrane of claim 30 useful for filtering a fluid selected from the group consisting of wastewater, wastewater comprising surfactants, wastewater comprising an emulsion, bilge water, grey water, laundry water, and emulsions.

* * * * *